United States Patent
Rachamadugu

(10) Patent No.: US 10,200,246 B1
(45) Date of Patent: Feb. 5, 2019

(54) IMPORTING PARAMETERS FROM NESTED INFORMATION-TECHNOLOGY BLUEPRINTS

(71) Applicant: Raghavendra Rachamadugu, Fremont, CA (US)

(72) Inventor: Raghavendra Rachamadugu, Fremont, CA (US)

(73) Assignee: VMware, Inc., Palo Alto, CA (US)

( * ) Notice: Subject to any disclaimer, the term of this patent is extended or adjusted under 35 U.S.C. 154(b) by 192 days.

(21) Appl. No.: 15/242,503

(22) Filed: Aug. 20, 2016

Related U.S. Application Data

(60) Provisional application No. 62/213,084, filed on Sep. 1, 2015, provisional application No. 62/240,160, filed on Oct. 12, 2015, provisional application No. 62/350,725, filed on Jun. 16, 2016, provisional application No. 62/350,729, filed on Jun. 16, 2016, provisional application No. 62/350,732, filed on Jun. 16, 2016, provisional application No. 62/350,753, filed on Jun. 16, 2016, provisional application No. 62/350,757, filed on Jun. 16, 2016, provisional application No. 62/350,758, filed on Jun. 16, 2016, provisional application No. 62/350,760, filed on Jun. 16, 2016.

(51) Int. Cl.
*H04L 12/24* (2006.01)

(52) U.S. Cl.
CPC .......... *H04L 41/0846* (2013.01); *H04L 41/12* (2013.01); *H04L 41/22* (2013.01)

(58) Field of Classification Search
CPC ....... G06F 8/71; H04L 43/06; H04L 41/0846; H04L 41/12; H04L 41/22
See application file for complete search history.

(56) References Cited

U.S. PATENT DOCUMENTS

| | | | | |
|---|---|---|---|---|
| 7,613,767 | B2 * | 11/2009 | Debique | G06F 9/50 709/203 |
| 8,335,851 | B1 * | 12/2012 | Vendrow | G06F 8/60 700/99 |
| 9,400,637 | B1 * | 7/2016 | Hadar | G06F 8/35 |
| 9,645,805 | B2 * | 5/2017 | Govindaraju | G06F 8/60 |
| 2002/0169658 | A1 * | 11/2002 | Adler | G06Q 10/06 705/7.28 |

(Continued)

*Primary Examiner* — Alina A Boutah
(74) *Attorney, Agent, or Firm* — Clifton Leon Anderson

(57) ABSTRACT

A blueprint is a program/document that describes a real object and includes the expertise to create and operate that object. Example objects include machines (e.g., computer or server), and systems, such as an e-commerce site, in which computers are nodes or elements. A "parent" blueprint can include, e.g., by reference, a "child" blueprint. Customizable parameters of the child blueprint are imported and instantiated into the parent blueprint so that a developer of the parent blueprint can edit the values of the customizable parameters through an application program interface (API) of the parent blueprint without affecting the child blueprint. When the parent blueprint is deployed, the provisioning of the child blueprint follows the customized parameter values rather than the original values for those parameters. The ability to modify instantiated parameters greatly simplifies the development of complex blueprints.

18 Claims, 32 Drawing Sheets

(56) References Cited

U.S. PATENT DOCUMENTS

| | | | |
|---|---|---|---|
| 2010/0161632 A1* | 6/2010 | Rosen | G06F 9/44526 707/758 |
| 2011/0238707 A1* | 9/2011 | Wong | G06F 17/248 707/802 |
| 2013/0232480 A1* | 9/2013 | Winterfeldt | G06F 8/60 717/177 |
| 2013/0238768 A1* | 9/2013 | Vaidya | H04L 67/14 709/220 |
| 2014/0081775 A1* | 3/2014 | Leblond | G06Q 30/0277 705/14.73 |
| 2015/0074279 A1* | 3/2015 | Maes | G06F 9/5072 709/226 |
| 2015/0180949 A1* | 6/2015 | Maes | H04L 43/10 709/201 |
| 2015/0242204 A1* | 8/2015 | Hassine | H04L 41/5045 717/121 |
| 2015/0296030 A1* | 10/2015 | Maes | G06F 9/5072 715/736 |
| 2015/0304175 A1* | 10/2015 | Maes | G06F 8/70 709/226 |
| 2015/0378743 A1* | 12/2015 | Zellermayer | G06F 9/4401 713/2 |
| 2016/0019096 A1* | 1/2016 | Winterfeldt | G06F 8/60 717/177 |
| 2016/0188323 A1* | 6/2016 | Nagaraja | G06F 8/61 717/101 |
| 2016/0239595 A1* | 8/2016 | Maes | G06F 9/5061 |
| 2017/0004018 A1* | 1/2017 | Mangtani | G06F 9/5072 |
| 2017/0091150 A1* | 3/2017 | Palanivelu | G06F 17/211 |
| 2017/0201600 A1* | 7/2017 | Bauer | H04L 67/36 |
| 2017/0244613 A1* | 8/2017 | Vasudevan | H04L 41/5054 |
| 2017/0255454 A1* | 9/2017 | Hassine | H04L 41/5045 |
| 2017/0272335 A1* | 9/2017 | Hamlin | H04L 41/5045 |
| 2017/0329590 A1* | 11/2017 | Owen | G06F 8/60 |
| 2018/0041405 A1* | 2/2018 | Maes | H04L 67/10 |

* cited by examiner

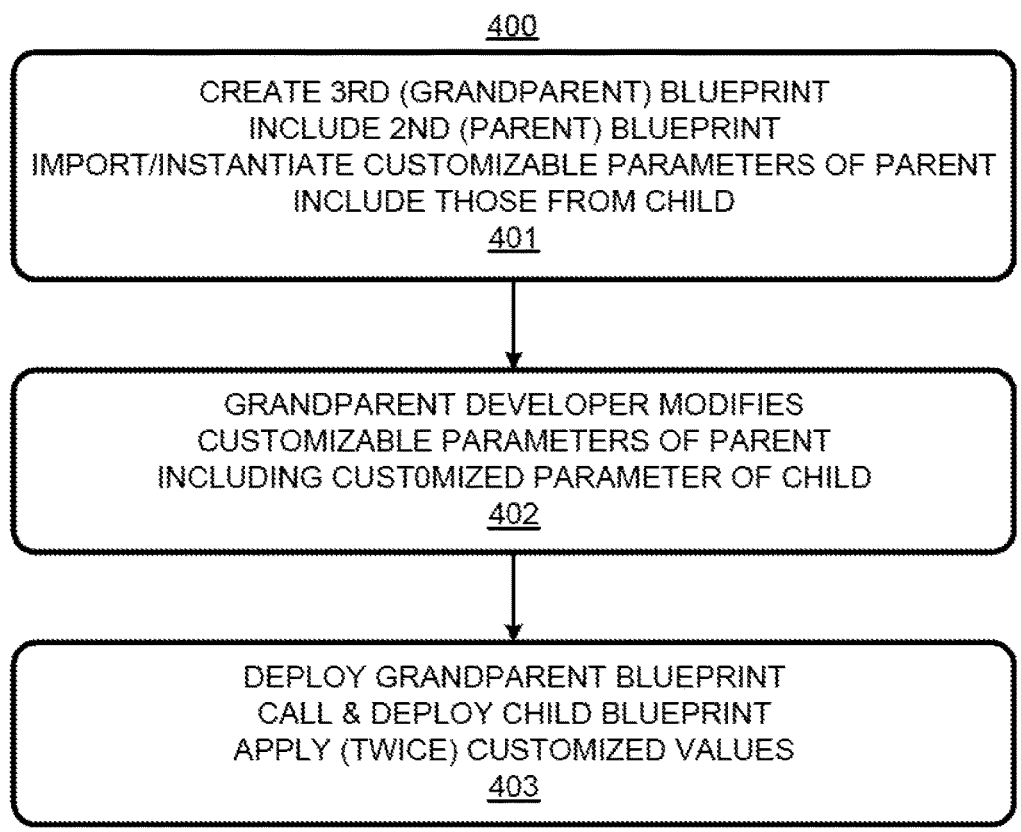

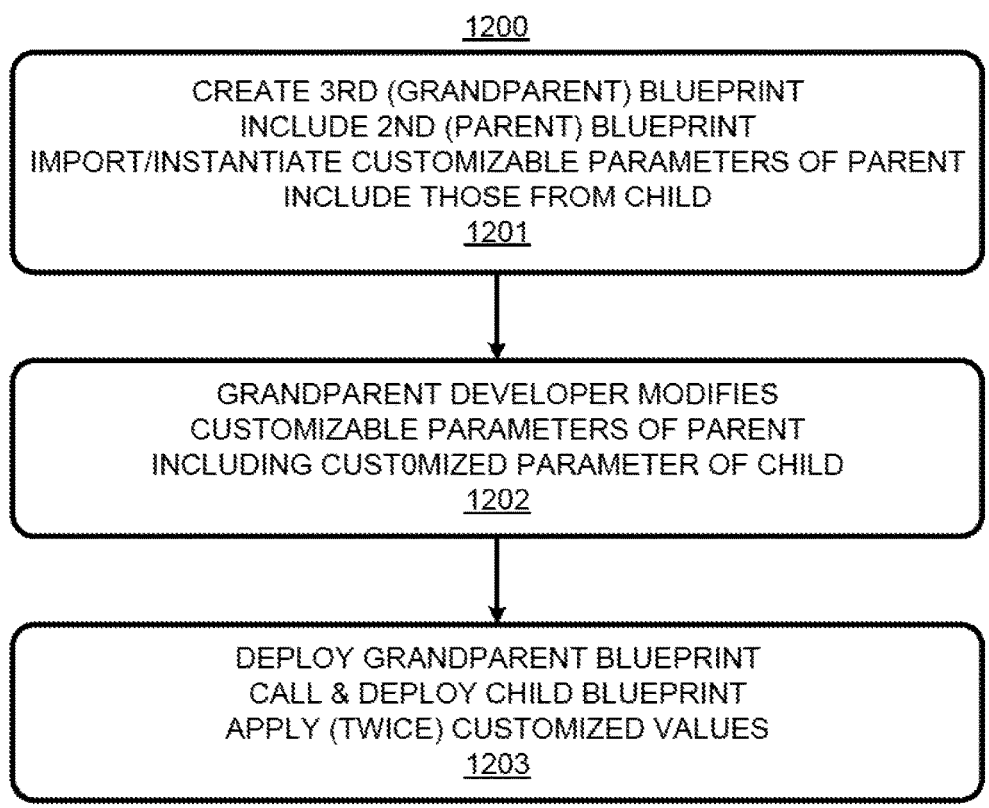

US 10,200,246 B1

IMPORTING PARAMETERS FROM NESTED INFORMATION-TECHNOLOGY BLUEPRINTS

This application claims the benefits of provisional applications 62/213,084 filed 2015 Sep. 1, 62/240,160 filed 2015 Oct. 12, 62/350,725 filed 2016 Jun. 16, 62/350,729 filed 2016 Jun. 16, 62/350,732 filed 2016 Jun. 16, 62/350,753 filed 2016 Jun. 16, 62/350,757 filed 2016 Jun. 16, 62/350,758 filed 2016 Jun. 16, and 62/350,760 filed 2016 Jun. 16.

Enterprises are increasingly reliant on computer applications for business operations. However, the costs, effort, and expertise required to acquire, configure, maintain, and update the infrastructure required to run those applications can be burdensome. Infrastructure-as-a-service (IaaS) providers offer the option of allowing enterprises to subscribe to a virtual infrastructure. The IaaS providers then assume responsibility for the virtual infrastructure and the hardware infrastructure on which the virtual infrastructure is based. The enterprise is then free to focus more on its basic business and less on the computer system running it.

Of course, the burdens associated with the infrastructure do not disappear; they are merely shifted to the IaaS provider. In fact, the burdens are increased because the IaaS provider may have to configure an infrastructure to meet the differing requirements of its varying customers. Expertise in computer hardware, networking, storage systems, operating systems, databases and other software applications, security, compliance, workload management, and other areas are required. Therefore, the IaaS provider has the multi-disciplinary challenge of coordinating the efforts of different subject matter experts.

BRIEF DESCRIPTION OF THE DRAWINGS

FIG. 3 is a representation of a blueprint.

FIG. 4 is a flow chart of a continuation of the process of FIG. 2.

FIG. 11 is a representation of a blueprint of the IT system of FIG. 9.

FIG. 12 is a flow chart of a continuation of the process of FIG. 10.

DETAILED DESCRIPTION

Figure 1:
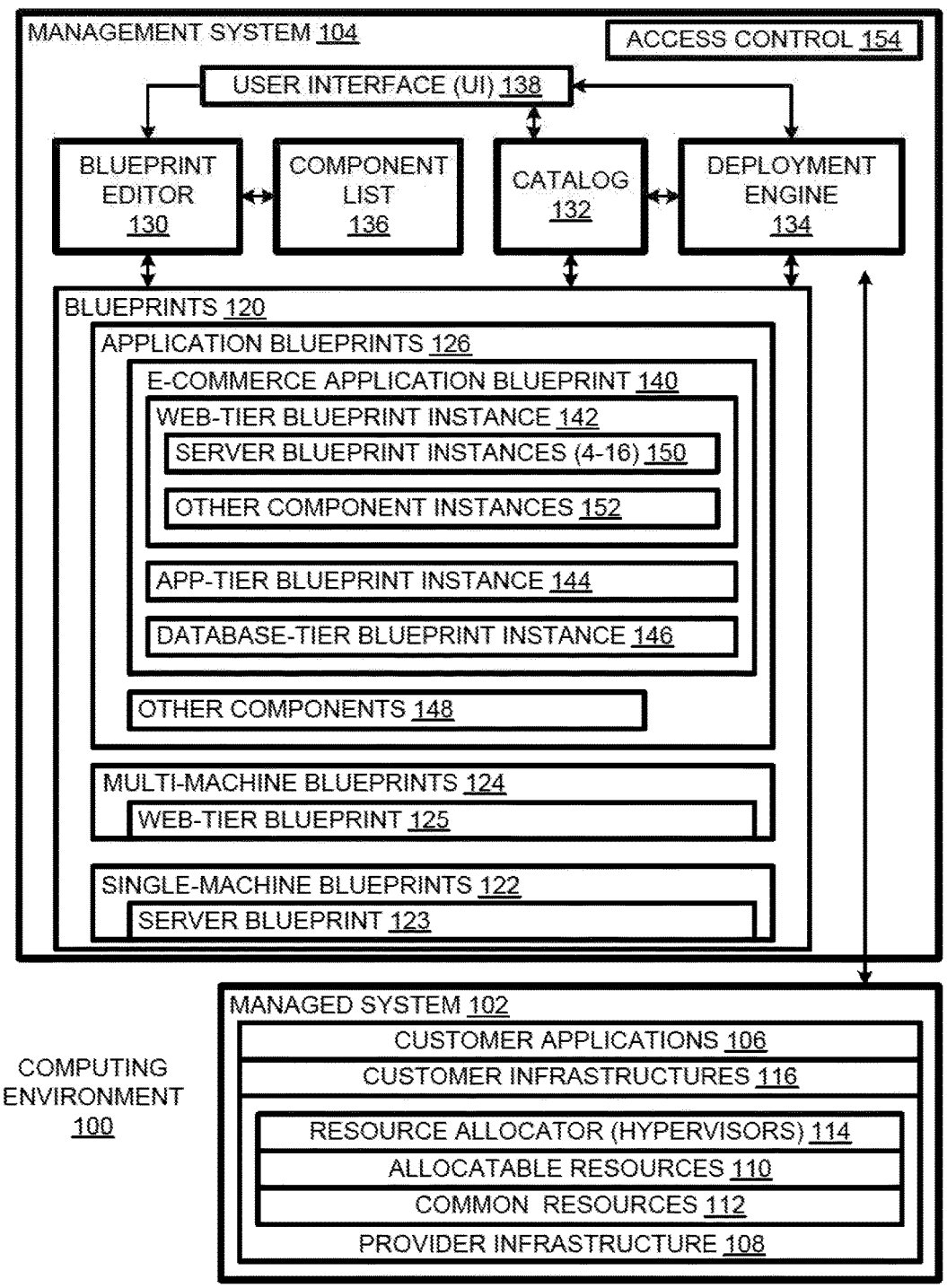
FIG. 1 is a schematic diagram of a computing environment including a management system.

Blueprints are programs/documents embodying the expertise to create and manage a target object, such as a server or an e-commerce site. Blueprints can be developed using blueprint "components" as building blocks. Herein, blueprints, once developed, can serve as building blocks for other blueprints. Any blueprint can be considered a component type. In other words, a component corresponding to a blueprint is treated exactly the same way as a regular component.

Blueprints that include other blueprints can also serve as component types, so the number of possible levels of inclusion is unlimited. Each "descendant" blueprint included in an "ancestor" blueprint can represent a respective expertise, so this hierarchical arrangement can provide for combining different expertises associated with the different blueprints included in the ancestor blueprint. For example, a blueprint for a multi-server website can reference a blueprint for a server. Thus, the developer of the website blueprint need not have the expertise to develop a server blueprint and vice versa.

In general, blueprints can specify a number of a component type to be provisioned. For example, a server can specify a number, e.g., 4, of processors or an amount of memory to be provisioned. Likewise, a website blueprint can specify a number, e.g., 3, of servers to be provisioned.

For flexibility, a blueprint can specify a numerical range instead of a single value. A single value can then be selected from the range during deployment. For example, a server blueprint can specify a range of 1-8 processors; a website blueprint can specify a range of 2-4 servers. In this example, during deployment, 4 processors each can be specified for the servers and 3 servers can be specified for the website.

In the course of the present invention, it was determined that it would be useful for the developer of a referencing blueprint to be able to modify the referenced blueprint, e.g., constrain a range specified for a parameter of the referenced blueprint. For example, the developer of a website blueprint may have determined that servers with fewer than four processors are not suited for the website application. However, the website blueprint developer may not be authorized to modify the server blueprint, e.g., as the website developer is presumed not to have the required expertise. Accordingly, the website blueprint developer might have to submit a request for a server developer to develop a server blueprint that specifies a range of 4-8 processors instead of a range of 1-8 processors.

It would be more convenient if the developer of a referencing blueprint to be able to constrain the selections available for the referenced blueprint upon deployment to those that are truly useful in the context of the referencing blueprint. For example, the website blueprint developer may want to narrow the range of the number of processors to be included in the servers upon deployment of the website blueprint.

Accordingly, the present invention provides for instantiating at least one parameter of an included (child, nested) blueprint into an including (parent, nesting) blueprint. The instantiated parameters are then treated as parameters of the parent blueprint so that the parent blueprint developer can customize them, e.g., by selecting a value or a sub-set (e.g., sub-range) of values within the set of values permitted by the child blueprint. The child blueprint itself is unaffected by the customization.

Upon deployment of the parent blueprint, the values of the customized parameter instances are applied instead of the values associated with the child blueprint itself. In other words, the choices available upon deployment are constrained by modifications to the instantiation of the parameter in the child blueprint.

Note that the parent blueprint can itself be included, e.g., by reference, into another "grandparent" blueprint. In that case, some of the instantiated parameters of the child blueprint may be instantiated in the grandparent blueprint. In that case, the developer of the grandparent blueprint may be able to customize parameters originally imported from the child blueprint. More generally, instantiating customizable parameters may be extended to additional levels, as demonstrated in the context of the embodiment of FIG. 1.

The author/developer of a blueprint can control configurability of that blueprint, when it is included (aka nested) in other blueprint. The developer can indicate that only the blueprint-level (aka boundary) properties are configurable or that one or more or all components in the blueprint are configurable in a nested blueprint, depending on the level of flexibility the developer wants to give enclosing blueprint author/developers.

As shown in FIG. 1, a computing environment 100 includes a managed system 102 and a management system 104. Managed system 102 is used to execute customer applications 106. Managed system 102 includes a provider infrastructure 108 that includes allocable resources 110 and non-allocable common resources 112. Provider infrastructure 108 also includes a resource allocator 114 for allocating allocable resources among and within customer infrastructures 116.

To be more specific, the provider infrastructure 108 can be a datacenter or a group of datacenters. Common resources 112 can include buildings, utilities, etc. Allocable resources 110 can include hardware such as processors, memory, storage, and network bandwidth. Allocable resources can also include software such as operating systems, software utilities, security software, localizing software, and any other software, whether or not licenses are required. In addition, allocable resources can include virtual versions of hardware and software resources. Resource allocator 114 can include workload managers and virtualization software such as hypervisors. Customer applications 102 can include e-commerce sites, social media sites, etc. Customer infrastructures 116 comprise the totality of resources "seen" by the respective customer applications.

Management system 104 functions to manage managed system 102. More specifically, management system 104 provides for the creation and management of customer applications 106. This includes configuring provider infrastructure 108 to support customer applications 106. To these ends, management system 104 maintains a set of blueprints 120, each of which embodies expertise useful for configuring provider infrastructure 108 to support respective customer applications 106. Blueprints 120 can be classified according to the types of expertise they represent, e.g., into single-machine blueprints 122 (including a server blueprint 123), multi-machine blueprints 124 (including a web-tier blueprint 125), and application blueprints 126. Other embodiments provide for other classifications of blueprints.

For example, a single-machine blueprint can contain the expertise required to configure a single physical or virtual machine (e.g., computers) for customer use. A multi-machine blueprint can embody the expertise required to configure provider infrastructure 108 to provide a customer a networked arrangement of machines to function as a single-tier website. An application blueprint can embody the expertise to set up provider infrastructure 108 to support a complex customer application such as an e-commerce site.

Management system 104 includes a blueprint editor 130 for creating and updating blueprints 120. Once a blueprint has been developed and tested, it may be published to a catalog 132, from which it can be selected for use by a deployment engine 134 to implement and manage a customer application.

In addition, a newly created or updated blueprint can be published to a component list 136. Component list 136 is a list of blueprint building blocks that can be used in creating a blueprint. These components can include devices, software programs, procedures (e.g., scripts), etc. Many of the listed components are not themselves blueprints. However, as blueprints are developed, they can be made available for use as components for other blueprints. For example, a single-machine blueprint can be included, e.g., by reference, in a multi-machine blueprint. A user interface 138 provides for user-friendly access to blueprint editor 130, catalog 132, and deployment engine 134.

In a more detailed example, an e-commerce application blueprint 140, e.g., an online store, includes three multi-machine blueprints: a web-tier blueprint instance 142, an app-tier blueprint instance 144, a database-tier instance 146, as well as other components 148. The term "instance" is used to make it clear that the included child blueprint is not physically included in the parent blueprint. Rather, the child blueprint is included by reference or, in some embodiments, via blueprint instantiation. In either case, some parameters of the child blueprint are instantiated in the parent blueprint so that they may be customized via the parent blueprint application programming interface (API).

Moving down a level in the blueprint hierarchy, the web-tier blueprint instance 142 can specify a range of April 2016 servers based on single-machine blueprint instance 150. In other words, the web-tier blueprint developer is specifying a range for the number of servers to be included in a web tier of the e-commerce application; a specific number of servers can be selected during deployment planning for e-commerce application blueprint 140. Of course, web-tier blueprint instance 142 can include other component instances 150 as well. Thus, the developers of e-commerce application blueprint 140 can avail themselves of the expertises outside of their own by including in their blueprint 140 blueprints developed by others with different expertises.

Management system 104 includes access control 154 to: 1) exclude unauthorized users from management system 104; and 2) control access of authorized users according to their roles and associated expertises. For example, a multi-machine blueprint developer may be permitted to include a single-machine blueprint in a multi-machine blueprint, but may be prohibited from editing the single-machine blueprint or creating a new single-machine blueprint.

To address such limitations, the present invention allows a developer of a child blueprint to indicate which parameters of a child blueprint are modifiable and which are not modifiable by a developer of a parent blueprint that includes the child blueprint. For example, flags associated with respective parameters can be set to preclude modification and "reset" to permit modification. Various default strategies include defaulting all parameters to modifiable, defaulting all parameters to unmodifiable, and defaulting parameters for which a choice of values is provided to modifiable and parameters for which a single value is specified to unmodifiable.

When a child blueprint is included in a parent blueprint, the modifiable parameters of the child blueprint are imported and instantiated in the parent blueprint. Initially, the values of the imported parameters match the values assigned to the corresponding parameters in the child blueprint. However, the values of the imported parameters can be modified by the developer of the parent blueprint. For example, the choices available may be narrowed even to the point of selecting a specific value. For example, a server blueprint may specify a range of 1-8 processors. In the imported instance of the server blueprint parameter, the range can be narrowed to 4-8, for example, or even set at the specific value of 6 processors, for example. In the illustrated embodiment, selecting a subset (e.g., a subrange) or performing any other modification that is consistent with constraints in the source blueprint is referred to as "customization". Thus, the developer of the parent blueprint may customize but not otherwise modify the values of imported parameters.

The customizations to the imported parameters do not affect the source child blueprint. Upon deployment of the parent blueprint, the child blueprint is called. The deployment engine checks for customization in the parent blueprint and applies the customizations instead of the original parameter values in the child blueprint.

Thus, for example, when the server blueprint 123 was included in a web-tier blueprint 125, the web-tier blueprint developer specified a range (4-16) in the number of server instances that were to be deployed.

Inclusion (by reference to the web-tier blueprint 125) into e-commerce application blueprint 150 resulted in web-tier blueprint instance 12, which initially specified that the number of servers to be deployed was 4-16, following the values of the original web-tier blueprint 125. However, the developer of e-commerce application blueprint 140 can customize the number-of-servers parameter, e.g., to specify 8-12 servers. At the time of deployment of e-commerce application blueprint 140, the number of servers provisioned for web-tier blueprint 125 will be selected from the customized range of 8-12 rather than the original range of 4-16.

For another example, a number of processors (per server) parameter for server blueprint 123 can have as its value a range of 1-8 processors.

Once the number of processors parameter is imported and instantiated into web-tier blueprint 125, that value can be customized to 4-8 processors. Once the web-tier is included in e-commerce blueprint 140, the number of processors parameter can be imported and instantiated into e-commerce blueprint 140 as one of the parameters of web-tier blueprint 125. At that point, the number of processors parameter can be further customized, e.g., to specify exactly 4 processors. In that case, when the e-commerce application blueprint 140 is deployed, its servers will be provisioned with 4 processors each.

Figure 2:
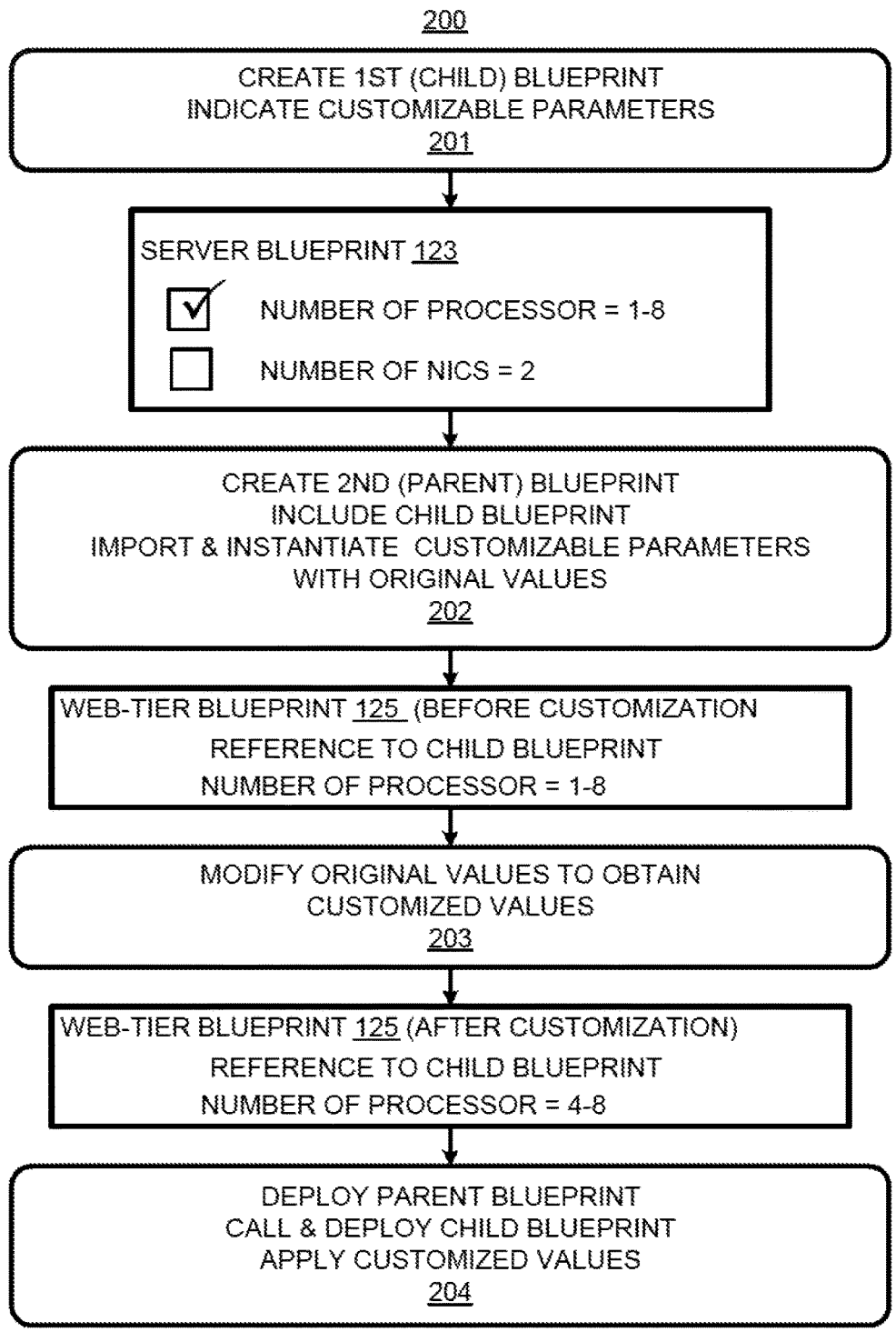
FIG. 2 is a flow chart of a process for creating and deploying blueprints.

A blueprint process 200 is flow-charted in FIG. 2. At 201, a first (child) blueprint is created with indications distinguishing customizable or otherwise modifiable parameters from non-customizable parameters. An example result shows server blueprint 123 with a customizable (as indicated by the check mark in a check box in FIG. 2) number of processors parameter with a range of 1-8 processors. In addition, a non-customizable number (as indicated by an empty check box) of network interface cards (NIC) is shown with a value 2.

At 202, a second (parent) blueprint is created including the first (child) blueprint by reference. In view of the reference to the child blueprint, its customizable parameters are imported and instantiated into the parent blueprint. In an example result, a web-tier blueprint 125 includes a reference to the child blueprint 123 and a number-of-processors parameter with a value range of 1-8, the same as the range for the corresponding parameter in the first (child) blueprint.

At 203, the developer of the parent blueprint modifies the original values of the imported customizable parameters to yield customized values. In the example web-tier blueprint 125, the number of processors customizable parameter has been narrowed to a value range of 4-8. As shown at FIG. 3, at this point the web-tier blueprint 125 includes an application programming interface (API) 301, web-tier parameters and indications 303, a reference 305 to the child blueprint 123, and instantiations of child parameters into the parent blueprint. The indications indicate which parameters are customizable and which are not. Instantiations 307 of parameters imported from child blueprint include "number of processors", the range of which has been customized to 4-8.

At 204, (FIG. 2) the parent blueprint is deployed. As part of the deployment, the child blueprint is called. Generally, for each ancestor blueprint that is deployed, there is a sub-deployment for each of its descendant blueprints. However, in some embodiments, it is possible to hide the sub-deployments e.g., by simply not creating the sub-deployments; the ability to hid sub-deployment can be important in complex blueprints with many levels of nesting.

During deployment, it is the customized values rather than the original values in the called child blueprint that are applied. The number of processors provisioned per server will be selected from the range of 4-8, and not selected from the range 1-8. Of course, the value selected will be in the range from 1-8, but only in that part of the range within the sub-range 4-8.

The customizable parameters imported from the child blueprint are, in effect, parameters of the parent blueprint. Accordingly, these customizable parameters may be indicated to be customizable or non-customizable by the parent blueprint developer. In either case, they remain customizable by the parent blueprint developer. However, the indications will affect the ability of a grandparent blueprint developer to customize them. If they are indicated to be customizable, then the developer of the grandparent blueprint that includes the parent blueprint will be able to customize them, as indicated in process 400, which is a possible continuation of process 200.

Blueprint process 400 is flow-charted in FIG. 4. At 401, a third (grandparent) blueprint, e.g., e-commerce application blueprint 126, is created including the second (parent) blueprint, e.g., web-tier blueprint 125, by reference. Customizable parameters of the parent blueprint are imported and instantiated into the grandparent blueprint. Assuming the developer of the parent blueprint indicated that the parameters imported from the child blueprint were customizable, the child parameters are included in the imported parameters. If the child parameters were modified in the parent blueprint, it is the modified versions that are imported to the grandparent blueprint.

At 402, customizable parameters are modified in the grandparent blueprint. If the customizable parameters from the child blueprint were modified in the parent blueprint, it is the modified parameters that are imported. In that case, the customizable parameters originating at the child blueprint are modified a second time, i.e., they are re-customized.

At 403, the grandparent blueprint is deployed. As part of deployment, the parent and child blueprints are called. However, the customized parameters are applied instead of the original values in the child and parent blueprints. In the case of the re-customized child parameters, provisioning may be based on a value selected from a range defined by the re-customized child parameter.

Figure 5:
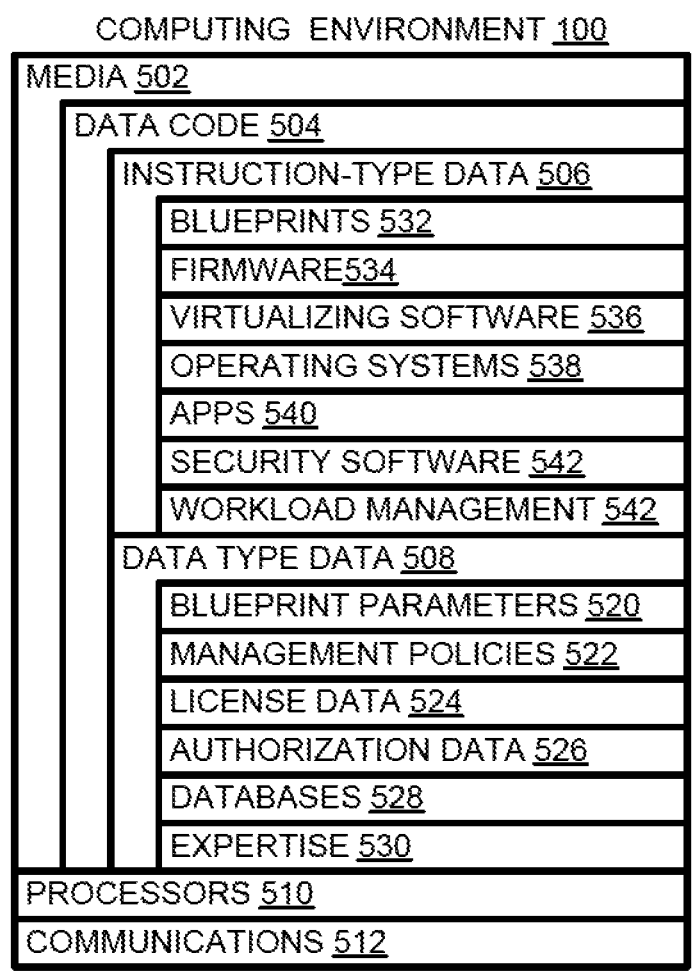
FIG. 5 is an abstract representation of the computing environment of FIG. 1.

In the abstract view of FIG. 5, computing environment 100 is shown including media 502 for storing data code 504. Data code 504 includes physical representations of instruction-type data 506 and data-type data 508. Processors 510 provide for manipulating data-type data in accordance with instruction-type data. Communications devices 512 provide for receiving and transmitting data, e.g., over a network.

Examples of data-type data 508 (aka, "data") include blueprint parameter values 520, management policies 522, license data 524 (e.g., how many licenses are active), authorization data 526 (e.g., who is authorized to do what), databases 528, and expertise 530 (e.g., knowledge base documents). Examples of instruction-type data 504 (aka "instructions") include blueprints 532 (as they include executable scripts, etc.), firmware 534, virtualizing software 536, operating systems 538, apps 540, security software 542, and workload managers 544.

Figure 6:
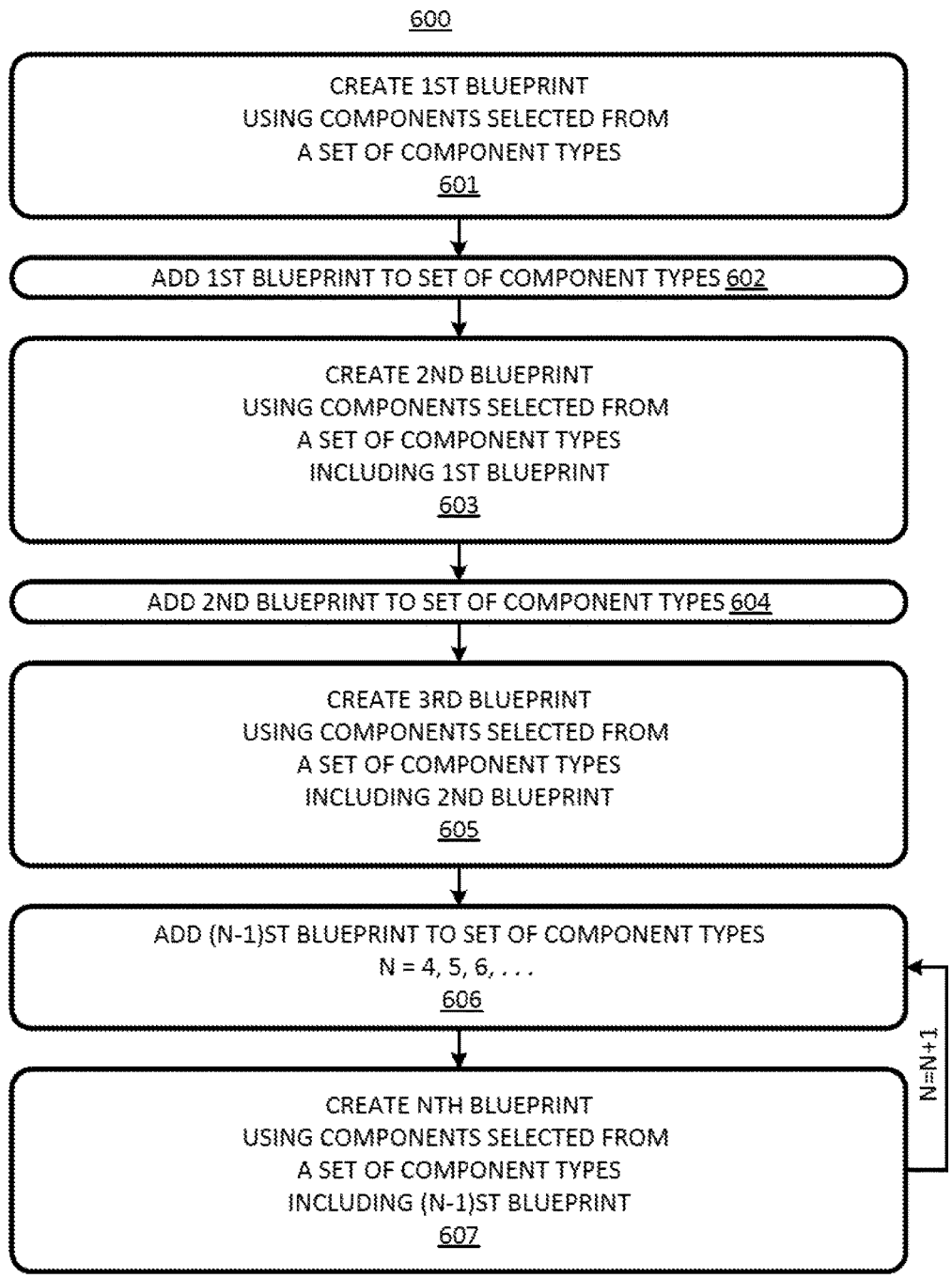
FIG. 6 is a flow chart of an iterative process for building nested blueprints.

A general process for creating nested blueprints of any number of levels is flow-charted in FIG. 6. At 601, a first blueprint is created using components selected from a set of component types. At 602, the first blueprint is added to the set of component types. At 603, a second blueprint is created using components selected from the set of component types. The selected components include the first blueprint. At 604, the second blueprint is added to the set of component types. At 605, a third blueprint is created using components selected from the set of component types. The selected components include the second blueprint. For N-4, 5, 6 . . . , at 606 an (N−1)st blueprint is added to the set of component types. At 607, an Nth blueprint is created using components selected from the set of component types. The selected components include the (N−1)st blueprint. The process returns to 606, with N being incremented to N+1 so that actions 606 and 607 can be iterated indefinitely.

Herein, "systems" refers to a set of interacting elements, wherein the elements can be hardware components, physically encoded software elements, atoms, actions, etc. A process is a system in which the elements are actions. Computers, infrastructures, and computing environments are examples of systems. Computers include media (e.g., random access memory or RAM and hard disks), processors, and communications devices (e.g., network interface cards), cabling, buses, etc.

Herein, "virtual" means "not something but made to appear as if it were". For example, a virtual machine is not a machine but is made to appear (e.g., to a guest operating system) as if it were a machine through software processes. "Virtual" is the opposite of "physical". Both hardware and physically encoded software are physical, so there can be virtual hardware and virtual software. Physical and virtual entities are both "real" as opposed to "logical", which refers to abstract or representational counterparts to real entities.

A blueprint is a program/document that defines a logical object and contains the expertise to produce and operate a real counterpart to that logical object. For example, the real counterpart can be a real or virtual machine, multi-machine system, or application. In many cases, a blueprint or a component of a blueprint will include specifications for a real object. Deploying the blueprint results in a real object meeting the specifications of the blueprint or blueprint component. The resulting real object can be said to be an "instantiation" or "instance" of the blueprint or blueprint component. An instantiation can typically be modified without modifying the source blueprint/component.

As explained above, blueprints can be arranged in an inclusion hierarchy, wherein a "parent" blueprint can contain a "child" blueprint. "Parent" and "child" are relative terms; a blueprint can be a parent of one blueprint and a child of another blueprint. However, for consistency of reference, a parent blueprint of a parent blueprint can be referred to as a "grandparent" blueprint.

A typical blueprint contains a number of parameters to which values are or can be assigned. Values can be scalars (e.g., 5), ranges (e.g., 4-8), non-numerical values (e.g., "Texas"), etc. Where a child blueprint is instantiated in a parent blueprint, the parameters of the child blueprint are instantiated in the parent blueprint by default. Where a child blueprint is included in a parent blueprint by reference, the present invention provides that some parameters of the child blueprint can be instantiated in the parent blueprint, thus becoming parameters of the parent blueprint. A parameter is "modifiable" if the value assigned to an instantiation of the parameter in a parent blueprint can be modified without modifying the child blueprint. A parameter is "customizable" if it is modifiable only within constraints set by the child blueprint.

Herein, a blueprint "developer" is a human, group of humans, or other entity that creates a blueprint. In the examples, it is generally assumed that the developer of a parent blueprint is not authorized to modify the child blueprint, e.g., using the API of the child blueprint. However, the invention permits the developer of the parent blueprint to modify the value of an instantiation of a modifiable parameter of an included child blueprint via the API of the parent blueprint.

Thus, a developer of a parent blueprint that is not authorized to modify a child blueprint directly, can, in effect, modify the child blueprint in the context of the parent blueprint. There is no need to request the developer of the child blueprint to make the needed modifications. Yet, updates to the child blueprint can be taken advantage of at the time of deployment of the parent blueprint. Herein, art labelled "prior art", if any, is admitted prior art; art not labelled "prior art" is not admitted prior art. The illustrated and other variations upon and modifications to the illustrated embodiment are provided for by the present invention, the scope of which is defined by the following claims.

Deploying Updated Information-Technology Blueprints

Enterprises are increasingly reliant on computer-based applications for business operations. However, the costs, effort, and expertise required to acquire, configure, maintain, and update the infrastructure required to run those applications can be burdensome. Infrastructure-as-a-service (IaaS) providers offer the option of allowing enterprises to subscribe to a virtual infrastructure. The IaaS providers then assume responsibility for the virtual infrastructure and the physical infrastructure on which the virtual infrastructure is based. The enterprise is then free to focus more on its basic business and less on the computer system helping to run it.

Of course, the burdens associated with the infrastructure do not disappear; they are merely shifted to the IaaS provider. In fact, the burdens are increased because the IaaS provider may have to configure an infrastructure to meet the differing requirements of its diverse customers. Expertise in computer hardware, networking, storage systems, operating systems, databases and other software applications, security, compliance, workload management, and other areas are required. Therefore, the IaaS provider has the multi-disciplinary challenge of coordinating the efforts of experts in different subject matters.

Information-technology (IT) blueprints are executable documents embodying respective expertises for creating and managing a target object, such as a server or an e-commerce site. Experts from multiple disciplines can collaborate on a single blueprint, and/or expertise from different disciplines can be combined by having blueprints, representing a respective expertise, reference other blueprints, reference other expertises. For example, a blueprint for a multi-server website can reference a blueprint for a server. Thus, the developer of the website blueprint need not have the expertise to develop a server blueprint and vice versa.

Once a blueprint is created, it can be deployed many times to configure an infrastructure to implement an application for which the blueprint was designed. Generally, if a blueprint is updated to implement an improvement, the improvements will inure to future, but not to previous, deployments of the blueprint. If, in the above example, the server blueprint is updated, the update will apply to future deployments of the multi-server website blueprint. In effect, the multi-server website blueprint is improved without any effort by the developer of the multi-server website blueprint. When a blueprint is deployed, it is generally desirable to deploy the most-recently released update rather than some predecessor blueprint. Accordingly, the present invention provides for a deployment-time check to for an update to a blueprint; if an update is found, it can be deployed in lieu of the requested update. In some embodiments, a further check is made to evaluate the compatibility of an update to a descendant blueprint included (e.g., by reference) in an ancestor blueprint. In such embodiments, it is the most-recent compatible update that is deployed in lieu of the descendant blueprint requested. If there are no compatible updates, the descendant blueprint is deployed as requested.

Figure 7:
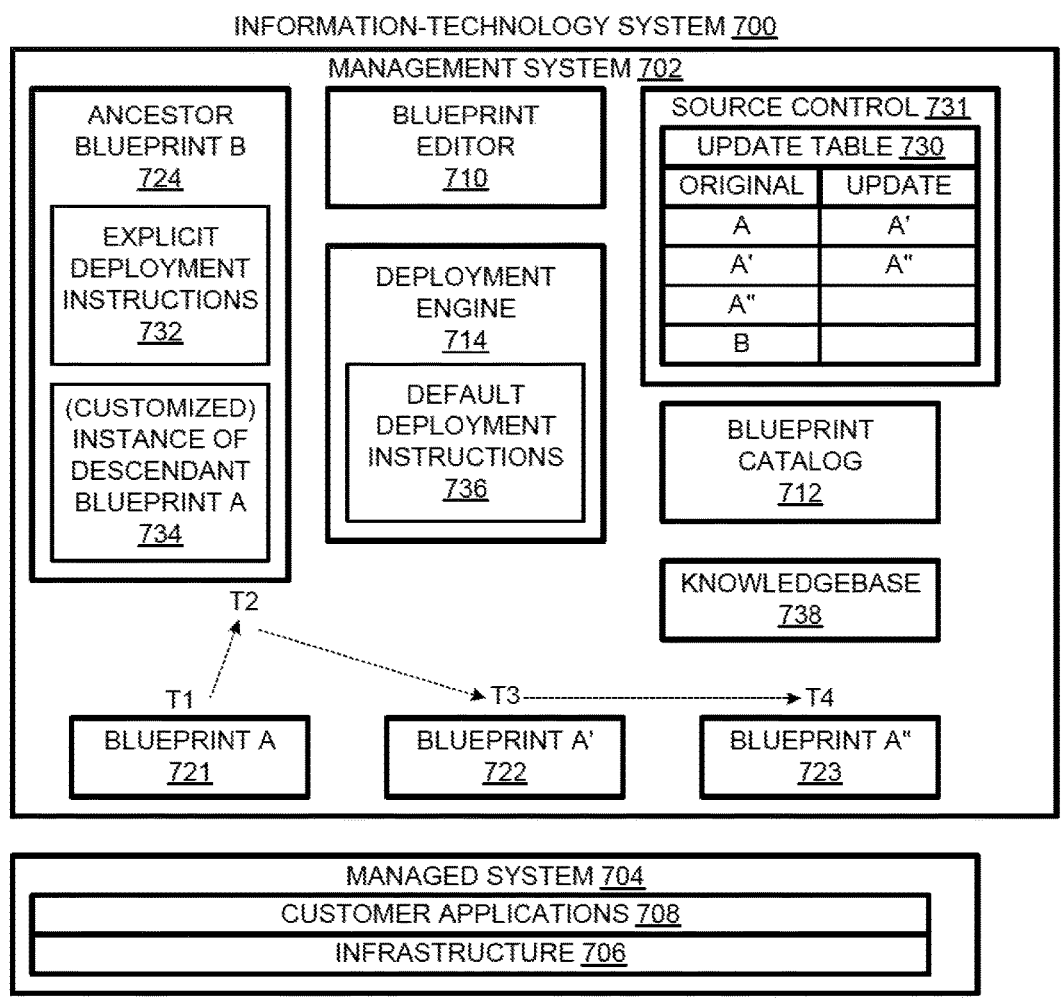
FIG. 7 is a schematic diagram of an information-technology (IT) system including a management system and a managed system.

As shown in FIG. 7, an IT system 700 includes a management system 702 and a managed system 704. The managed system 704 includes an infrastructure 706 configurable to run customer applications 708. Management system 702 includes a blueprint editor 710 for creating blueprints, updating blueprints, and publishing blueprints to a blueprint catalog 712. Management system 702 includes a deployment engine 714 for deploying blueprints to configure infrastructure 706 for customer applications 708.

Management system 702 includes a blueprint A 721, a blueprint A' 722, a blueprint A" 723, and a blueprint B 724. Blueprint A 721, which can be a single-machine server blueprint, was created at a time T1. Blueprint B 724, which was created at time T2, after T1, is a multi-machine blueprint that includes blueprint A 721 by reference. Given the inclusion relationship, blueprint B 724 may be referred to as a "parent" or "ancestor" of blueprint A 721, and blueprint A 721 may be referred to as a "child" or "descendant" of blueprint B. 724 A' 722 is an updated version of blueprint A 721 and was created at a time T3 after time T2. In other words, blueprint A' 722 was created too late to be included in blueprint B 724. Blueprint A" 723 was created at time T4, and is an update of blueprint A' 722 and thus is an update of blueprint A 721.

The version management can be based on revisions maintained by a source control system that's housing the blueprints as code. This relieves the system from reinventing the wheel on version management while also relieving users from learning a proprietary version management operational model. As shown in FIG. 7, the update relationships are represented in an update table 730 of source control 731.

Figure 8:
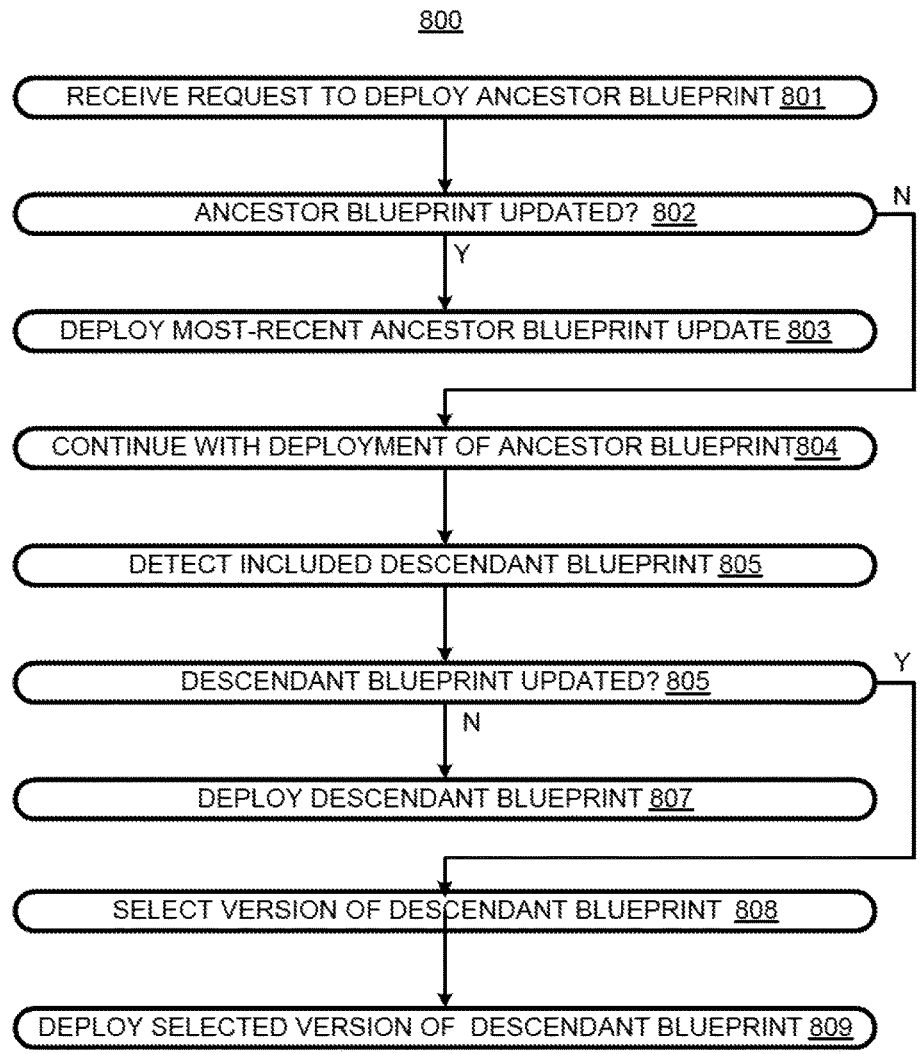
FIG. 8 is a flow chart of a blueprint deployment process applicable to the IT system of FIG. 7 and other systems.

In a blueprint deployment process 800, FIG. 8, a request to deploy an ancestor blueprint, e.g., blueprint B 724, is received, e.g., by deployment engine 714. At 802, a check is made, e.g., by inspecting update table 730, to determine if there is an update to the ancestor blueprint. In the event there is an update, the most-recent update to blueprint B would be deployed in lieu of blueprint B 724 at 803. In the event there is no update, process 800 continues deploying the original at 804. For a blueprint with no included descendants, process 800 would just continue until deployment is complete unless some exception condition is present. In the event there is an included descendant process 800 continues at 805.

At 805, it is determined that the ancestor blueprint includes a descendent blueprint. At 806, a check is made for updates to the descendent blueprint. In the event there is no update to the descendant blueprint, then, at 807, the included descendant blueprint is deployed. In the event that the descendant blueprint has been updated, then, at 808, a deployment criterion is used to determine which version of the descendant blueprint to deploy. For example, the most-recent version of the descendant blueprint may be selected. Then, at 809, the selected version is deployed.

If the developer of the ancestor blueprint does not want an update to be deployed in lieu of the original ancestor blueprint, explicit deployment instructions 732 (FIG. 7) can be included in ancestor blueprint 724 to that effect. Such an instruction can address the risk associated with deploying a blueprint that was not in existence at the time the ancestor was designed. Once the update has been thoroughly tested by the developer of the ancestor, the developer can issue an update to the ancestor blueprint that references the descendant update instead of the original descendant blueprint.

Alternatively, deployment instructions 732 can specify a selection criterion for selecting which version of a descendant blueprint to deploy. For example, the criterion can be to deploy the most-recent update that has been deployed a specified number of times or for a specified period of time. Such a criterion can reduce the risk associated with deploying a blueprint that was not tested at the time the ancestor blueprint was created. Note that, in some cases, selection criteria such as these may be implemented as default deployment instructions 734 for deployment engine 714.

In some cases, an update may render a descendant blueprint incompatible with an ancestor blueprint. For example, a descendant server blueprint may allow 1-4 single-core processors, with the exact number to be selected at deployment time. Deployment instructions in the ancestor blueprint may require that the maximum number (4) be selected. An update might use dual-core processors, but restrict the selection range to 1-2 processors. Upon deployment, the requirement to select 4 processors would conflict with the availability of at most two processors. A deployment time check could detect this incompatibility and revert to the original blueprint or to an intermediate update. More generally, the criterion could be to select the most-recent compatible version. For example, if second update blueprint A" 723 is incompatible with ancestor blueprint B but first update blueprint A' 722 is compatible, then first-update blueprint A' 722 (and not blueprint A" 723) would be deployed in lieu of original descendant blueprint A 721.

Note that a similar criterion could apply where the descendant blueprint or at least the number-of-processors parameter was instantiated in the ancestor blueprint. The concept of instantiation is discussed further below with reference to FIG. 3. The number-of-processors range could be reduced from 1-4 to 1-2 to yield a customized instance 734 of the descendant blueprint. Alternatively, some of the criteria could be implemented by default deployment instructions 736 of deployment engine 714.

In some embodiments, the selection criterion can take into account information stored in a knowledge base including information gleaned from prior deployments, e.g., of the updated blueprint. Since blueprints can be reused, there may be a case in which a failure resulted when an ancestor blueprint was deployed along with an update of a referenced blueprint. In a future deployment of the parent, the deployment engine could check a knowledge base that recorded the failure and, in view of the previous failure, select the original or an earlier update.

If the developer of a blueprint does not want an updated version of a referenced blueprint to be deployed in lieu of the referenced blueprint, then instructions to that effect can be included in the blueprint. In other words, a blueprint author can qualify the reference to another blueprint with a version, to have a stable (as opposed to a moving) target. Consider a marketplace where different vendors are publishing blueprints and a given blueprint author may refer to any of those blueprints. Over time there may be many updates to many of the referenced blueprints and some of these updates may not be compatible etc.

If the blueprint author specifies a version, the referenced blueprint version is deployed regardless of the availability of an updated version. Alternatively, a blueprint developer can specify conditions upon which the updated version would be deployed and conditions upon which the referenced version would be deployed. For example, the developer of a parent blueprint could allow an updated version of a referenced blueprint to be used provided some specified duration, e.g., six months, has passed since the updated version was published. This would, the thinking would go, ensure obvious problems would have been detected and addressed. In the absence of version-selection instructions within a blueprint, a deployment engine can implement any of the above as default selection instructions.

Figure 9:
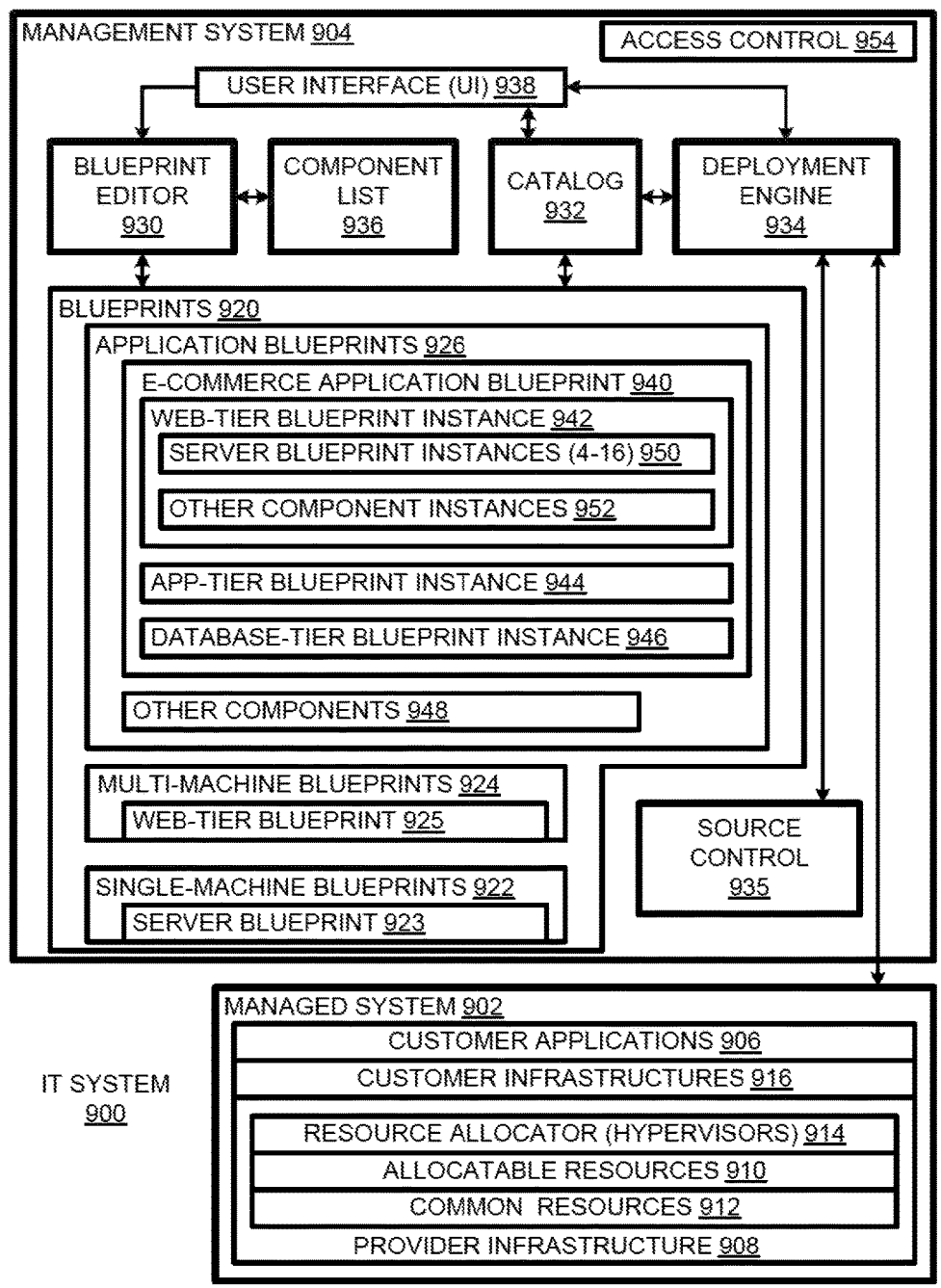
FIG. 9 is a schematic diagram of another IT system including a management system and a managed system.

As shown in FIG. 9, an IT system 900 includes a managed system 902 and a management system 904. Managed system 902 is used to execute customer applications 906. Managed system 902 includes a provider infrastructure 908 that includes allocable resources 910 and non-allocable common resources 912. Provider infrastructure 908 also includes a resource allocator 914 for allocating allocable resources among and within customer applications 916.

1 To be more specific, the provider infrastructure 908 can be a datacenter or a group of datacenters. Common resources 912 can include buildings, utilities, etc. Allocable resources 910 can include computer hardware such as processors, memory, storage, and network bandwidth. Allocable resources 910 can also include software such as operating systems, software utilities, security software, localizing software, and any other software, whether or not licenses are required. In addition, allocable resources 910 can include virtual versions of hardware and software resources. Resource allocator 914 can include workload managers and virtualization software such as hypervisors. Customer applications 902 can include e-commerce sites, social media sites, etc. Customer infrastructures 918, which can be virtual infrastructures, comprise the totality of resources "seen" by the respective customer applications 916.

Management system 904 functions to manage managed system 902. More specifically, management system 904 provides for the creation and management of customer applications 906. This includes configuring provider infrastructure 908 to support customer applications 906. To these ends, management system 904 maintains a set of blueprints 920, each of which embodies expertise useful for configuring provider infrastructure 908 to support respective customer applications 906. Blueprints 920 can be classified according to the types of expertise they represent, e.g., into single-machine blueprints 922 (including a server blueprint 923), multi-machine blueprints 924 (including a web-tier blueprint 925), and application blueprints 926. Other embodiments provide for other classifications of blueprints.

For example, a single-machine blueprint can contain the expertise required to configure a single physical or virtual machine for customer use. A multi-machine blueprint can embody the expertise required to configure provider infrastructure 908 to provide to a customer a networked arrangement of machines to function as a single-tier website.

An application blueprint, which can include multiple multi-machine blueprints, can embody the expertise to set up provider infrastructure 908 to support a complex customer application such as an e-commerce site Management system 904 includes a blueprint editor 930 for creating and updating blueprints 920. Once a blueprint has been developed and tested, it may be published to a catalog 932; a deployment engine 934 can deploy a blueprint from the catalog to implement and manage a customer application.

In addition, a newly created or updated blueprint can be published to a component list 936. Component list 936 is a list of blueprint building blocks that can be used in creating a blueprint. These components can include devices, software programs, procedures (e.g., scripts), etc. Many of the listed components are not themselves blueprints. However, as blueprints are developed, they can be included for use as components for other blueprints. For example, a single-machine blueprint can be included, e.g., by reference, in a multi-machine blueprint. A user interface 138 provides for user-friendly access to blueprint editor 930, catalog 932, and deployment engine 934.

For example, an e-commerce application blueprint 940, e.g., an online store, includes three multi-machine blueprints: a web-tier blueprint instance 942, an app-tier blueprint instance 944, a database-tier instance 946, as well as other components 948. The term "instance" is used to make it clear that the included child blueprint is not physically included in the parent blueprint. Rather, the child blueprint is included by reference or, in some embodiments, via blueprint instantiation. In either case, some parameters of the child blueprint are instantiated in the parent blueprint so that they may be customized via the parent blueprint application programming interface (API).

Moving down a level in the blueprint hierarchy, the web-tier blueprint instance 942 can specify a range of 4-16 servers based on single-machine blueprint instance 950. In other words, the web-tier blueprint developer is specifying a range for the number of servers to be included in a web tier of the e-commerce application; a specific number of servers can be selected during deployment planning for e-commerce application blueprint 940. Of course, web-tier blueprint instance 942 can include other component instances 950 as well. Thus, the developers of e-commerce application blueprint 940 can avail themselves of the expertises outside of their own by including in their blueprint 940 blueprints developed by others with differing expertise.

Management system 904 includes access control 954 to: 1) exclude unauthorized users from management system 904; and 2) control access of authorized users according to their roles and associated expertises. For example, a multi-machine blueprint developer may be permitted to include a single-machine blueprint in a multi-machine blueprint, but may be prohibited from editing the single-machine blueprint or creating a new single-machine blueprint.

To address such limitations, the present invention allows a developer of a blueprint to indicate which parameters of a blueprint are modifiable and which are not modifiable by a developer of a parent blueprint. For example, flags associated with respective parameters can be set to preclude modification and "reset" to permit modification. Various default strategies include defaulting all parameters to modifiable, defaulting all parameters to unmodifiable, and defaulting parameters for which a choice of values is provided to modifiable and parameters for which a single value is specified to unmodifiable.

When a child blueprint is included in a parent blueprint, the modifiable parameters of the child blueprint are imported and instantiated in the parent blueprint. Initially, the values of the imported parameters match the values assigned to the corresponding parameters in the child blueprint. However, the values of the imported parameters can be modified by the developer of the parent blueprint. For example, the choices available may be narrowed even to the point of selecting a specific value. For example, a server blueprint may specify a range of 1-8 processors. In the imported instance of the server blueprint parameter, the range can be narrowed to 4-8, for example, or even set at the specific value of 6 processors. In the illustrated embodiment, selecting a subset (e.g., a subrange) or performing any other modification that is consistent with constraints in the source blueprint is referred to as "customization". Thus, in some embodiments, the developer of the parent blueprint may customize but not otherwise modify the values of imported parameters.

The customizations to the imported parameters do not affect the source child blueprint. Upon deployment of the parent blueprint, the child blueprint is requested. The deployment engine checks for customization in the parent blueprint and applies the customizations instead of the original parameter values in the child blueprint.

Thus, for example, when the server blueprint 923 was included in a web-tier blueprint 925, the web-tier blueprint developer specified a range (4-16) in the number of server instances that were to be deployed. Inclusion (by reference to the web-tier blueprint 925) into e-commerce application blueprint 950 resulted in web-tier blueprint instance 925, which initially specified that the number of servers to be deployed was 4-16, following the values of the original web-tier blueprint 925. However, the developer of e-commerce application blueprint 940 can customize the number-of-servers parameter, e.g., to specify 8-12 servers. At the time of deployment of e-commerce application blueprint 940, the number of servers provisioned for web-tier blueprint 925 will be selected from the customized range of 8-12 rather than the original range of 4-16.

For another example, a number-of-processors (per server) parameter for server blueprint 923 can have as its value a range of 1-8 processors. Once the number of processors parameter is imported and instantiated into web-tier blueprint 925, that value can be customized to 4-8 processors. Once the web-tier is included in e-commerce blueprint 940, the number-of-processors parameter can be imported and instantiated into e-commerce blueprint 940 as one of the parameters of web-tier blueprint 925. At that point, the number-of-processors parameter can be further customized, e.g., to specify exactly 4 processors. In that case, when the e-commerce application blueprint 940 is deployed, its servers will be provisioned with 4 processors each.

Figure 10:
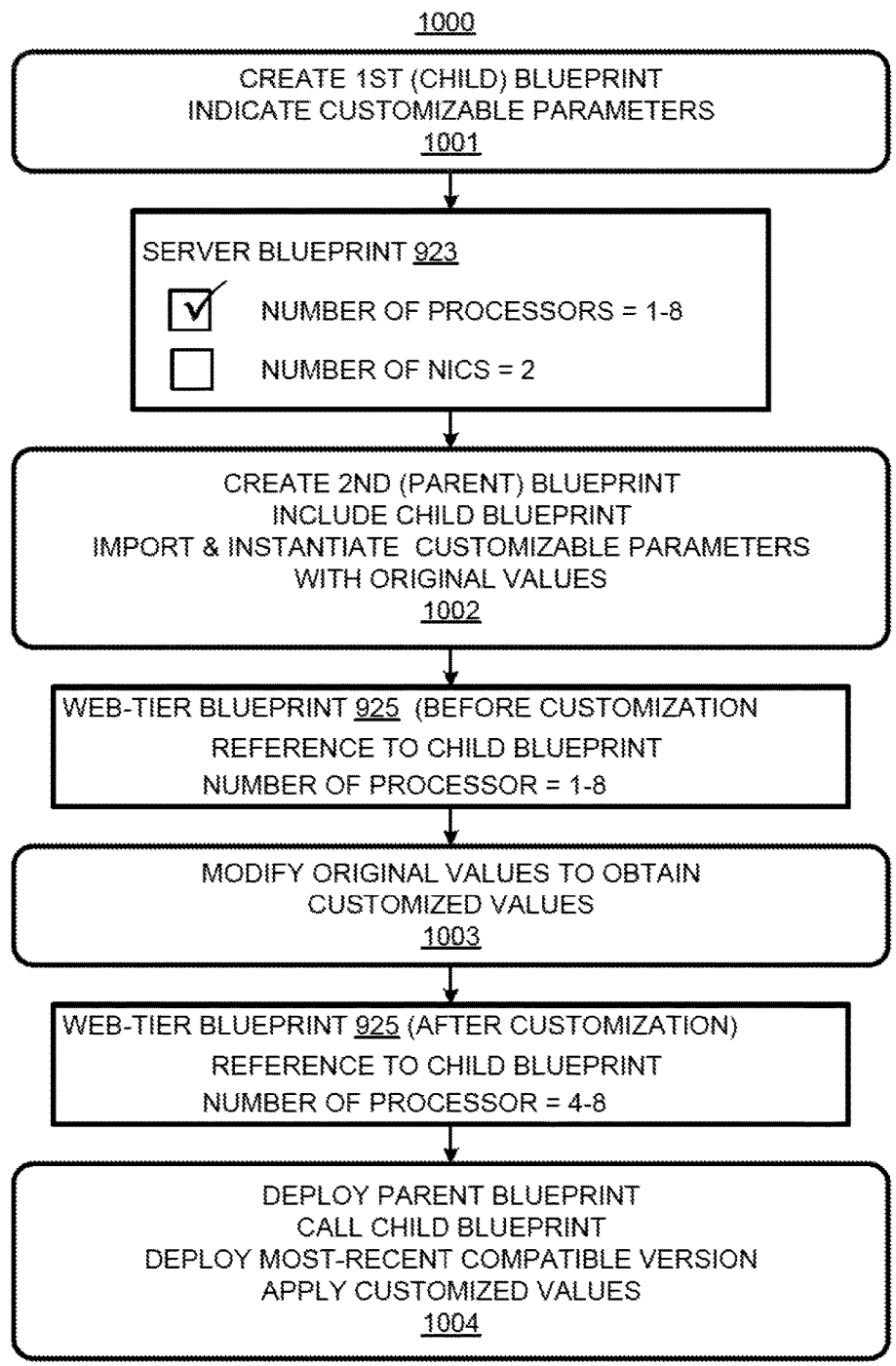
FIG. 10 is a flow chart of a process for creating and deploying blueprints applicable to the IT system of FIG. 9 and other systems.

A blueprint process 1000 is flow-charted in FIG. 10. At 1001, a first (child-to-be) blueprint is created with indications distinguishing customizable or otherwise modifiable parameters from non-customizable parameters. An example result shows server blueprint 923 with a customizable (as indicated by the check mark in a check box in FIG. 10) number-of-processors parameter with a range of 1-8 processors. In addition, a non-customizable number (as indicated by an empty check box) of network interface cards (NIC) is shown with a value 2.

At 1002, a second (parent) blueprint is created including the first (child) blueprint by reference. In view of the reference to the child blueprint, its customizable parameters are imported and instantiated into the parent blueprint. In an example result, a web-tier blueprint 925 includes a reference to the child blueprint 923 and a number-of-processors parameter with a value range of 1-8, the same as the range for the corresponding parameter in the first (child) blueprint.

At 1003, the developer of the parent blueprint modifies the original values of the imported customizable parameters to yield customized values. In the example web-tier blueprint 925, the number-of-processors customizable parameter has been narrowed to a value range of 4-8. As shown at FIG. 11, at this point the web-tier blueprint 925 includes an application programming interface (API) 1101, web-tier parameters and indications 1103, a reference 1105 to the child blueprint 923, and instantiations of child parameters into the parent blueprint. The indications indicate which parameters are customizable and which are not. Instantiations 1107 of parameters imported from child blueprint include a "number-of-processors" parameter, the range of which has been customized to 4-8.

At 1004, (FIG. 10) the parent blueprint is deployed. As part of the deployment, the child blueprint or the most-recent compatible update thereof is requested. However, it is the customized values rather than the original values in the called child blueprint that are applied. The number of processors provisioned per server will be selected from the range of 4-8, and not selected from the range 1-8. Of course, the value selected will be in the range from 1-8, but only in that part of the range within the sub-range 4-8.

The customizable parameters imported from the child blueprint are, in effect, parameters of the parent blueprint. Accordingly, these customizable parameters may be indicated to be customizable or non-customizable by the parent blueprint developer. In either case, they remain customizable by the parent blueprint developer. However, the indications will affect the ability of a grandparent blueprint developer to customize them. If they are indicated to be customizable, then the developer of the grandparent blueprint that includes the parent blueprint will be able to customize them, as indicated in process 600, FIG. 6, which is a possible continuation of process 1000.

Blueprint process 1200 is flow-charted in FIG. 12. At 1201, a third (grandparent) blueprint, e.g., e-commerce application blueprint 926, is created including the second (parent) blueprint, e.g., web-tier blueprint 925, by reference. Customizable parameters of the parent blueprint are imported and instantiated into the grandparent blueprint. Assuming the developer of the parent blueprint indicated that the parameters imported from the child blueprint were customizable, the child parameters are included in the parameters imported to the grandparent blueprint. If the child parameters were modified in the parent blueprint, it is the modified versions that are imported to the grandparent blueprint.

At 1202, customizable parameters are modified in the grandparent blueprint. If the customizable parameters from the child blueprint were modified in the parent blueprint, it is the modified parameters that are imported. In that case, the customizable parameters originating at the child blueprint are modified a second time, i.e., they are re-customized.

At 1203, the grandparent blueprint is deployed. As part of deployment, the parent and child blueprints are requested. However, the customized parameters are applied instead of the original values in the child and parent blueprints. In the case of the re-customized child parameters, provisioning may be based on a value selected from a range defined by the re-customized child parameter.

Figure 13:
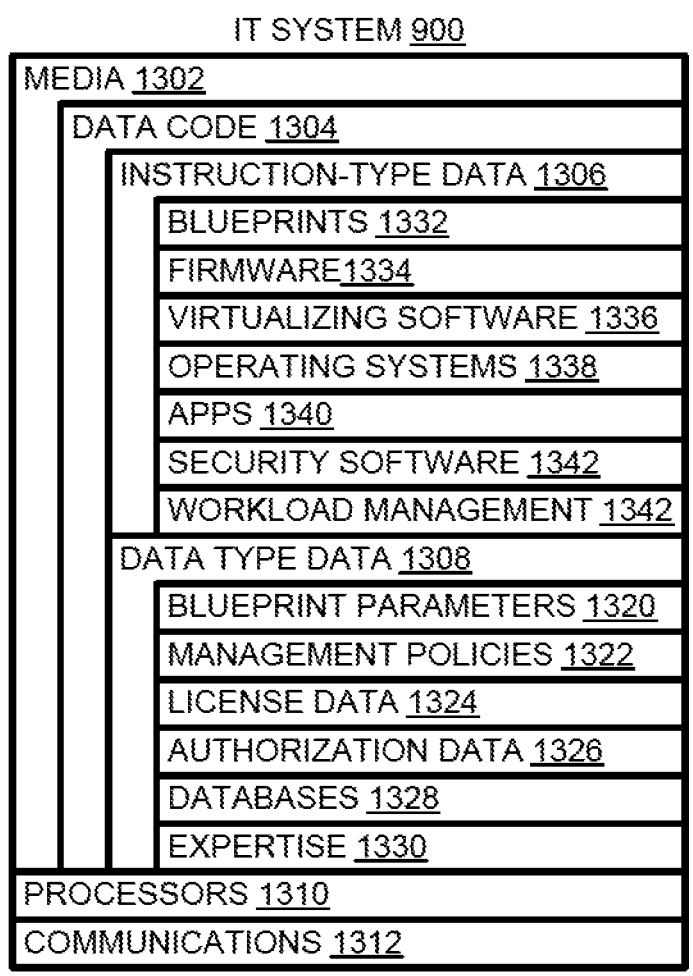
FIG. 13 is an abstract representation of the IT systems of FIGS. 7 and 9.

In the abstract view of FIG. 13, IT system 900 is shown including media 1302 for storing data code 1304. Data code 1304 includes physical representations of instruction-type data 1306 and data-type data 1308. Processors 1310 provide for manipulating data-type data in accordance with instruction-type data. Communications devices 1312 provide for receiving and transmitting data, e.g., over a network.

Examples of data-type data 1308 (aka, "data") include blueprint parameter values 1320, management policies 1322, license data 1324 (e.g., how many licenses are available and how many of those are active), authorization data 1326 (e.g., who is authorized to do what), databases 1328, and expertise 1330 (e.g., knowledge base documents). Examples of instruction-type data 1304 (aka "instructions") include blueprints 1332 (as they include executable scripts, etc.), firmware 1334, virtualizing software 1336, operating systems 1338, apps 1340, security software 1342, and workload managers 1344.

Figure 14:
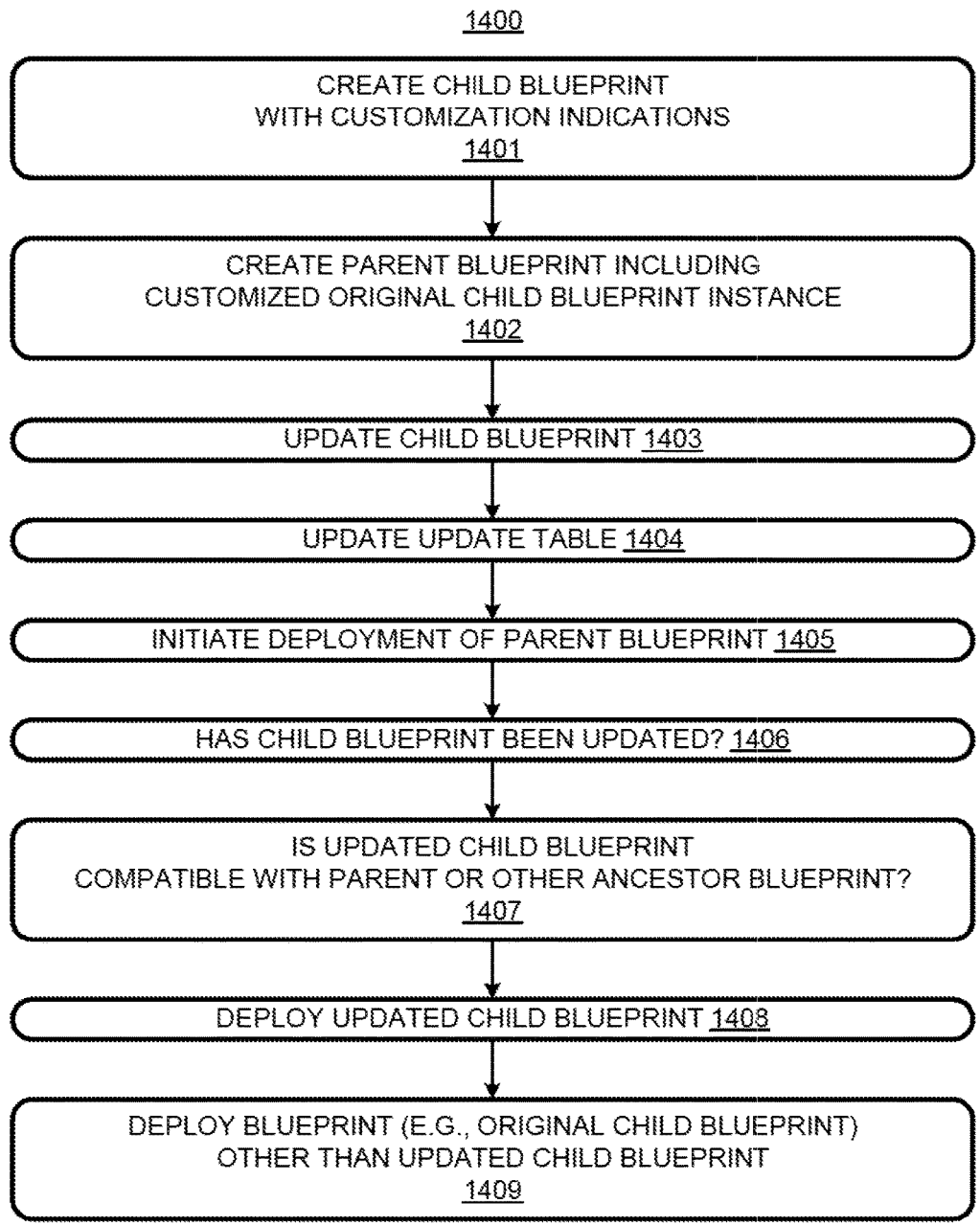
FIG. 14 is a flow chart of a blueprint process applicable to the IT systems of FIGS. 7 and 9.

A blueprint process is flow-charted in FIG. 14. At 1401, a first (child-to-be) blueprint is created. In some embodiments, the child blueprint includes customization indications indicating which parameters of the child blueprint can be modified in an instance of the child blueprint included, e.g., by reference, in a second or parent blueprint.

At 1402, a second (parent) blueprint is created including the child blueprint. At least some of the parameters of the child blueprint are instantiated in the parent blueprint. In other words, at least some of the parameters and associated values are copied from the child blueprint to the parent blueprint so that the values may be customized or otherwise modified in the parent blueprint without affecting the values in the child blueprint. For example, the parameters indicated to be customizable in the child blueprint may be instantiated in the parent blueprint. At least one value of a customizable parameter is changed for the instance instantiated into the parent blueprint so that the changed value differs from the original value for the customizable parameter. For example, a range of values may be reduced to a lesser included range or to a single numerical value.

In an alternative embodiment, child parameters are effectively modified in another way. For example, the parent blueprint can include instructions that select a value to be assigned to a parameter of the child blueprint upon deployment of the parent blueprint, as the child blueprint will be requested when the parent is deployed.

At 1403, the child blueprint is updated to yield an updated (child) blueprint. Unlike the customization provided for in an instantiation in a parent blueprint, the modifications involved in updating a blueprint are essentially unlimited. They can include range reductions, but also range extensions. The modifications can also include adding and removing components, adding and removing parameters, and modifying instructions or policies. In some embodiments, an update table is updated at 1404 indicating that the child blueprint has been updated to the yield updated blueprint.

At 1405, deployment of the parent blueprint is initiated, e.g., in response to a customer request. In some embodiments, deployment is divided into a planning phase and an implementation phase. In either case, deployment of the parent blueprint will result in calling the child blueprint for deployment. However, before deployment of the child blueprint begins, a source control checks, at 1407, e.g., using an update table, whether or not the child blueprint has been updated.

If there is an update, the compatibility of the update with the parent blueprint is checked at 1407. If the update is compatible, it is deployed in lieu of the original at 1408. If the update is not compatible, then, at 1409, it is not deployed. Depending on the scenario, the original (or an intermediate update) is deployed. Of course, if, at action 1407, the child blueprint was not updated (at 1403), the original child blueprint is deployed at 1409.

For example, a single-machine server (child) blueprint might call for 1-4 32-bit processors, with the 32-bit word size being a non-customizable parameter, and the number-of-processors parameter being indicated to be customizable. The server blueprint is included by reference into a multi-machine website blueprint that customizes the number-of-processors parameter to the single value 4. The child blueprint is updated to require 1-2 64-bit processors. In that case, the updated blueprint cannot meet the requirement of the parent blueprint for 4 processors per server. Accordingly, the original blueprint is deployed. However, if the parent blueprint specified a range of 2-4 processors, the updated blueprint would be deployed with two processors.

In addition to updating blueprints at authoring time and requesting time, it is possible to apply an updated version to an already deployed application, e.g., a deployment instance of a prior version of a blueprint. An "upgrade deployment" can allow a deployment owner to upgrade an application to latest version while the deployment engine determines the workflow required to upgrade, using the delta between blueprint version associated with deployment and the version to which the upgrade is targeting. The updated blueprint can include the allowed prior blueprint version from which upgrade is possible. Sometimes, a deployment with v1 of a blueprint cannot be directly upgraded to v5 of blueprint. So getting from v1 to v5 could involve multiple upgrade operations. The upgrade operation, like other deployment operations, can be a multi-phased activity that involves entitlements, approvals, blueprint enhancement etc.

Herein, "system" refers to a set of interacting elements, wherein the elements can be hardware components, physically encoded software elements, atoms, actions, etc. A process is a system in which the elements are actions. Computers, infrastructures, and IT systems are examples of systems. Computers include media (e.g., random access memory or RAM and hard disks), processors, and communications devices (e.g., network interface cards) cabling, buses, etc.).

Herein, "virtual" means "not something but made to appear as if it were". For example, a virtual machine is not a machine but is made to appear (e.g., to a guest operating system) as if it were a machine through software processes. "Virtual" is the opposite of "real". Both hardware and physically encoded software are real, so there can be virtual hardware and virtual software.

A "blueprint" is an executable document that defines an object and contains the expertise to produce and operate that object. For example, the object can be a real or virtual machine, multi-machine system, or application. Deploying the blueprint results in an object meeting the specifications of the blueprint or blueprint component. The resulting object can be said to be an "instantiation" or "instance" of the blueprint or blueprint component. An instantiation can typically be modified without modifying the source blueprint/component.

As explained above, blueprints can be arranged in an inclusion hierarchy, wherein a "parent" blueprint can include, by reference or instantiation, a "child" blueprint. "Parent" and "child" are relative terms; a blueprint can be a parent of one blueprint and a child of another blueprint. However, for convenience of reference, a parent blueprint of a parent blueprint can be referred to as a "grandparent" blueprint. Similarly, "ancestor blueprint" is defined relative to "descendant blueprint". An ancestor blueprint includes, directly or indirectly through one or more intermediate blueprints, a descendant blueprint. An "updated blueprint" is a revision, e.g., of an original blueprint that can assume the functions of the original blueprint if used in lieu of the original blueprint.

A typical blueprint contains a number of parameters to which values are or can be assigned. Values can be scalars (e.g., 5), ranges (e.g., 4-8), non-numerical values (e.g., "Texas"), etc. Where a child blueprint is instantiated in a parent blueprint, the parameters of the child blueprint are instantiated in the parent blueprint by default. Where a child blueprint is included in a parent blueprint by reference, the present invention provides that some parameters of the child blueprint can be instantiated in the parent blueprint, thus becoming parameters of the parent blueprint. A parameter is "modifiable" if the value assigned to an instantiation of the parameter in a parent blueprint can be modified without modifying the child blueprint. A parameter is "customizable" if it is modifiable only within constraints set by the child blueprint.

Herein, a blueprint "developer" is a human, group of humans, or other entity that creates a blueprint. In the examples, it is generally assumed that the developer of a parent blueprint is not authorized to modify the child blueprint, e.g., using the API of the child blueprint. However, the invention permits the developer of the parent blueprint to modify the value of an instantiation of a modifiable parameter of an included child blueprint via the API of the parent blueprint.

Thus, a developer of a parent blueprint that is not authorized to modify a child blueprint directly, can, in effect, modify the child blueprint in the context of the parent blueprint. There is no need to request the developer of the child blueprint to make the needed modifications. Yet, updates to the child blueprint can be taken advantage of at the time of deployment of the parent blueprint.

A blueprint process comprises: creating a descendant blueprint; creating an ancestor blueprint including the descendant blueprint; initiating deployment of the ancestor blueprint so as to call the descendant blueprint; and deploying an updated blueprint in lieu of the descendant blueprint, the updated blueprint being an update of the descendant blueprint. The blueprint process further comprises determining whether or not the updated blueprint is compatible with the ancestor blueprint, the deploying only occurring in the event it is determined that the updated blueprint is compatible. The blueprint process of further comprises, in the event it is determined that the updated blueprint is not compatible with the ancestor blueprint, deploying the descendant blueprint.

The blueprint process further comprises, in the event it is determined that the updated blueprint is not compatible with the ancestor blueprint, deploying a blueprint other than the updated blueprint in lieu of the descendant blueprint. In the blueprint process, the blueprint deployed in lieu of the descendant blueprint is a compatible update of the descendant blueprint created before the incompatible update. In the blueprint process, the creating of the ancestor blueprint includes importing and instantiating parameters of the descendant blueprint into the ancestor blueprint and modifying values of an instantiated parameter, the incompatibility between the updated blueprint and the ancestor blueprint resulting in a mismatch between the modified values and the original values in the descendant blueprint. In the blueprint process, the ancestor blueprint is a parent of the descendant blueprint.

A blueprint is an executable document that describes a real object and includes the expertise to create and operate that object. A "parent" blueprint can include a "child" blueprint, e.g., by reference. When the parent blueprint is deployed to configure a computing architecture for a customer application, the child blueprint is requested for deployment. A check of an update table is made. If there is an update of the child blueprint that is compatible with the parent blueprint, then the most-recent compatible update of the child blueprint is deployed in lieu of the requested child blueprint.

Entitlement Checks for Information-Technology Blueprints

Enterprises are increasingly reliant on computer-based applications for business operations. However, the costs, effort, and expertise required to acquire, configure, maintain, and update the infrastructure required to run those applications can be burdensome. Infrastructure-as-a-Service (IaaS) providers offer the option of allowing enterprises to subscribe to a virtual infrastructure. The IaaS providers then assume responsibility for the virtual infrastructure and the hardware infrastructure on which the virtual infrastructure is based. The enterprise is then free to focus more on its basic business and less on the computer system helping to run it.

Of course, the burdens associated with the infrastructure do not disappear; they are merely shifted to the IaaS provider. In fact, the burdens are increased because the IaaS provider may have to configure an infrastructure to meet the differing requirements of its diverse customers. Expertise in computer hardware, networking, storage systems, operating systems, databases and other software applications, security, compliance, workload management, and other areas are required. Therefore, the IaaS provider has the multi-disciplinary challenge of coordinating the efforts of experts in different subject matters.

Information-technology (IT) blueprints are executable documents embodying expertises for creating and managing a target object, such as a server or an e-commerce site. For example, a blueprint for an e-commerce site might embody not only the expertises required for configuring hardware and managing sales, but also, the legal and industry knowhow to ensure compliance with applicable laws, regulations, industry best-practices, and contractual terms. Deploying such an e-commerce blueprint results in a "ready-to-go" customer e-commerce "application".

A blueprint may be provided by a cloud-service provider for use by customers. The customers may have differing criteria for determining whether or not a deployment request should be approved. For a given customer, the criteria may vary over time. For example, a customer may have contracted for a certain level of service from a cloud provider, so a deployment request would only be approved if the resulting customer application would be within the agreed-upon level of service. For customers on a pay-as-you go plan, various budgetary constraints may be imposed that may depend on a variety of factors, such as how well the customer's business happens to be doing. While, in principle, the various approval criteria might be incorporated into a blueprint, the frequent updating of blueprints entailed would be infeasible.

The present invention provides for automated deployment-time entitlement checks. The customer specifies approval criteria; the criteria are external to the blueprints. The entitlement criteria are checked in response to a deployment request. In the event that the deployment process generates provisioning plans, the entitlement check can be of a plan generated from a blueprint rather than a check of the blueprint itself. One advantage of a deployment-time entitlement check is that as soon as an entitlement criterion is added or changed, it will be applied without any need to update the blueprint itself.

An entitlement is a right to use, which is an asset. However, the implication is that there is an upper limit to the right. If a customer application requests resources in excess of the entitlement amount, it may not receive the requested amount, or the customer may be financially penalized for the excess usage. To avoid the problems associated with reaching an entitlement ceiling, in some cases, a monitoring system can warn a customer that an entitlement ceiling is being approached so that the customer can make adjustments before the ceiling is reached.

However, when an IT blueprint is deployed to create a customer application, there may be a sudden jump in resource usage that can cause entitlement thresholds to be hit or exceeded. As a result, the new application may fail to function, perform below requirements, and/or incur penalties. If there are other applications running under the same customer account, these may be adversely affected when the aggregation of applications hits entitlement limits. It may be possible to ramp up the new application slowly enough for the entitlement monitoring system to warn of the entitlement shortfall. However, this would prolong deployment and still require some sort of roll back of the deployment. Deployment can be expensive, especially if it fails due to the violation of entitlement constraints.

Accordingly, the present invention provides entitlement evaluations of blueprints to anticipate the effect of a deployment on entitlements. Thus, a deployment of a customer application can be halted before resources are committed to it and the time and expense involved in rolling back a deployment can be avoided. For embodiments in which the entitlements associated with a blueprint can change, the entitlements associated with the blueprint can be checked at deployment time, e.g., during a planning phase to help ensure that entitlement evaluation is up to date.

There are a number of reasons the amount of entitlements associated with deployment can change from deployment to deployment. The basis of the entitlement business model may change. For example, the business model for a software program may be changed from being based on a number of processors to being based on an amount of memory consumed. In such a case, the amount of entitlements would likely change along with the business model change.

If a blueprint is modified, then the entitlement analysis should be performed after the modification. However, if the modification is to a blueprint referred to by another blueprint, the developer of the referring blueprint may not be aware of the modification and, therefore, the need to update the entitlement analysis. Even if modification of an included blueprint is precluded, a system might have a version control system in which the most-recent update of an included blueprint is deployed in lieu of the blueprint included by reference in a deployed blueprint. Accordingly, the entitlement evaluation will most-likely remain valid if performed after the decision regarding which version of a blueprint to deploy is made.

Each blueprint is characterized by a set of parameters and values assigned to those parameters. For some parameters, the values may be ranges rather than simple numerical values. For example, the intent may be to allow a selection of a scalar value (e.g., 3) within the range (e.g., 1-4) at deployment time. For such blueprints, a deployment time blueprint analysis is the most valid.

Some deployment schemes separate deployment into a planning phase, in which no substantive changes are made, and a provisioning phase in which physical changes are made to implement the customer application. Performing the entitlement analysis after the plan is complete but before provisioning begins ensures a valid entitlement evaluation.

Figure 15:
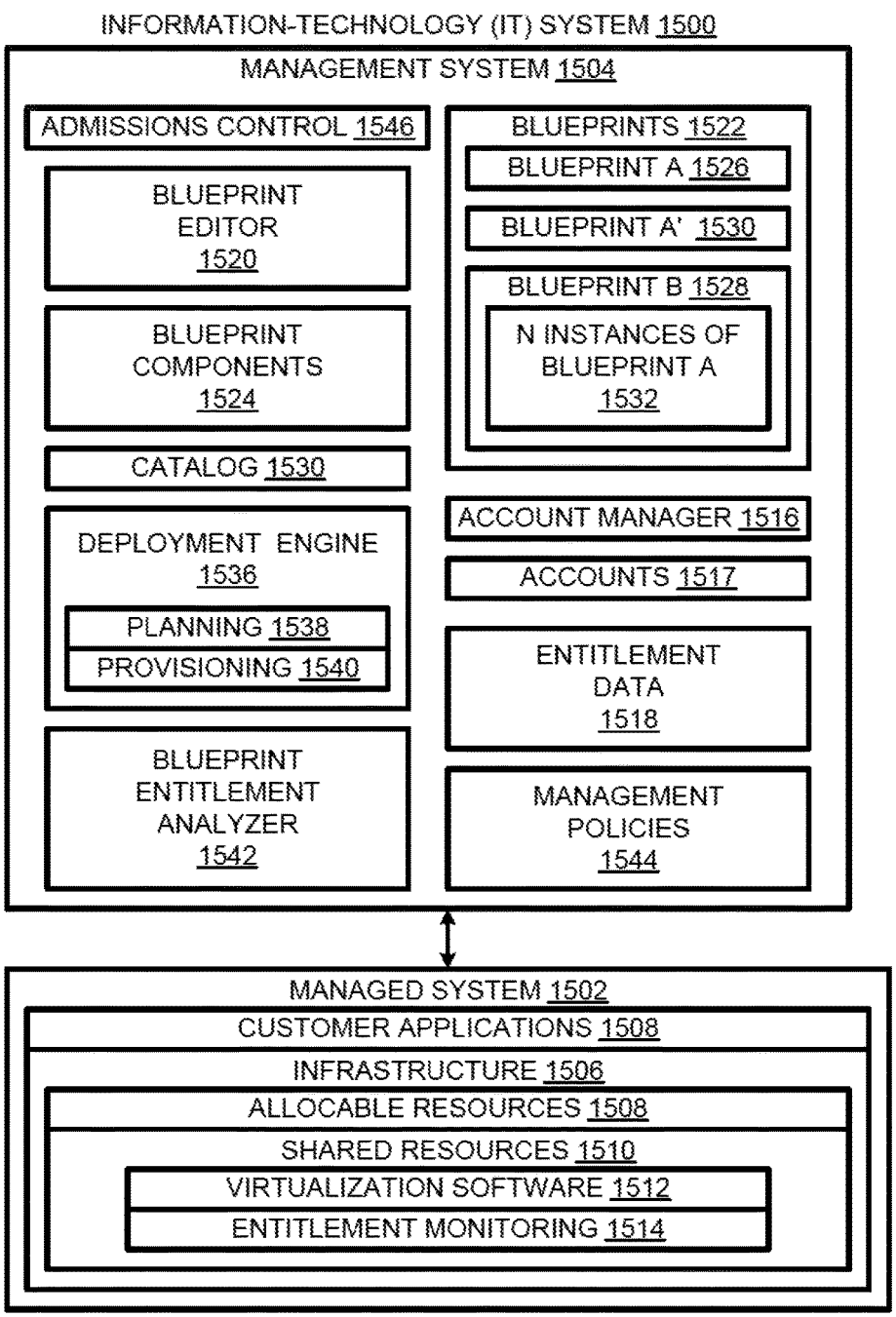
FIG. 15 is a schematic diagram of an information-technology (IT) system including a management system and a managed system.

As shown in FIG. 15, an information-technology (IT) system 1500 includes a managed system 1502 and a management system 1504. Managed system 1502 includes an infrastructure 1506 for supporting customer applications 1508. Herein, a customer application is a top-level mission for which a customer uses IT system 1500. For example, if a customer uses computing environment 1500 to operate an e-commerce website, then the e-commerce website can be the customer application.

Infrastructure 1506 includes allocable resources 1508 and shared resources 1510. Allocable resources 1508 include real and virtual hardware and software, e.g., processors, memory, storage, communications devices that may be allocated among customer applications 1508. Shared resources 1510 include non-allocable resources such as virtualization software 1512, entitlement monitoring software 1514, security hardware and software, buildings for housing other computing resources, etc.

Management system 1504 manages managed system 1502. To this end, management system 1504 includes an account manager 1516 for creating and maintaining customer accounts 1517. Associated with each customer account 1517 can be a quantity of entitlements, e.g., for the total amount of VRAM (Video Random Access Memory) that can be associated with a respective customer account. The entitlements associated with customer accounts 1517 can be stored as entitlement data 1518. Entitlement data 1518 can also include entitlement data not associated with the account per se. For example, a customer may have installed software, e.g., database software, that is not provided by the IT system vendor, but is required by the customer application and is subject to entitlement limitations.

Management system 1504 includes a blueprint editor 1520 for creating and updating IT blueprints 1522 using blueprint components 1524 as building blocks. The building blocks 1524 include basic building blocks, which are not blueprints themselves, and blueprints that can be included, e.g., by reference, in other blueprints. Thus, a blueprint developed by a developer with one expertise can leverage the work of a developer with a different expertise by including a blueprint developed by the latter into a blueprint being developed by the former.

Blueprints 1522 are shown including, in order of creation, a blueprint A 1526, a blueprint B 1528, and a blueprint A' 1530. Blueprint A 1526 was created first so it was available for inclusion when blueprint B 1528 was created. Thus, blueprint B 1528 includes, by reference, an instance 1532 of blueprint A 1526. In other words, blueprint B 1528 is a parent/ancestor of blueprint A 1526, which can be considered a child/descendant of blueprint B 1528. Once a blueprint 1522 has been created, editor 1520 can be used to publish it to a blueprint catalog 1534, so that it can be deployed on behalf of a customer.

Blueprint A' 1530 is an update of blueprint A 1526; the update has the same basic functionality as the original, but includes some improvements. Blueprint A' 1530 was created after blueprint B 1528 and so was not available for inclusion at the time blueprint B 1528 was created. However, upon deployment of blueprint B, a deployment procedure can select blueprint A' 1530 for deployment in lieu of blueprint A 1526. Thus, a provisioning plan generated during deployment would reflect updated blueprint A' 1530 rather than A 1526 (which was in the blueprint B 1528 but would not be represented in the customer application when deployed after blueprint A' 1530 was published). Accordingly, an entitlement check of the provisioning plan could be more valid than an entitlement check of the blueprint itself. Further, a provisioning plan could reflect deployment policies not represented in the blueprint itself, so, again, an entitlement check of the provisioning plan is favored.

A blueprint can be deployed using a deployment engine 1536. Deployment can be divided into a planning phase 1538 and a provisioning phase 1540. The planning phase 1538 is used to determine a sequence of actions to be used in the provisioning phase 1540. In the provisioning phase 1540, application components are installed and resources are assigned to the application components.

Before deployment is complete, e.g., during planning phase 1538, deployment engine 1536 requests an entitlement analysis by blueprint entitlement analyzer 1542. Blueprint entitlement analyzer 1542 determines the amount of a resource to which entitlement constraints apply required by a blueprint for which deployment is proposed or requested. The amount determined includes amounts for included (i.e., nested) blueprints. The amount determined is compared to an amount of unused entitlements as indicated by entitlement data 1518. If the amount of unused entitlements meets or exceeds the amount required by the blueprint, deployment may proceed, e.g., to completion.

If the blueprint's entitlement requirement cannot be met by available entitlements, then entitlement policies 1544 are checked. These policies 1544 may call for aborting or postponing deployment. Alternatively, an automated procurement policy may permit deployment to proceed after additional entitlements are procured.

An admissions control function 1546 provides for authentication and permissions control of users. For example, access to blueprint development functions may be limited to developers with the expertise require to develop blueprints of a particular type. Experts for other blueprint types and non-experts may not have permissions for creating and editing a blueprint of that type.

Figure 16:
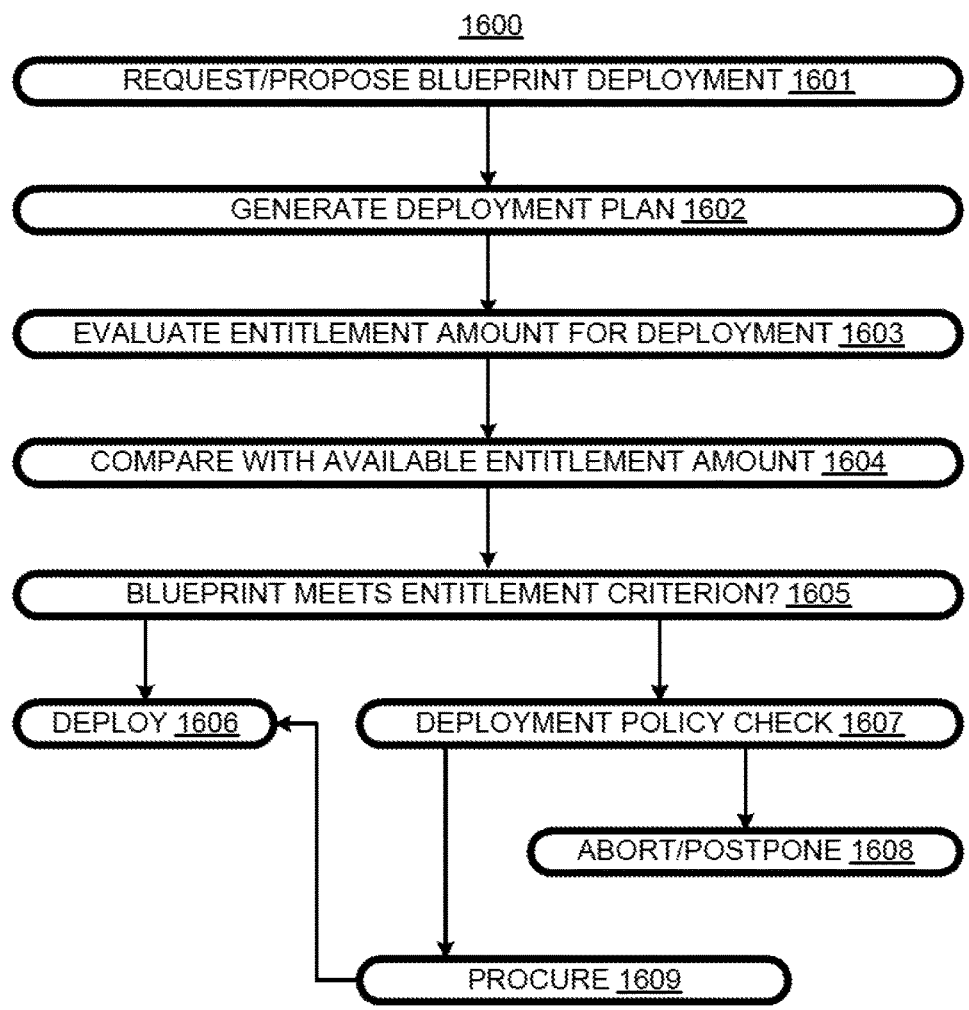
FIG. 16 is a flow chart of a blueprint deployment process applicable to the computing environment of FIG. 15 and other systems.

A blueprint process 1600, flow-charted in FIG. 16, may be implemented by IT system 1500 and other systems. At 1601, a request or proposal is received for deployment of a blueprint. A request is a message that, if fulfilled, will result in deployment of the blueprint. A proposal is a message for which the fulfillment will result in an indication of whether or not the blueprint will be approved for deployment, if deployment is requested.

At 1602, a deployment plan is generated (as a first phase of the deployment process). The deployment may reflect features not called for by the blueprint itself, for example, features called for by an updated version of a blueprint or by deployment policies. In some embodiments, there is no separate planning phase. Instead, planning and implementation proceed concurrently.

At 1603, the blueprint is evaluated to determine the amount of entitlements required to deploy the blueprint. The analysis can be of the blueprint directly or of the plan generated from the blueprint. At 1604, the deployment entitlement amount is compared to an available entitlement amount. The available entitlement amount can be determined as the difference between a total entitlement amount and an amount of entitlements currently in use.

At 1605, a check is made to determine if the blueprint meets an entitlement criterion. Typically, the entitlement criterion can be expressed as a requirement that, for each resource to which an entitlement applies, the available amount of the applicable resource is greater than or equal to the amount required by the blueprint. In some embodiments, a headroom criterion may be included. Note that the check can occur any time before implementation begins. At 1606, in the event that the entitlement criterion is met, deployment proceeds (e.g., to completion unless some other policy calls for not deploying).

If, at 1605, the entitlement constraint is not met, a deployment policy is checked at 1607. Depending on the deployment policy, deployment may be aborted or postponed at 1608. In some cases, an automated procurement procedure, at 1609, may cause the amount of entitlements to increase to allow deployment to proceed at 1606.

Figure 17:
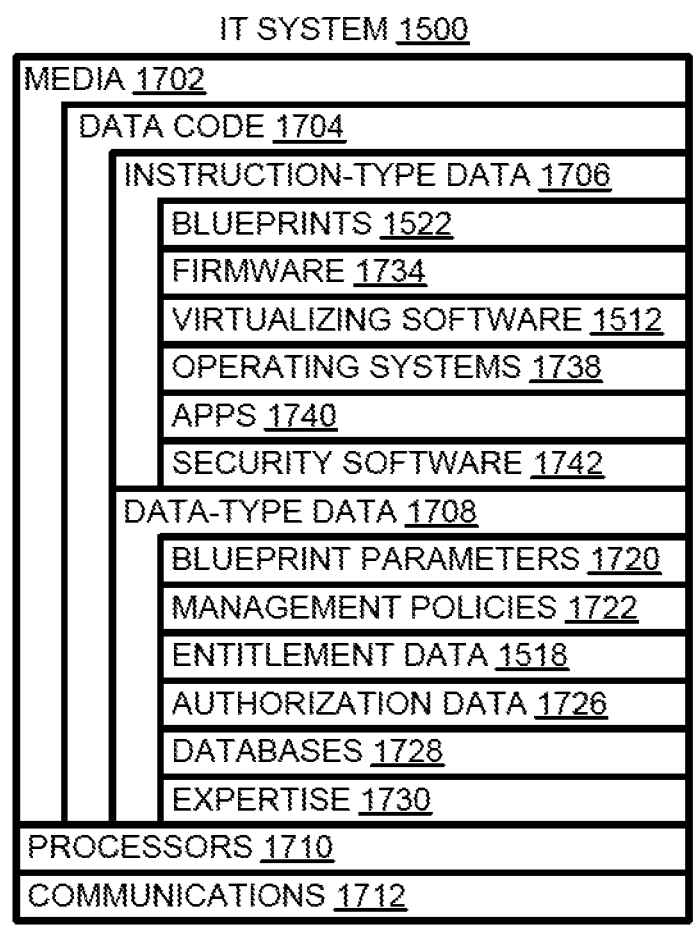
FIG. 17 is an abstract representation of the IT system of FIG. 15.

In the abstract view of FIG. 17, IT system 100 is shown including media 1702 for storing data code 1704. Data code 1704 includes physical representations of instruction-type data 1706 and data-type data 1708. Processors 1710 provide for manipulating data-type data in accordance with instruction-type data. Communications devices 1712 provide for receiving and transmitting data, e.g., over a network.

Examples of data-type data 1708 (aka, "data") include blueprint parameter values 1720, management policies 1722, license data 1724 (e.g., how many licenses are active), authorization data 1726 (e.g., who is authorized to do what), databases 1728, and expertise 1730 (e.g., knowledge base documents). Examples of instruction-type data 1704 (aka "instructions") include blueprints 1732 (as they include executable scripts, etc.), firmware 1734, virtualizing software 1736, operating systems 1738, apps 1740, security software 1742, and workload managers 1744. Some of the foregoing can be categorized as both data-type data and instruction-type data.

A key benefit from business perspective for a customer is 'DevOps without compromising security and governance'. Blueprints allow subject-matter experts to model best practice IT services and various people (developers, partners, etc.) to request deployment of these blueprints in a self-service manner or API-driven through an automated system. Entitlement checks add some quality gates to ensure corporate policies (such as security, compliance, budgetary) are not violated. In other words, entitlement checks provide a non-intrusive way to get visibility and drive enforcement of these policies.

Entitlements can be based on tangible assets like number of processors, i.e., Central-Processing Units (CPUs) requested, memory requested, or intangible assets like type of database product being used. For example, an enterprise may want to standardize on certain databases instead of using everything in the market. The policy can be only 'Oracle databases' in production, unless approved otherwise. So if a requested blueprint is using MongoDB, entitlements would trigger an approval workflow. Approval workflow communicating to specified approvers and getting their consent.

In essence, a requestor needs entitlement to request a blueprint. Entitlements in turn can trigger approvals based on criteria. The criteria can be based on contents of the requested blueprint, the requestor information itself, the values selected by the requestor at the request time. Approval/disapproval can be automated or involve a human component. For example, the alternative results of an entitlement check can include: 1) an automated approval; 2) an automated disapproval; and 3) forwarding the check for a decision from a human.

Many customers care more about cost than what is being requested. For example, it often does not matter to the customer whether the requestor is requesting 1 CPU or 4 CPU. What matters is that the request would exceed, e.g., a 20$/day quota. Accordingly, the present invention provides for a cost analysis, e.g., of a provisioning plan, and an entitlement decision based on the resulting cost.

Entitlement checks can be applied, not only for initial provisioning but for subsequent day2 operations. For example, tearing down a critical infrastructure resource might impact business and having a second pair of eyes (aka approvers) bless that action is safer.

Aggregating entitlements associated with individual components can ensure the act of composition (via blueprint) is not bypassing any component level entitlements. For example, a baseline database blueprint could be referenced in many different application blueprints. Instead of creating approvals for each application blueprint, it can be easier to create an approval for the database blueprint. By virtue of entitlement aggregation/harvesting, database approval will be triggered no matter which application blueprint is requested it. As another example, windows machines by themselves may not need approval; likewise, for Linux machines. But if a blueprint that includes both Windows and Linux is requested, that might need an approval. Such examples are enabled by giving an entitlements engine an ability to read/parse the blueprint and all component relations/data within the blueprint.

Since an entire blueprint or plan is evaluated for entitlements, approvers get information of the overall blueprint requested, as well as itemized accountings for any particular component they are directly approving. For example, each database approval triggered in the previous example will include the details of the overall request. So the approver has more business context and a bigger picture of what is going on.

Herein, "system" refers to a set of interacting elements, wherein the elements can be hardware components, physically encoded software elements, atoms, actions, etc. A process is a system in which the elements are actions. Computers, infrastructures, and physically-encoded computer programs are examples of systems. Computers include media (e.g., random access memory or RAM and hard disks), processors, and communications devices (e.g., network interface cards) cabling, buses, etc.).

Herein, "virtual" means "not something but made to appear as if it were". For example, a virtual machine is not a machine but is made to appear (e.g., to a guest operating system) as if it were a machine through software processes. "Virtual" is the opposite of "physical". Both hardware and physically encoded software are physical, so there can be virtual hardware and virtual software.

A "blueprint" is an executable document that defines a logical object and contains the expertise to produce and operate a real counterpart to that logical object. For example, the real counterpart can be a real or virtual machine, multi-machine system, or application. In many cases, a blueprint or a component of a blueprint will include specifications for a real object. Deploying the blueprint results in a real object meeting the specifications of the blueprint or blueprint component. The resulting real object can be said to be an "instantiation" or "instance" of the blueprint or blueprint component. An instantiation can typically be modified without modifying the source blueprint/component.

As explained above, blueprints can be arranged in an inclusion hierarchy, wherein a "parent" blueprint can include, by reference or instantiation, a "child" blueprint. "Parent" and "child" are relative terms; a blueprint can be a parent of one blueprint and a child of another blueprint.

However, for consistency of reference, a parent blueprint of a parent blueprint can be referred to as a "grandparent" blueprint. Similarly, "ancestor blueprint" is defined relative to "descendant blueprint". An ancestor blueprint includes, directly or indirectly through one or more intermediate blueprints, a descendant blueprint. An "updated blueprint" is a revision, e.g., of an original blueprint that can assume the functions of the original blueprint if used in lieu of the original blueprint.

A typical blueprint contains a number of parameters to which values are or can be assigned. Values can be scalars (e.g., 5), ranges (e.g., 4-8), non-numerical values (e.g., "Texas"), etc. Where a child blueprint is instantiated in a parent blueprint, the parameters of the child blueprint are instantiated in the parent blueprint by default. Where a child blueprint is included in a parent blueprint by reference, the present invention provides that some parameters of the child blueprint can be instantiated in the parent blueprint, thus becoming parameters of the parent blueprint.

A parameter is "modifiable" if the value assigned to an instantiation of the parameter in a parent blueprint can be modified without modifying the child blueprint. A parameter is "customizable" If it is modifiable only within constraints set by the child blueprint.

Herein, a blueprint "developer" is a human, group of humans, or other entity that creates a blueprint. In the examples, it is generally assumed that the developer of a parent blueprint is not authorized to modify the child blueprint, e.g., using the application programming interface (API) of the child blueprint. However, the developer of the parent blueprint may modify the value of an instantiation of a modifiable parameter of an included child blueprint via the API of the parent blueprint. Herein, "analyzing a blueprint" encompasses generating a plan based on the blueprint and analyzing the plan.

The present invention ensures for valid entitlement evaluations by conducting them at deployment time. This avoids running into entitlement constraints due to a deployment.

An information-technology (IT) blueprint process comprises: analyzing a blueprint so as to evaluate a deployment amount of entitlements associated with a resource required by a deployment of the blueprint; comparing the deployment amount of entitlements with an available amount of entitlements associated with a customer account; determining whether or not the blueprint is to be deployed on behalf of the customer based at least in part on the comparison of the deployment amount and the available amount; and completing deployment of the blueprint on behalf of the customer in the event it is determined that the blueprint is to be deployed on behalf of the customer account.

The IT blueprint process further comprises receiving a request to deploy the blueprint, the analyzing being performed in response to the request. The deployment may have a planning phase and an implementation phase, the analyzing occurring after the planning phase has begun and before the implementation phase has begun, the implementation phase and not the planning phase involving allocating physical resources. The IT blueprint process further comprises, in the event it is determined that the blueprint is not to be deployed, aborting a deployment of the blueprint.

The IT blueprint process further comprises: in the event it is determined that the blueprint is not to be deployed given the available amount, procuring additional entitlements on behalf of the customer after the analysis and prior to the provisioning phase of the deployments; and completing deployment of the blueprint on behalf of the customer.

In the IT blueprint process, the blueprint may reference a child blueprint, the analyzing including analyzing the child blueprint so as to evaluate a second deployment amount of entitlements associated with a resource required by a deployment of the child blueprint.

An IT blueprint system comprises media encoded with code that, when executed by hardware, causes the hardware to implement an IT blueprint process including: analyzing an IT blueprint so as to evaluate a deployment amount of entitlements associated with a resource required by a deployment of the blueprint; comparing the deployment amount of entitlements with an available amount of entitlements associated with a customer; determining whether or not the blueprint is to be deployed on behalf of the customer based at least in part on the comparison of the deployment amount and the available amount; and completing deployment of the blueprint on behalf of the customer in the event it is determined that the blueprint is to be deployed on behalf of the customer.

The IT blueprint system further comprises receiving a request to deploy the blueprint, the analyzing being performed in response to the request. In the IT blueprint system, the deployment has a planning phase and a provisioning phase, the analyzing occurring after the planning phase has begun and before the implementation phase has begun, the implementation phase and not the planning phase involving allocating physical resources.

The IT blueprint system of further comprises, in the event it is determined that the blueprint is not to be deployed, aborting a deployment of the blueprint.

The IT blueprint system further comprises, in the event it is determined that the blueprint is not to be deployed given the available amount, procuring additional entitlements on behalf of the customer after the analysis and prior to the implementation phase of the deployments; and completing deployment of the blueprint on behalf of the customer.

In the blueprint system, the blueprint references a child blueprint, the analyzing including analyzing the child blueprint so as to evaluate a second deployment amount of entitlements associated with a resource required by a deployment of the child blueprint.

An information-technology (IT) blueprint is an executable document that describes a real computing object and includes the expertise to create and operate that computing object. The blueprint can be deployed to create a customer application to which resources can be allocated. Prior to completion of a deployment, the blueprint can be analyzed to evaluate a deployment amount of resources that would be required by the customer application upon deployment. The entitlement amount associated with the blueprint can be compared to an amount of entitlements associated with the customer account. Based at least in part on this comparison, a determination can be made whether or not to complete the deployment.

As a result, there is no need to roll back a deployment in the event the deployment would have resulted in entitlements being exceeded.

Policy-Based Information-Technology Blueprint Enhancement

Enterprises are increasingly reliant on computer-based applications for business operations. However, the costs, effort, and expertise required to acquire, configure, maintain, and update the infrastructure required to run those applications can be burdensome. Infrastructure-as-a-Service (IaaS) providers offer the option of allowing enterprises to subscribe to a virtual infrastructure. The IaaS providers then assume responsibility for the virtual infrastructure and the hardware infrastructure on which the virtual infrastructure is based. The enterprise is then free to focus more on its basic business and less on the computer system helping to run it.

Of course, the burdens associated with the infrastructure do not disappear; they are merely shifted to the IaaS provider. In fact, the burdens are increased because the IaaS provider may have to configure an infrastructure to meet the differing requirements of its diverse customers.

Expertise in computer hardware, networking, storage systems, operating systems, databases and other software applications, security, compliance, workload management, and other areas are required. Therefore, the IaaS provider has the multi-disciplinary challenge of coordinating the efforts of experts in different subject matters.

Information-technology (IT) blueprints are executable documents embodying expertises for creating and managing a target object, such as a server or an e-commerce site. Experts from multiple disciplines can collaborate on a single blueprint, and/or expertise from different disciplines can be combined by having a blueprint, representing one expertise, reference another blueprint, representing a different expertise.

For example, a blueprint for a multi-server website can reference a blueprint for a server. Thus, the developer of the website blueprint need not have the expertise to develop a server blueprint and vice versa. Once a blueprint is created, it can be deployed many times, e.g., for different customers, to configure an infrastructure to implement customer applications for which the blueprint was designed.

Blueprints can become obsolete. For example, security provisions defined by a blueprint may be deemed inadequate over time. To address this obsolescence, a blueprint can be updated, that is a blueprint can be modified to include more up-to-date security features or a new version of the blueprint can be provided with the up-to-date security features.

However, if the number of blueprints to be updated is large, the total time and effort involved can be larger than desired. Also, by the time all the updates have been updated, the updates themselves may have become obsolete.

Accordingly, the present invention provides for deployment-time policy based enhancements to blueprints. During deployment and, preferably, before provisioning, a deployment policy check is made for policies that could impact the deployment. For each blueprint being deployed, a check is made to see if any policies are applicable. For each applicable policy, the blueprint being deployed is modified according to the policy. If deployment is split into a planning phase and a provisioning phase, the policy check and enhancements are applied during the planning phase.

The policy-driven enhancements provide for transparent centralized alteration of blueprints just in time of deploying the blueprint. Blueprint developers benefit from being able to include a bare minimum of application specific components in the blueprint. IT administrators, security auditors, and others benefit because they are getting a chance to add and modify the blueprint to satisfy corporate policies and to be security compliant. For example, a blueprint that has a database component can be automatically enhanced to enable micro-segmentation of database instances, and/or to install Intrusion Prevention System agents Policy-driven enhancements can be used, for example, to achieve business driven blueprint validation. For example, an 'OS Policy' can scan the blueprint to ensure operating-system versions used in the blueprint are approved by corporate policies. Outdated operating-system versions pose a significant security hazard and this centralized policy checking provides a reliable quality gate to detect unapproved operating-systems even before they get deployed in the data-center.

In some embodiments, extensible tags (key-value pairs) to decorate blueprints and/or their components with business context, to aid in selection of policies. For example, an enterprise can establish a convention to include a tag 'PII' on all application blueprints that deal with Personally Identifiable Information. Then a whole set of policies can be dynamically bound to blueprints with this tag.

Figure 18:
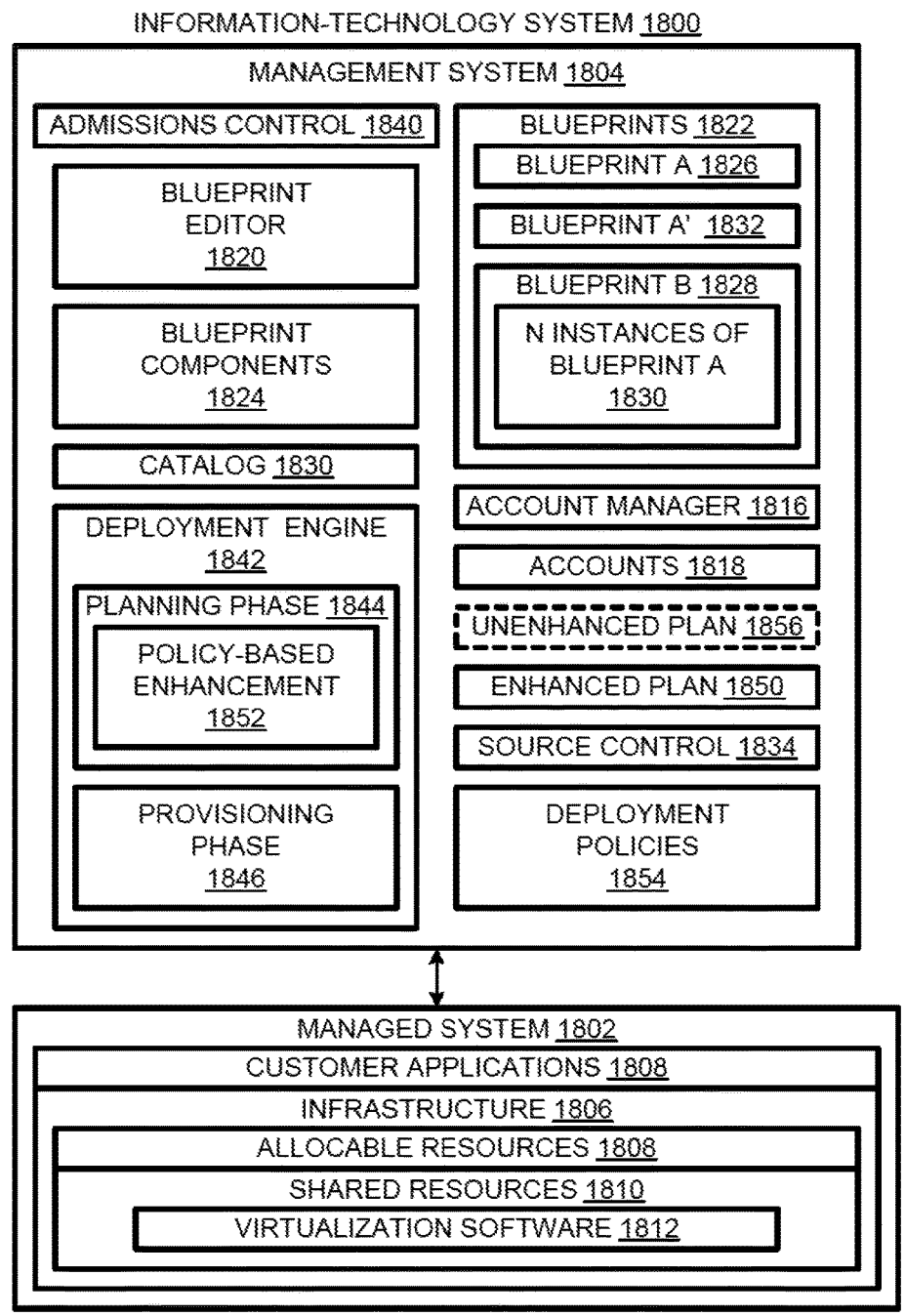
FIG. 18 is a schematic diagram of an information-technology (IT) system including a management system and a managed system.
Figure 19:
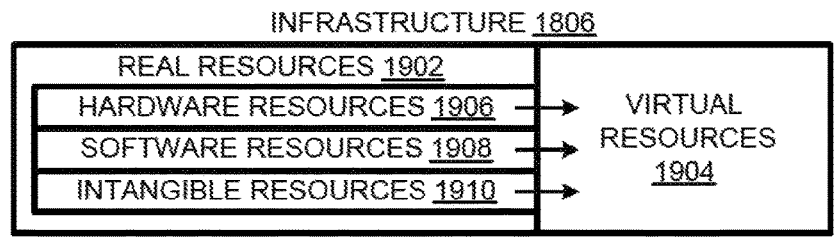
FIG. 19 is a schematic block diagram of an infrastructure of the IT system of FIG. 18.

As shown in FIG. 18, an information-technology (IT) system 1800 includes a managed system 1802 and a management system 1804. Managed system 1802 includes an infrastructure 1806, which can include both real and virtual components, is configurable to support customer applications 1808. For example, for a customer desiring an e-commerce website, infrastructure 1806 may be configured to support an e-commerce website application.

As shown in FIG. 2, infrastructure 1806 includes real resources 202 and virtual resources 204. Real resources 1902 include hardware resources 206, software resources 208, and intangible resources 1910. The hardware resources include buildings, power distribution systems, environmental control (e.g., cooling) systems, and computer hardware. The computer hardware includes media, processors, and communications devices. The media is for storing physical encodings of software (aka, code). The software can include data-type data (aka data) and instruction-type data (aka, instructions). The processors manipulate data-type data in accordance with the instructions. The communications devices are used for transmitting and receiving data. The intangible resources can include license rights, power and money budget allotments, etc.

Software resources include computer applications, utility (e.g., security) software, virtualization software, operating systems, and firmware. Virtualization software 1812 is used to virtualize real hardware and software to yield virtual hardware and virtual software. "Virtual" herein means "appears to be but is not" and is opposed to "real". Thus, in addition to real resources 1902, infrastructure 1806 includes virtual resources 1904. Virtualizing a resource is a way of making the resource allocable. For example, virtualizing a processor allows its capabilities to be shared among plural virtual processors.

The various real and virtual resources can be categorized as either allocable resources or non-allocable (shared) resources, as indicated in FIG. 18. Allocable resources can include: real and virtual processors, real and virtual communications devices, real and virtual memory, and other resources. The shared resources can include buildings, platform firmware, virtualization software 1812, licenses, and other resources.

Management system 1804 is used to manage managed system 1802. Management system 1804 includes an account manager 1816 for creating and managing customer accounts 1818. The customers can be departments within the vendor for IT system 1800 or enterprise customers of the vendor.

Each account 1818 can be provided with rights to establish one or more customer applications 1808 using infrastructure 1806.

To simplify the task of establishing customer applications, management system 1804 includes a blueprint editor 1820 for creating, publishing, and updating IT blueprints 1822. Blueprints 1822 can be created using various blueprint components 1824. These can include basic components that are not, per se, blueprints. Blueprints 1822 can also include complex blueprints that include other blueprints as components. Once a blueprint is created, it can be published to a blueprint catalog 1830. Cataloged blueprints may be selected for deployment on behalf of customer accounts.

For example, a complex blueprint B 1828 is created including by reference a previously created basic blueprint A 1826, which does not include any blueprints. The inclusion creates N, e.g., 5, instantiations 1830 of blueprint A 1826 or at least some of its parameters. Note, blueprint A 1826 may be updated after blueprint B 1828 is created to yield a new version blueprint A' 1832. The creation of blueprint A' 1832 does not affect blueprint B 1828. However, during deployment of blueprint B 1828, a source control function 1834 may return blueprint A' 1832 in lieu of blueprint A 1826 to take advantages of any improvements over blueprint A 1826 represented by blueprint A' 1832.

Each blueprint is characterized by a set of parameters and values assigned to those parameters. For some parameters, the values may be ranges rather than simple numerical values. For example, the intent may be to select a scalar value (e.g., 3) within the range (e.g., 1-4) at deployment time. For such blueprints, a deployment time blueprint analysis is the most precise.

Figure 20:
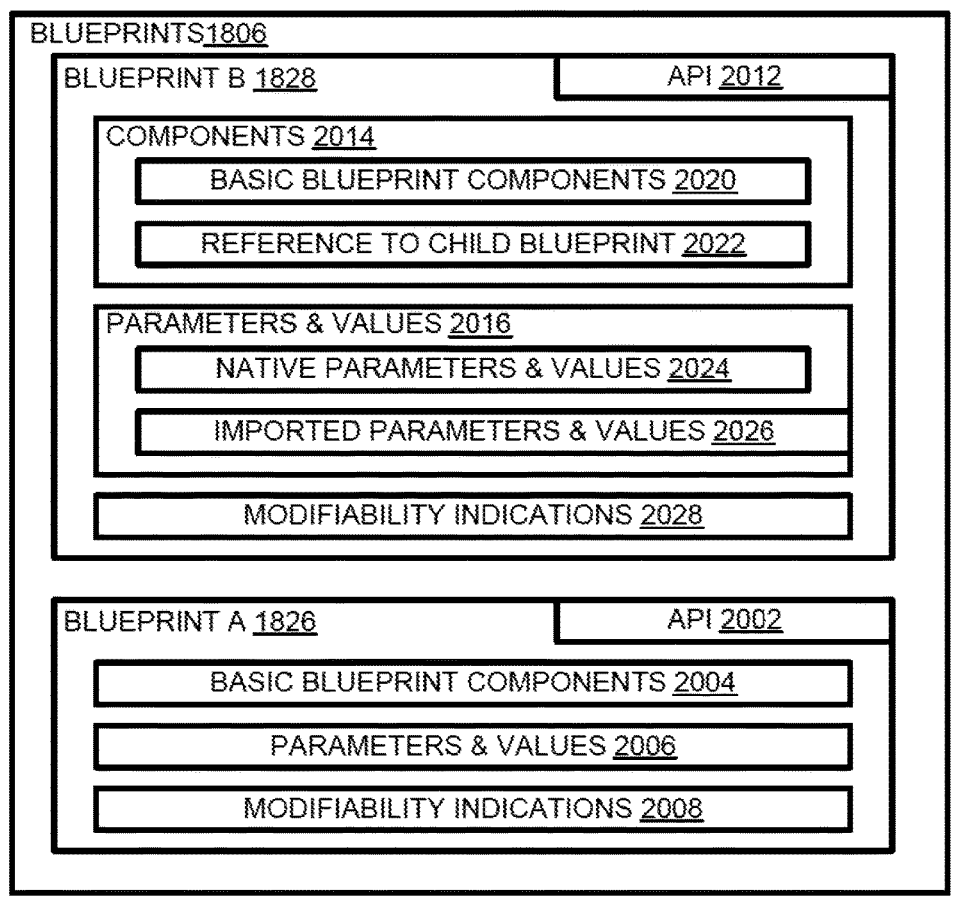
FIG. 20 is a schematic block diagram of IT blueprints of the IT system of FIG. 18.

As shown in FIG. 20, blueprint A 1826 includes an application programming interface (API) 2002 through which blueprint A 1826 is edited. Blueprint A 1826 includes basic components 2004, parameters and values 2006, and modifiability indications 2008 indicating the parameters for which value modification can be allowed when blueprint A 1826 is referenced by another blueprint, such as blueprint B 1828.

Blueprint B 1828 includes its own API 2012, its own components 2014, and its own parameters and values 2016, and its own modifiability indications 2018. Components 2014 can include both basic components 2020 and a reference 2022 to blueprint A 1826; reference 2022 can specify a number N of instances of blueprint A 1826 to be included in blueprint B 1828. Parameters and values 2016 can include native parameters and values 2024 that were newly created for blueprint B 1828 and imported parameters and values 2026, that were imported from blueprint A 1826 and instantiated into blueprint B 1828 so they can be modified without affecting blueprint A. Modifiability indications 2028 indicate which parameters can have their values modified when blueprint B is included by reference in another blueprint. The modifiable parameters can include parameters native to blueprint B and parameters imported from blueprint A.

Management system 1804 includes admissions control 1840, FIG. 18, to authenticate users and to determine permissions for each authenticated user. The permissions determine which blueprint developers can create which types of blueprints. For example, one developer may be allowed to edit single-machine blueprints, but not multi-machine blueprints.

Once a blueprint is selected for deployment, a deployment engine 1842 manages the deployment process in two phases: a planning phase 1844 and a provisioning phase 1846. Planning phase 1844 yields a provisioning plan 1850 that defines a first configuration of infrastructure 1806 and specifies a sequence of provisioning actions to be taken during the provisioning. The actions can include installing software, creating virtual machines, assigning Internet Protocol (IP) addresses, etc.

During planning phase 1844, deployment engine 1836 provides for a policy-based enhancement 1852. To this end, deployment engine 1842 checks deployment policies 1854 to see if there are policies applicable to the blueprint being deployed. If so, the applicable policies 1854 are applied to the blueprint being deployed. As a result, it is an enhanced provisioning plan 1850 rather than the unenhanced provisioning plan 1856 that is provisioned. In the event there are no applicable deployment policies, an unenhanced plan 1856 is generated. Unenhanced plan 1856 defines a second configuration of infrastructure 1806 that is different from the first configuration defined by enhanced plan 1850. In addition, unenhanced plan 1856 specifies the steps to be taken to achieve the second configuration.

Figure 21:
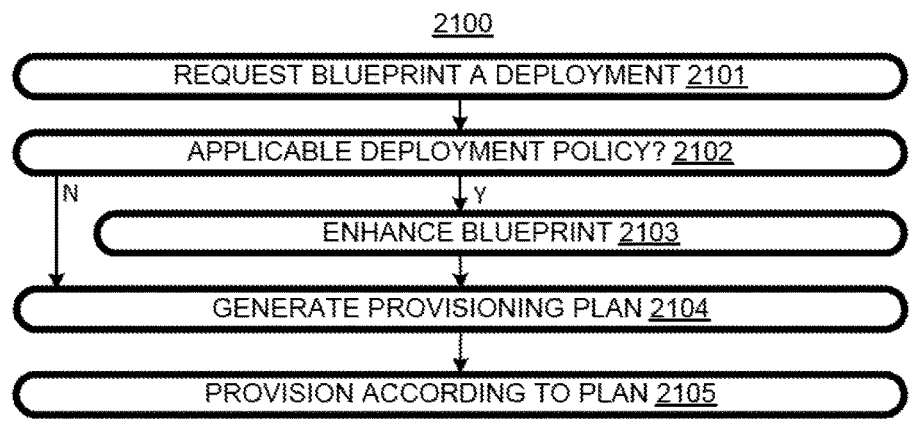
FIG. 21 is a flow chart of a blueprint-deployment process applicable to the IT system of FIG. 18 and other systems.

A blueprint process 2100, flow charted in FIG. 21, can be implemented using IT system 1800 and other systems. At 2101, deployment of a blueprint for a customer application is requested. At 2102, a check is made for an applicable deployment policy. If there is at least one, the blueprint is enhanced according to the policy. At 2104, a provisioning plan is generated based on the original blueprint if there were no applicable deployment policies and based on the enhanced blueprint if there was at least one applicable deployment policy. At 2105, the customer application is provisioned according to the plan.

Deployment policies may be applied one-at-a-time. A first policy can be applied to the original blueprint generate a first enhanced blueprint, then a second policy can be applied to the first enhanced blueprint to generate a second enhanced blueprint, and so on with an Nth deployment policy being applied to generate an Nth enhanced blueprint. Sometimes one deployment policy may alter a blueprint such that a previously inapplicable deployment policy is now applicable. Therefore, it can be important to ensure all policies get to see all enhancements done by all other enhancers. For example, policy A may be applicable only for 'windows operating systems'. A blueprint may not have any windows operating system but a second policy may add windows operating systems to blueprints. When system runs the first policy the first time, the first policy will not be applicable. Then the second policy is applied to add the windows operating system. The first policy must be checked again to ensure it sees the dynamically added windows operating-system component.

Figure 22:
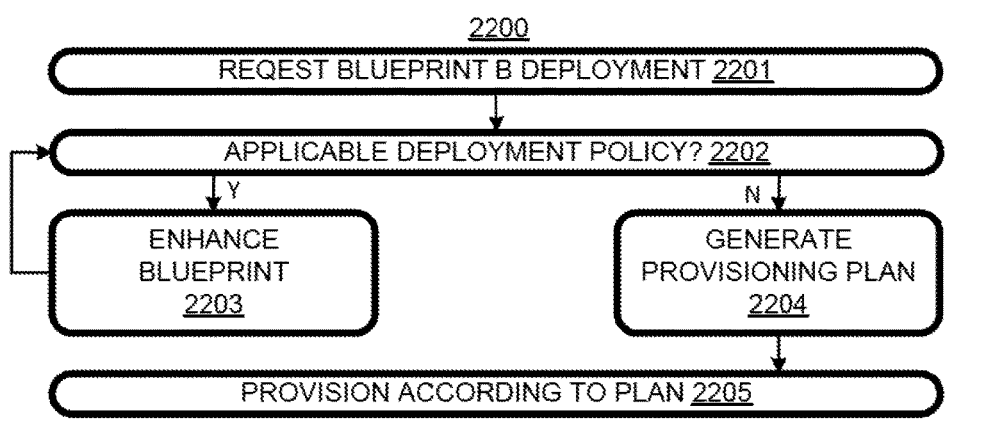
FIG. 22 is a flow chart of another blueprint-deployment process applicable to the IT system of FIG. 18 and other systems.

Accordingly, a blueprint process 2200, flow-charted in FIG. 22, can be implemented using IT system 1800 and other systems. At 2201, a request is made for deployment of a blueprint, e.g., blueprint B 1828 (FIG. 18). The blueprint is such that, if it were executed without modification, it would implement a first infrastructure configuration to implement a customer application.

At 2202, a check is made to see if there is an applicable deployment policy. If there has been an update to the requested blueprint, the check may be made with respect to the updated blueprint; otherwise, the check is made with respect to the updated blueprint. If there is an applicable deployment policy, the blueprint is enhanced accordingly at 2203. Process 2200 iterates by returning to 2202 so that the enhanced blueprint can be further enhanced according to a second policy. As noted above, a deployment policy that was not applicable in one iteration may turn out to be applicable in a succeeding iteration. Each enhanced blueprint, if executed, would result in a second configuration of the infrastructure that differed from the first configuration.

If during the first iteration or a succeeding iteration, there is no applicable deployment policy, then, at 2204, a provisioning plan is generated. At 2205, the customer application is provisioned according to the plan generated at 2204.

If the applicable policy only affected one blueprint, it could have been implemented by updating the blueprint. For example, blueprint A' 1832 could include the security update lacking in blueprint A 1826. However, if the applicable policy applies to many blueprints, then many updates would have to be generated, placing a burden on blueprint developers. Furthermore, an extended time would be required to implement the policies blueprint-by-blueprint. Much of the developer effort could be wasted as some policies might change again before the updated blueprints are deployed.

The present invention permits a large number of blueprints, in effect, to be updated at once. The burden on the developers is relieved. Policies can be changed across the board with at whatever frequency is required. The frequency with which changes can be made expands the types of policies that can be accommodated. For example, it would be practical to change policies on a daily basis instead of on a much less frequent basis.

The invention allows policies to be applied even where it might be difficult for the blueprint developer to recognize their applicability. For example, a policy might apply to a descendant of a blueprint, but not otherwise to the blueprint itself. Furthermore, a policy may apply to an update of a blueprint or a descendant of the blueprint. The deployment engine would discover applicability in such cases, even though they might be hard to discern by a developer of the top level blueprint.

Transparent policy-driven blueprint alteration can also be applied when upgrading an existing deployment by deploying an explicitly or implicitly (e.g., due to an updated child blueprint). As for an original deployment, an upgrade deployment can benefit from policy-based enhancements. For example, a request to update running application with a newer version can go through a policy that ensures newer version is certified for production deployments.

Figure 23:
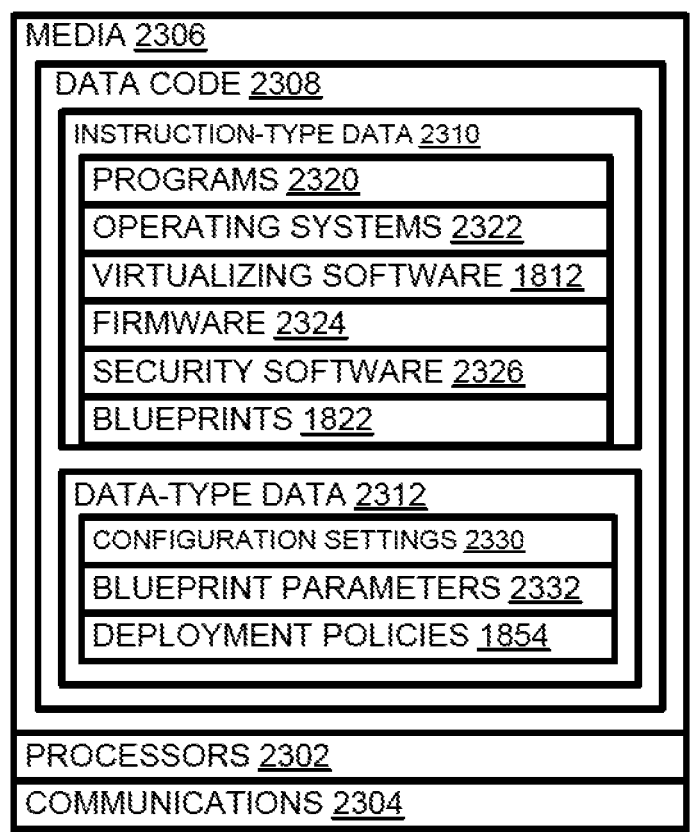
FIG. 23 is an abstract representation of the IT system of FIG. 18.

As abstractly represented in FIG. 23, IT system 1800 can include processors 2302, communications devices 2304, and media 2306. Media 2306 is encoded with data code, which represents both instruction-type data 2310 (aka instructions) and data-type data 2312 (aka data). Processors 2302 manipulate data-type data 2312 according to instructions 2310. Communications devices 2304 transmit and receive both types of data.

Instruction-type data 2310 includes programs 2320 (including user applications, i.e., "apps"), operating systems, virtualizing software, firmware, security software, and blueprints (which are executable documents). Data-type data 2312 includes configuration settings 2330, blueprint parameters 2332, deployment policies 1854, etc. Many of these items include both types of data.

Herein, "system" refers to a set of interacting elements, wherein the elements can be hardware components, physically encoded software elements, atoms, actions, etc. A process is a system in which the elements are actions. Computers, infrastructures, and computing environments are examples of systems. Computers include media, processors, and communications devices (e.g., network interface cards) cabling, buses, etc. The media can take various forms, e.g., e.g., random access memory (RAM) and hard disks.

Herein, "virtual" means "not something but made to appear as if it were". For example, a virtual machine is not a machine but is made to appear (e.g., to a guest operating system) as if it were a machine through software processes. "Virtual" is the opposite of "physical". Both hardware and physically encoded software are physical, so there can be virtual hardware and virtual software. Physical and virtual entities are both "real" as opposed to "logical", which refers to abstract or representational counterparts to real entities.

A "blueprint" is an executable document that defines a logical object and contains the expertise to produce and operate a real counterpart to that logical object. For example, the real counterpart can be a real or virtual machine, multi-machine system, or application. In many cases, a blueprint or a component of a blueprint will include specifications for a real object. Deploying the blueprint results in a real object meeting the specifications of the blueprint or blueprint component. The resulting real object can be said to be an "instantiation" or "instance" of the blueprint or blueprint component. An instantiation can typically be modified without modifying the source blueprint/component.

As explained above, blueprints can be arranged in an inclusion hierarchy, wherein a "parent" blueprint can include, by reference or instantiation, a "child" blueprint. "Parent" and "child" are relative terms; a blueprint can be a parent of one blueprint and a child of another blueprint. Similarly, "ancestor blueprint" is defined relative to "descendant blueprint". An ancestor blueprint includes, directly or indirectly through one or more intermediate blueprints, a descendant blueprint. An "updated blueprint" is a revision, e.g., of an original blueprint that can assume the functions of the original blueprint if used in lieu of the original blueprint.

A typical blueprint contains a number of parameters to which values are or can be assigned. Values can be scalars (e.g., 5), ranges (e.g., 4-8), non-numerical values (e.g., "Texas"), etc. Where a child blueprint is instantiated in a parent blueprint, the parameters of the child blueprint are instantiated in the parent blueprint by default. Where a child blueprint is included in a parent blueprint by reference, the present invention provides that some parameters of the child blueprint can be instantiated in the parent blueprint, thus becoming parameters of the parent blueprint. A parameter is "modifiable" if the value assigned to an instantiation of the parameter in a parent blueprint can be modified without modifying the child blueprint. A parameter is "customizable" if it is modifiable only within constraints set by the child blueprint.

Herein, a blueprint "developer" is a human, group of humans, or other entity that creates a blueprint. In the examples, it is generally assumed that the developer of a parent blueprint is not authorized to modify the child blueprint, e.g., using the application programming interface (API) of the child blueprint. However, the developer of the parent blueprint may modify the value of an instantiation of a modifiable parameter of an included child blueprint via the API of the parent blueprint.

Herein, a "policy" includes a rule and an action. The rule defines circumstances under which the action is to be taken. The action is taken with respect to a blueprint and/or its deployment. For example, the policy might be to incorporate security suite A to all blueprints that do not call for security suite A. Then the rule is that the policy applies to a blueprint if the blueprint does not call for incorporation of security suite A. The action is to incorporate security suite A in the deployment of the blueprint. A policy is "applicable" to a blueprint if the rule blueprint meets the condition defined by the rule.

Thus, deployment-policy checks permit immediate, across-the-board, implementations of policy changes without having to update blueprints individually. Herein, art, if any, labelled "prior art" is admitted prior art; art no labelled "prior art" is not admitted prior art. The illustrated and variations upon and modifications to the illustrated embodiment are provided for by the present invention, the scope of which is defined by the following claims.

An information-technology (IT) blueprint process comprises: receiving a request to deploy an IT blueprint to an IT infrastructure, the IT blueprint being such that, if implemented without a policy-based modification, would yield a first configuration of the infrastructure; determining whether or not there is an applicable policy that, if applied, would cause deployment of the IT blueprint to result in a second configuration of the infrastructure different from the first configuration of the infrastructure; and in the event there is such an applicable policy, applying the applicable policy and deploying the blueprint to as to result in the second configuration of the infrastructure.

In the IT blueprint process, the deploying includes a planning phase and a provisioning phase, the planning phase, if implemented without applying the applicable policy, would result in a first plan, and, if implemented applying the applicable policy, would result in a second plan, the first provisioning plan, if implemented, would result in the first configuration, the second provision plan, when implemented, resulting in the second configuration.

In the IT blueprint wherein the IT blueprint includes one or more descendant blueprints, the applicable policy being applicable to one or more of the descendant blueprints.

In the information-technology IT blueprint process, the applicable policy is not applicable to the blueprint other than to the included descendant blueprints.

In the IT blueprint process, the IT blueprint includes a descendant blueprint, the deploying including deploying an update of the descendant blueprint in lieu of the descendant blueprint, the applicable policy applying to the update of the descendant blueprint.

In the IT blueprint process, the applicable policy is not applicable to the descendant blueprint to which the updated blueprint is an update.

In the IT blueprint process, there are plural applicable policies that are applied one-at-a-time, with an nth enhanced blueprint being generated in response to the nth applicable policy.

In the IT process, at least one applicable policy is checked for applicability both before and after an enhanced blueprint is generated according to another one of the applicable policies.

An information-technology (IT) system comprises media encoded with code that, when executed by a processor, implements a process including: receiving a request to deploy an IT blueprint to an IT infrastructure, the IT blueprint being such that, if implemented without a policy-based modification, would yield a first configuration of the infrastructure; determining whether or not there is an applicable policy that, if applied, would cause deployment of the IT blueprint to result in a second configuration of the infrastructure different from the first configuration of the infrastructure; and in the event there is such an applicable policy, applying the applicable policy and deploying the blueprint to as to result in the second configuration of the infrastructure.

In the IT blueprint system, the deploying includes a planning phase and a provisioning phase, the planning phase, if implemented without applying the applicable policy, would result in a first plan, and, if implemented applying the applicable policy, would result in a second plan, the first provisioning plan, if implemented, would result in the first configuration, the second provision plan, when implemented, resulting in the second configuration.

In the IT blueprint system, the IT blueprint includes one or more descendant blueprints, the applicable policy being applicable to one or more of the descendant blueprints.

In the information-technology IT blueprint system, the applicable policy is not applicable to the blueprint other than to the included descendant blueprints.

In the IT blueprint system, the IT blueprint includes a descendant blueprint, the deploying including deploying an update of the descendant blueprint in lieu of the descendant blueprint, the applicable policy applying to the update of the descendant blueprint.

In the IT blueprint system, the applicable policy is not applicable to the descendant blueprint to which the updated blueprint is an update.

In the IT blueprint system, there are plural applicable policies that are applied one-at-a-time, with an nth enhanced blueprint being generated in response to the nth applicable policy.

In the IT process, at least one applicable policy is checked for applicability both before and after an enhanced blueprint is generated according to another one of the applicable policies.

An information-technology (IT) blueprint is an executable document that describes a real computing object and includes the expertise to create and operate that computing object. The blueprint can be deployed to create a customer application to which resources can be allocated.

Deployment of a blueprint can involve a planning phase and a provisioning phase. During the planning phase, a check can be made for an applicable deployment policy that would alter/enhance the blueprint, which would affect the execution plan resulting from the planning phase and thus the configuration resulting from provisioning according to the plan. This approach allows a deployment policy to be implemented immediately across many blueprints at once, obviating the need to update blueprints one at a time.

Information-Technology Blueprint with Parameter Value Range

Enterprises are increasingly reliant on computer-based applications for business operations. However, the costs, effort, and expertise required to acquire, configure, maintain, and update the infrastructure required to run those applications can be burdensome. Infrastructure-as-a-Service (IaaS) providers offer the option of allowing enterprises to subscribe to a virtual infrastructure. The IaaS providers then assume responsibility for the virtual infrastructure and the physical infrastructure on which the virtual infrastructure is based. The enterprise is then free to focus more on its basic business and less on the computer system helping to run it.

Of course, the burdens associated with the infrastructure do not disappear; they are merely shifted to the IaaS provider. In fact, the burdens are increased because the IaaS provider may have to configure a physical infrastructure to meet the differing requirements of its diverse customers. Expertise in computer hardware, networking, storage systems, operating systems, databases and other software applications, security, compliance, workload management, and other areas are required. Therefore, the IaaS provider has the multi-disciplinary challenge of coordinating the efforts of experts in different subject matters.

Information-technology (IT) blueprints are executable documents embodying expertises for creating and managing a customer application, such as a server or an e-commerce site. Experts from multiple disciplines can collaborate on a single blueprint, and/or expertise from different disciplines can be combined by having a blueprint, representing one expertise, reference another blueprint, representing a different expertise.

For example, a blueprint for a multi-server website can reference a blueprint for a server. Thus, the developer of the website blueprint need not have the expertise to develop a server blueprint and vice versa. Once a blueprint is created, it can be deployed many times, e.g., for different customers, to configure an infrastructure to implement customer applications for which the blueprint was designed.

IaaS customers can range from home businesses to multi-national corporations. Accordingly, the IT blueprints designed to configure infrastructures to meet the needs of IaaS customers can vary widely in type. Within a blueprint type, blueprints can vary in several respects. For example, e-commerce blueprints can vary in network topology and bandwidth, numbers of servers, memory capacity, storage capacity, etc.

An IaaS customer may encounter a choice between plural blueprints, each of which would serve the customer's needs to some extent but not completely. For a simple example, a customer may be offered a choice between a 4-server blueprint and an 8 server blueprint, when a 6-server blueprint that would be a better match to the customer's need is not available. In principle, a 6-server blueprint could have been offered as well. However, have blueprints for every possible combination of parameter values would, in general, be impractical.

Accordingly, the present invention provides for parameter value ranges, that is, a range of values that can be assigned to a blueprint parameter. There are two basic types of value ranges: a deployable value range, that is a range that is deployed, and a range of deployable values, that is a range from which a selection is made for deployment. A deployable value range is deployed as a range, e.g., as a post-deployment operational constraint. For example, a deployable value range of 4-8 servers could allow the number of servers to vary according to transaction rates, but only between 4 and 8 servers. Numbers of servers below four and above 8 are prohibited.

A range can be expressed as a list of permissible values or by specifying maximum and minimum values for a range of contiguous values. The contiguous values can form a continuum or an uninterrupted sequence of discrete values. The maximum and minimum can be specified as a complex value for one parameter or, equivalently, as simple values for separate minimum and maximum parameters.

A "range of deployable values" is a set of deployable values, from which a selection must be made prior to the completion of deployment and for which different selections may be made for different deployments of the same blueprint. The ranges may be numerical (e.g., 4-8 servers) or non-numerical (select a country for localization purposes). Numeric ranges may be contiguous (e.g., 4-8) or non-contiguous (e.g., 4, 6, 8).

In a scenario, one of the set of deployable values is selected, e.g., during or before deployment, so that the deployment of the blueprint can proceed. In another scenario, the blueprint is contained within a "parent" blueprint which specifies a single deployable value within the range for deployment. In a third scenario, the blueprint is contained within a parent blueprint which specifies a non-exhaustive subrange of deployable values. Subsequently, a single deployable value is selected from the subrange during deployment or in anticipation of deployment. More complex scenarios include additional levels of inclusion of blueprints. For example a parent of a blueprint can be a child of a "grandparent" blueprint.

Figure 24:
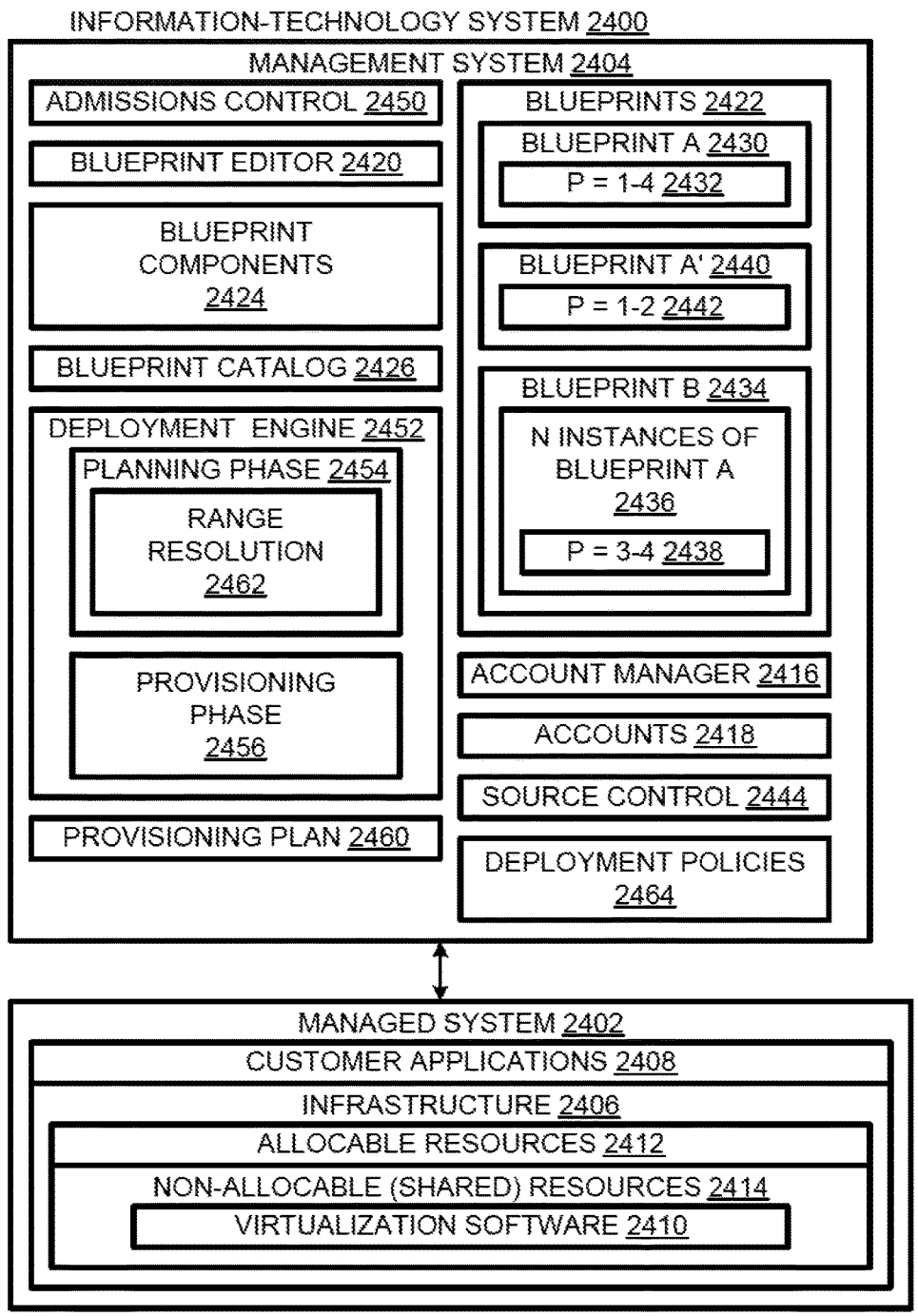
FIG. 24 is a schematic diagram of an information-technology (IT) system including a management system and a managed system.

As shown in FIG. 24, an information-technology (IT) system 2400 includes a managed system 2402 and a management system 2404.

Managed system 2402 includes an infrastructure 2406. Infrastructure 2406, which can include both real and virtual components, is configurable to support customer applications 2408. For example, for a customer desiring an e-commerce website, infrastructure 2406 may be configured to support an e-commerce website application.

Figure 25:
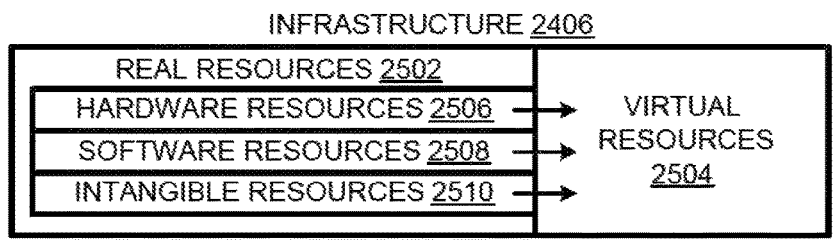
FIG. 25 is a schematic block diagram of an infrastructure of the IT system of FIG. 24.

As shown in FIG. 25, infrastructure 2406 includes real resources 2502 and virtual resources 2504. Real resources 2502 include hardware resources 2506, software resources 2508, and intangible resources 2510. The hardware resources include buildings, power distribution systems, environmental control (e.g., cooling) systems, and computer hardware. The computer hardware includes media, processors, and communications devices. The media is for storing physical encodings of software (aka, code). The software can include data-type data (aka "data") and instruction-type data (aka, "instructions"). The processors manipulate data-type data in accordance with the instructions. The communications devices are used for transmitting and receiving data. The intangible resources can include license rights, power and financial budget allotments, etc.

Software resources 2508 include computer applications, utility (e.g., security) software, virtualization software, operating systems, and firmware. Virtualization software 2410 (FIG. 24) is used to virtualize real hardware and software to yield virtual hardware and virtual software. "Virtual" herein means "appears to be but is not" and is opposed to "real". Thus, in addition to real resources 2502, infrastructure 2406 includes virtual resources 2504. Virtualizing a resource is a way of making the resource allocable. For example, virtualizing a processor allows its capabilities to be shared among plural virtual processors and thus among plural customer applications executing on the virtual processors.

The various real and virtual resources can be categorized as either allocable resources 2412 (FIG. 24) or non-allocable (shared) resources 2414, as indicated in FIG. 24. Allocable resources 2408 can include: real and virtual processors, real and virtual communications devices, real and virtual memory, and other resources. The shared resources 2410 can include buildings, platform firmware, virtualization software 2412, licenses, and other resources.

Management system 2404 is used to manage managed system 2402. Management system 2404 includes an account manager 2416 for creating and managing customer accounts 2418. The customers can be departments within the vendor for IT system 2400 or enterprise customers of the vendor. Each account 2418 can be provided with rights to establish one or more customer applications 2408 using infrastructure 2406.

To simplify the task of establishing customer applications, management system 2404 includes a blueprint editor 2420 for creating, publishing, and updating IT blueprints 2422. Blueprints 2422 can be created using various blueprint components 2424. These can include basic components that are not, per se, blueprints. Blueprints 2422 can also include complex blueprints, i.e., blueprints that include other blueprints as components. Once a blueprint is created, it can be published to a blueprint catalog 2426. Cataloged blueprints may be selected for deployment on behalf of customer accounts.

For example, a simple (i.e., not including another blueprint) blueprint A 2430 is created including a number-of-servers parameter P 2432, with a value range 1-4. A complex (including another blueprint) blueprint B 2434 includes, by reference or instantiation, N instances 2436 of blueprint A 2430. The instances 2436 include an instantiation 2438 of number-of-servers parameter P 2432. Parameter instantiation 2438 has been customized so that number-of-servers parameter P now has a value range of 3-4. In other words the value range of 1-4 of number-of-servers parameter P 2432 has been narrowed through customization of instantiation 2430 to 3-4. This customization affects parent blueprint B 2434 but not child blueprint A 2430.

Blueprint A 2430 may be updated after blueprint B 2434 is created to yield a new version blueprint A' 2440, e.g., for which a number-of-servers parameter P 2442 equals 1-2. The creation of blueprint A' 2440 does not affect blueprint B 2434. However, during deployment of blueprint B 2434, a source control function 2444 may return blueprint A' 2440 in lieu of blueprint A 2430 to take advantages of any improvements over blueprint A 2430 represented by blueprint A' 2440. In the illustrated case, the value range for number-of-servers parameter P has been narrowed from 1-4 to 1-2 in instance 2436 (of blueprint A 2430) included in blueprint B 2434. An alert or other message may be required upon deployment of blueprint B 2434 since no value for the number-of-servers parameter can meet the constraint 1-2 of the update and the constraint 3-4 of the customized number-of-servers parameter P 2438.

Figure 26:
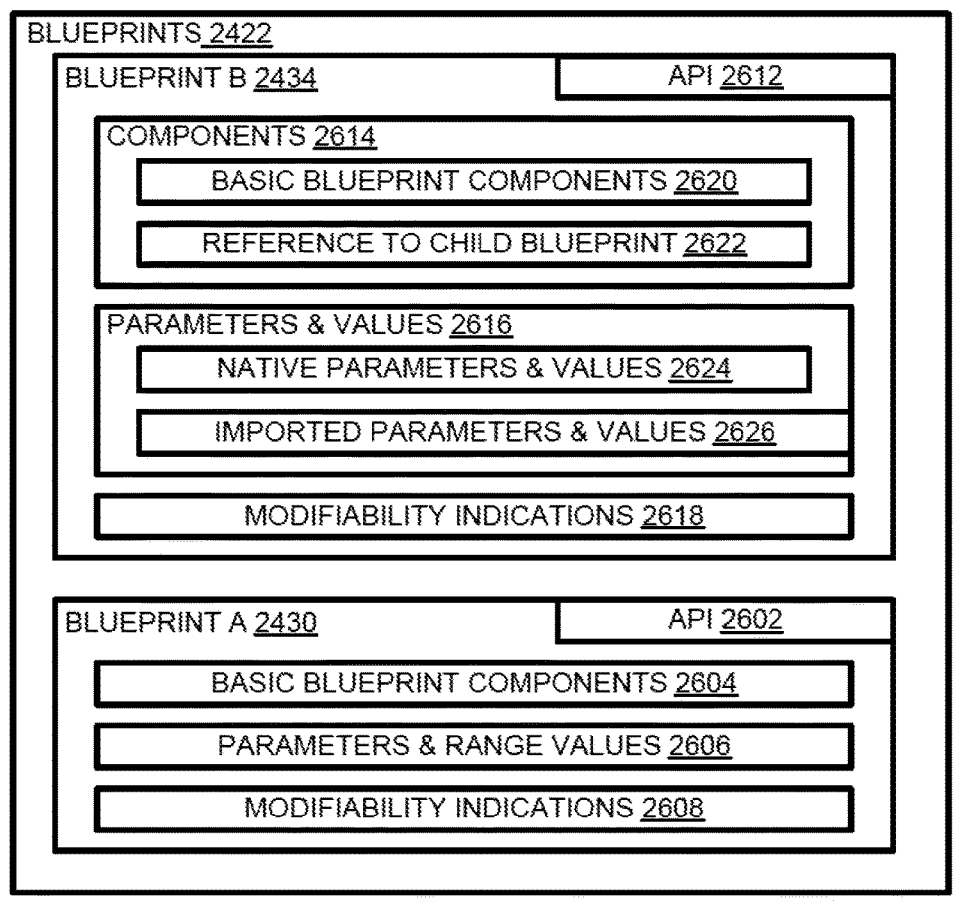
FIG. 26 is a schematic block diagram of IT blueprints of the IT system of FIG. 24.

As shown in FIG. 26, blueprint A 2430 includes an application programming interface (API) 2602 through which blueprint A 2430 is edited. Blueprint A 2430 includes basic components 2604, parameters and values 2606, and modifiability indications 2608 indicating the parameters for which value modification can be allowed when blueprint A 2430 is referenced by another blueprint, such as blueprint A 2434.

Blueprint B 2434 includes its own API 2612, its own components 2614, and its own parameters and values 2616, and its own modifiability indications 2618. Components 2614 can include both basic components 2620 and a reference 2622 to blueprint A 2430; reference 2622 can specify a number N of instances of blueprint A 2430 to be included in blueprint B 2434. Parameters and values 2616 can include native parameters and values 2624 that were newly created for blueprint A 2434 and imported parameters and values 2626 that were imported from blueprint A 2430; the imported parameters 2626 have been instantiated into blueprint A 2430 so they can be customized without affecting blueprint A 2430. Modifiability indications 2618 indicate which parameters can have their values modified when blueprint B 2434 is included by reference in another blueprint. The modifiable parameters can include parameters native to blueprint B 2434 and parameters imported from blueprint A 2430.

Management system 2404 includes admissions control 2450, FIG. 24, to authenticate users and to determine permissions for each authenticated user. The permissions determine which blueprint developers can create which types of blueprints. For example, one developer may be allowed to create and edit single-machine blueprints, but not multi-machine blueprints, while another developer is allowed to create and edit multi-machine blueprints but not single-machine blueprints.

Once a blueprint is selected for deployment, a deployment engine 2452 manages the deployment process in phases: a planning phase 2454 and a provisioning phase 2456. Planning phase 2454 yields a provisioning plan 2460 that defines a first configuration of infrastructure 2406 and specifies a sequence of provisioning actions to be taken during the provisioning. The actions can include installing software, creating virtual machines, assigning Internet Protocol (IP) addresses, etc.

Ranges including plural deployable values are resolved in planning phase 2454; for example, for blueprint A 2430, the number-of-servers parameter P 2432 has a range of (integer) values 1-4; one of these is selected for deployment in planning phase 2454. Provisioning plan 2460 then reflects this selection. In addition, deployment policies can be checked and implemented in plan 2460 during the planning phase. Once plan 2460 is created, it can be executed during provisioning phase 2456.

Figure 27A:
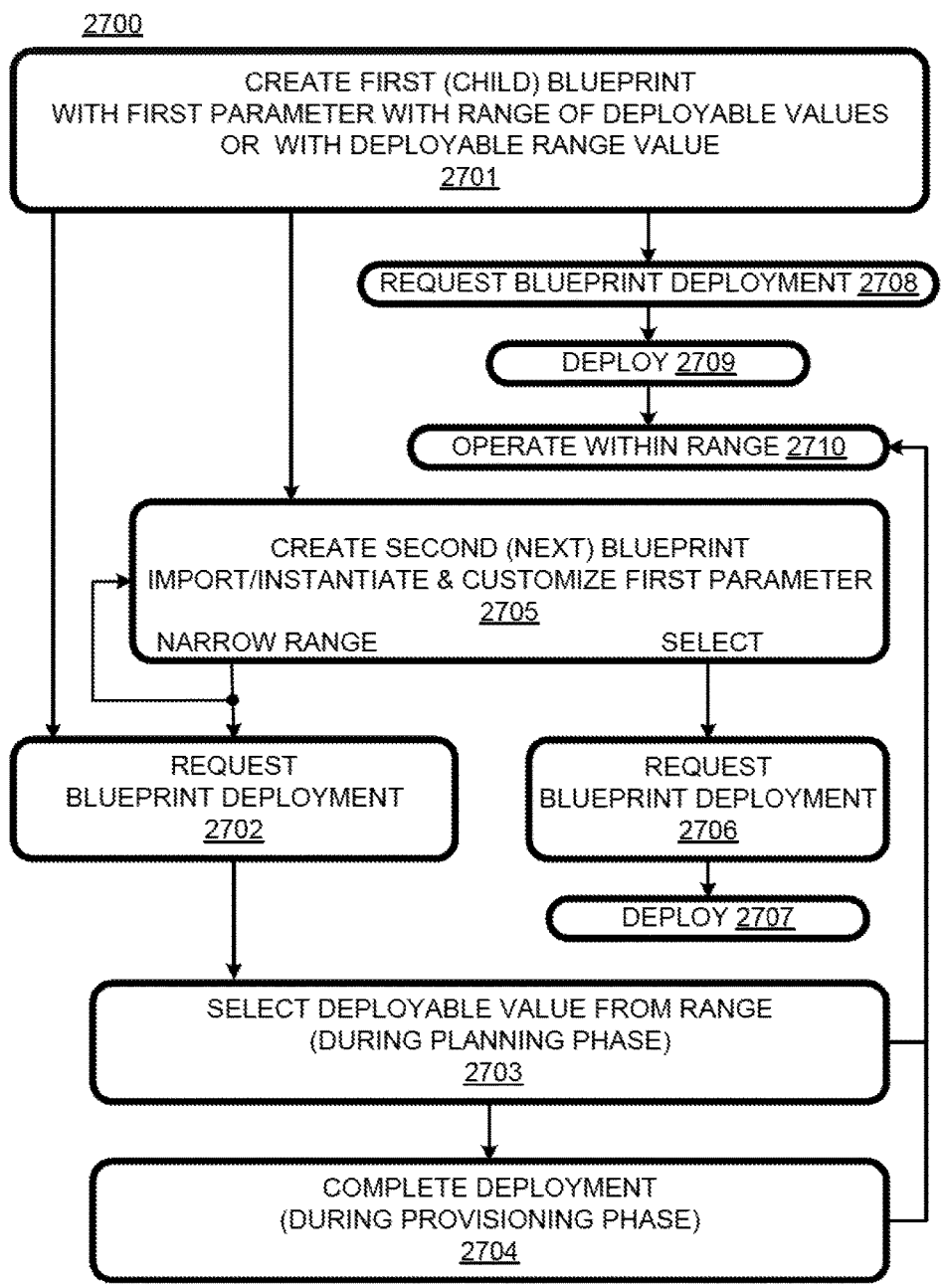
FIG. 27A is a flow chart of a blueprint-deployment process applicable to nested blueprints of the IT system of FIG. 24 and other systems.

A blueprint process 2700, flow charted in FIG. 27A, can be implemented using IT system 2400 and other systems. At 2701, a first blueprint is created with at least a first parameter to which is assigned a range of deployable values or a deployable range value or both (e.g., a range of deployable range values). This blueprint is to be included in another blueprint and, in that context, may be referred to as a "child" or "descendant" blueprint. The first blueprint may include an indication that the first parameter is "modifiable" in the context of inclusion in a parent or other ancestor blueprint.

At 2702, a request is received for a blueprint deployment. At 2703, a deployable value is selected from the range. In embodiments in which deployment is divided into a planning phase and a provisioning phase, this selection of the deployable value occurs during the planning phase. The resulting plan is based, in part, on the selected deployable value. The other deployable values in the range are, in effect, deselected and will not affect provisioning. At 2704, deployment is completed, with the resulting infrastructure configuration being based in part on the selected deployable value and not on the non-selected deployable values in the range.

In some embodiments, process 2700 proceeds from action 2701 directly to action 2705, instead of or in addition to action 2702. At 2705, a second blueprint is created including, by reference or instantiation, the first blueprint. In terms of the inclusion relationship, the second blueprint is the parent or ancestor of the first (child or descendant) blueprint.

Whether the inclusion is by reference or by instantiation, at least the first parameter (with the range of deployable values) is imported and instantiated into the second (parent) blueprint. The value of the instantiated parameter is customized (that is, modified within constraints imposed by the first blueprint) in one of two ways. Either: 1) the range is narrowed by eliminating one or more deployable values but leaving at least two deployable values; or 2) one deployable value is selected to the exclusion of the others so as to resolve the range down to one deployable value.

In the latter case of selecting a single deployable value, there may be a request for deployment of the parent blueprint at 2706. The parent blueprint is deployed at 2707. In the cases that the range was not customized or was narrowed to two or more deployable values, a blueprint deployment may be requested at 2702. A single deployable value is selected at 2703, and deployment is completed at 2704.

Instead of proceeding from action 2705 to either action 2702 or action 2706, process 2700 can iterate action 2705, creating new blueprints with more levels of inclusion. For example, a third blueprint can be created including the second blueprint including the instantiation of the first blueprint parameter. The third blueprint can be considered to be the "grandparent" of the first blueprint. If the range is indicated to be modifiable in the parent blueprint, the range can be further narrowed or resolved to a single deployable value. This narrowing can be continued for additional levels of inclusion.

In the event that the first blueprint includes a deployable range value when created at 2701, then, in response to a deployment request at 2708, a deployment plan can be generated, at 2709, including the range value. Upon completion of deployment, the resulting customer application can be operated within the constraints defined by the range value at 2710. It is possible for a range of deployable values to include one or more deployable range values. In such cases, operating with constraints, as at 2710, can also follow other deployment actions such as at 2704 and 2707.

Figure 27B:
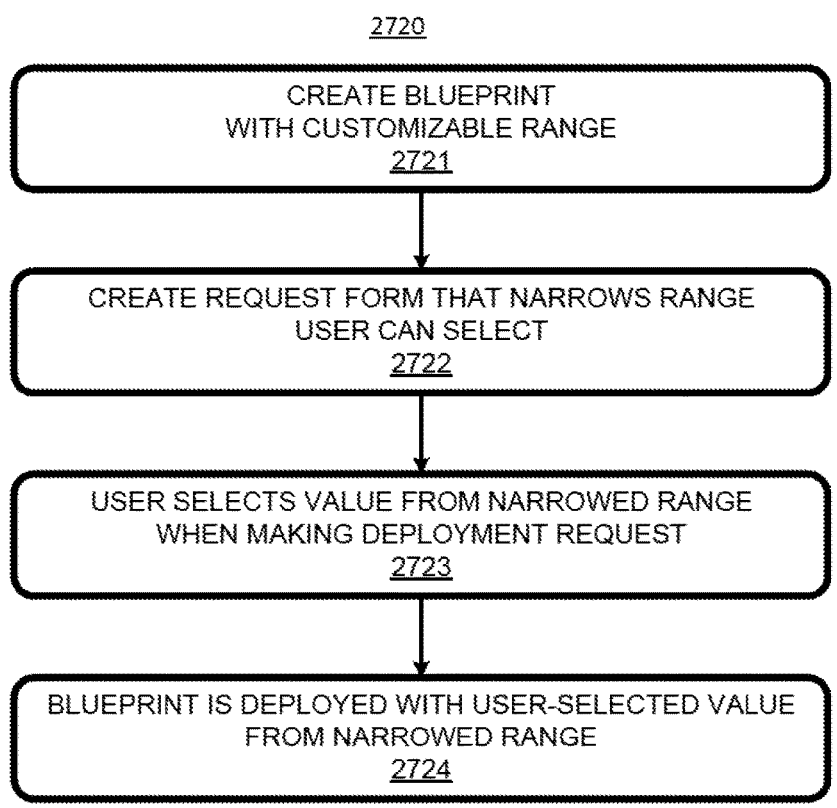
FIG. 27B is a flow chart of a blueprint-deployment process wherein deployment request forms are design to narrow customizable parameter ranges associated with a blueprint for which deployment is to be requested.

In a related process 2720, flow-charted in FIG. 27B, the narrowing is achieved using deployment request forms. At 2721, a blueprint is created with at least one customizable range. At 2722, a request form is created that imposes constraints of the values selectable from the range; in effect, the form narrows the customizable range. At 2723, a user makes a deployment request using the form; to issue the request the user is forced to select a value from the narrowed range. At 2724, the blueprint is deployed based on the user-selected value from the narrowed range.

Note different forms can be created for different customers or different users. For example, an IaaS provided can provide different forms for different customers. This could involve an additional step between authoring a blueprint and making them available for request by an end user. This step can be considered part of an improved blueprint-publishing process. For some customers, an IaaS provider can provides a customer a set of forms, with different forms for different user roles. Also, a customer-administrator can generate customized forms for internal use.

Figure 28:
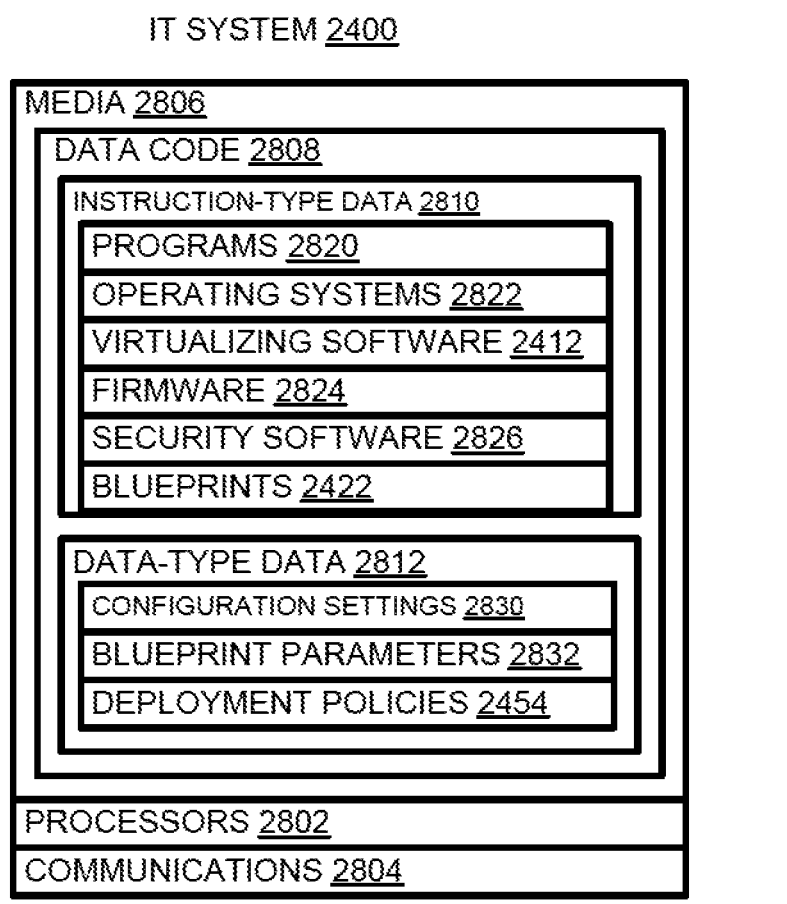
FIG. 28 is an abstract representation of the IT system of FIG. 24.

As abstractly represented in FIG. 28, IT system 2400 can include processors 2802, communications devices 2804, and media 2806. Media 2806 is encoded with data code, which represents both instruction-type data 2810 (aka "instructions") and data-type data 2812 (aka "data"). For example, process 400 of FIG. 4 can be implemented by a processor executing code encoded in media 2806. Processors 2802 manipulate data-type data 2812 according to instructions 2810. Communications devices 2804 transmit and receive both types of data.

Instruction-type data 2810 includes programs 2820 (including user applications, i.e., "apps"), operating systems 2822, virtualizing software 2412, firmware 2824, security software 2826, and blueprints 2422 (which are executable documents). Data-type data 2812 includes configuration settings 2830, blueprint parameters 2832, deployment policies 2454, etc. Many of these items include both types of data.

Herein, "system" refers to a set of interacting elements, wherein the elements can be hardware components, physically encoded software elements, atoms, actions, etc. A process is a system in which the elements are actions. Computers and infrastructures are examples of systems. Computers include media, processors, and communications devices (e.g., network interface cards) cabling, buses, etc. The media can take various forms, e.g., e.g., random access memory (RAM) and hard disks. Herein, an "infrastructure" is the totality of real and virtual resources used to support one or more customer applications.

Herein, "virtual" means "not something but made to appear as if it were". For example, a virtual machine is not a machine but is made to appear (e.g., to a guest operating system) as if it were a machine through software processes. "Virtual" is the opposite of "real". Both hardware and physically encoded software are real, so there can be virtual hardware and virtual software.

A "blueprint" is an executable document that defines a logical object and contains the expertise to configure an infrastructure to implement a customer application. In many cases, a blueprint or a component of a blueprint will include specifications for a customer application or a component thereof. These specifications include a set of parameters and values for those parameters. Deploying the blueprint results in a configuration meeting the specifications of the blueprint or blueprint component. The configuration can be said to be an "instantiation" or "instance" of the blueprint or blueprint component. An instantiation can typically be modified without modifying the source blueprint/component.

As explained above, blueprints can be arranged in an inclusion hierarchy, wherein a "parent" blueprint can include, by reference or instantiation, a "child" blueprint. "Parent" and "child" are relative terms; a blueprint can be a parent of one blueprint and a child of another blueprint. Similarly, "ancestor blueprint" is defined relative to "descendant blueprint". An ancestor blueprint includes, directly or indirectly through one or more intermediate blueprints, a descendant blueprint. An "updated blueprint" is a revision, e.g., of an original blueprint that can assume the functions of the original blueprint if used in lieu of the original blueprint.

A typical blueprint contains a number of parameters to which values are or can be assigned. The values can be numeric, non-numeric or both (e.g., alphanumeric). A parameter can have a value range assigned to it. The value range can be "deployable", e.g., the planning phase of a deployment results in a deployment plan that includes the value range as one of its parameters. For example, the value range may serve as a constraint for the customer application that results from the blueprint deployment. Alternatively, the value range can be a set of deployable values, one of which is to be selected for deployment to the exclusion of the other deployable values. Thus, one may distinguish a deployable value range from a range of deployable values. However, the two types of value ranges can be combined, e.g., in the form of a range of deployable value ranges. For one may select among deployable value ranges 1-4, 4-8, and 8-12, for a value range to be deployed.

Where a child blueprint is instantiated in a parent blueprint, the parameters of the child blueprint may be instantiated in the parent blueprint by default. Where a child blueprint is included in a parent blueprint by reference, the present invention provides that some parameters of the child blueprint can be instantiated in the parent blueprint, thus becoming parameters of the parent blueprint. A parameter is "modifiable" if the value assigned to an instantiation of the parameter in a parent blueprint can be modified without modifying the child blueprint. Herein, a blueprint can include indications for which parameters would be modifiable if included in another blueprint and which parameters would not be modifiable. A parameter is "customizable" if it is modifiable only within constraints set by the child blueprint.

Herein, a blueprint "developer" is a human, group of humans, or other entity that creates a blueprint. In the examples, it is generally assumed that the developer of a parent blueprint is not authorized to modify the child blueprint, e.g., using the application programming interface (API) of the child blueprint. However, the developer of the parent blueprint may modify the value of an instantiation of a modifiable parameter of an included child blueprint via the API of the parent blueprint.

Herein, a "policy" includes a rule and an action. The rule defines circumstances under which the action is to be taken. The action is taken with respect to a blueprint and/or its deployment. For example, the policy might be to incorporate security suite A to all blueprints that do not call for security suite A. Then the rule is that the policy applies to a blueprint if the blueprint does not call for incorporation of security suite A. The action is to incorporate security suite A in the deployment of the blueprint. A policy is "applicable" to a blueprint if the blueprint meets the condition defined by the rule.

Providing for ranges as values for blueprint parameters increases the flexibility of blueprints, either by providing for choices during deployment or for operating ranges during execution of a customer application. Herein, art labelled "prior art", if any, is admitted prior art; art not labelled "prior art" is not admitted prior art. The illustrated embodiment and variations upon and modifications to the illustrated embodiment are provided for by the present invention, the scope of which is defined by the following claims.

An information-technology (IT) blueprint process comprises: requesting deployment of a first blueprint having at least a first parameter to which a first deployable range value or a first range of deployable values has been assigned; and deploying the first blueprint so as to configure an infrastructure to implement at least one customer application, the infrastructure being configured based on the first deployable range value or exactly one deployable value of the first range of deployable values.

In the IT blueprint process, the deploying includes configuring the infrastructure based on the first deployable range value. The IT blueprint process further comprises constraining the operation of the customer application based on the first deployable range value. In the IT blueprint process, the deploying includes configuring the infrastructure based on exactly one deployable value of the first range deployable values.

In the IT blueprint process, the first blueprint includes a second blueprint having the first parameter to which is assigned a second range of deployable values, the second range being greater than and including the first range. The IT blueprint process comprises creating a blueprint-deployment request form that effectively narrows the first range from which a person requested deployment of the first blueprint can select a deployable value.

An information-technology (IT) blueprint system comprises media encoded with code that, when executed by a processor, implements a process including: requesting deployment of a first blueprint having at least a first parameter to which a first deployable range value or a first range of deployable values has been assigned; and deploying the first blueprint so as to configure an infrastructure to implement at least one customer application, the infrastructure being configured based on the first deployable range value or exactly one deployable value of the first range of deployable values.

In the IT blueprint system, the deploying includes configuring the infrastructure based on the first deployable range value. The IT blueprint system further comprises constraining the operation of the customer application based on the first deployable range value. In the IT blueprint system, the deploying includes configuring the infrastructure based on exactly one deployable value of the first range deployable values.

In the IT blueprint system, the first blueprint includes a second blueprint having the first parameter to which is assigned a second range of deployable values, the second range being greater than and including the first range. The IT blueprint system further comprises creating a blueprint-deployment request form that effectively narrows the first range from which a person requested deployment of the first blueprint can select a deployable value.

An information-technology (IT) blueprint is an executable document that describes a real computing object and includes the expertise to create and operate that computing object. The blueprint can be deployed to create a customer application to which resources can be allocated. A blueprint can include parameters to which values are assigned. For example, a range value can be assigned to a blueprint parameter such that operation of a customer application resulting from deploying the blueprint is constrained by the range value. For another example, a range of deployable values can be assigned to a parameter. A single value can be selected for deployment after creation of the blueprint. The availability of such range values makes for a more flexible and useful blueprint.

Multi-Phased Execution of Information-Technology Blueprints

Enterprises are increasingly reliant on computer-based applications for business operations. However, the costs, effort, and expertise required to acquire, configure, maintain, and update the infrastructure required to run those applications can be burdensome. Infrastructure-as-a-Service (IaaS) providers offer the option of allowing enterprises to subscribe to a virtual infrastructure. The IaaS providers then assume responsibility for the virtual infrastructure and the physical infrastructure on which the virtual infrastructure is based. The enterprise is then free to focus more on its basic business and less on the computer system helping to run it.

Of course, the burdens associated with the infrastructure do not disappear; they are merely shifted to the IaaS provider. In fact, the burdens are increased because the IaaS provider may have to configure a physical infrastructure to meet the differing requirements of its diverse customers. Expertise in computer hardware, networking, storage systems, operating systems, databases and other software applications, security, compliance, workload management, and other areas are required. Therefore, the IaaS provider has the multi-disciplinary challenge of coordinating the efforts of experts in different subject matters.

Information-technology (T) blueprints are executable documents embodying expertises for configuring an infrastructure to create and operate a customer application, such as a server or an e-commerce site. A blueprint can specify components to be deployed along with instructions for deploying those components. Experts from multiple disciplines can collaborate on a single blueprint, and/or expertise from different disciplines can be combined by having a blueprint, representing one expertise, reference another blueprint, representing a different expertise. For example, a blueprint for a multi-server website can reference a blueprint for a server. Thus, the developer of the website blueprint need not have the expertise to develop a server blueprint and vice versa. Once a blueprint is created, it can be deployed many times, e.g., for different customers, to configure an infrastructure to implement customer applications for which the blueprint was designed.

In accordance with the present invention, blueprints are deployed in multiple phases. For example, blueprint deployments can separated into a planning phase and a provisioning phase. During the planning phase, the deployment instructions in the blueprint are interpreted to yield a provisioning plan that, if followed, would result in a deployment of the blueprint. During the provisioning phase, an infrastructure is configured (e.g., by assigning infrastructure resources) so as to establishing the customer application for which the blueprint was designed. In some embodiments, additional phases, e.g., including a blueprint-enhancement phase, a resource-reservation phase, an approval phase, a provisioning phase, a post-provisioning phase, and a production phase are implemented.

In effect, the blueprint plan is a version of the blueprint that takes into account information available since the blueprint was created. This, in turn, enables the use of more flexible blueprints that leave some attributes open to further specification at deployment time. New requirements for blueprints can be implemented across groups of blueprints as deployment policies, obviating the need for more frequent blueprint updates. Also, the decision to actually provision a customer application can be based on a relatively more specific provisioning plan rather than on the blueprint itself.

For example, a blueprint for a multi-server website might provide a user a range (e.g., 4-8) for the number of servers to be included in the website. Other parameters, e.g., amount of storage, network topology, etc., might depend on the selected number of servers. During deployment, the selection can be made and the related parameters can be determined. Therefore, the plan can be much more specific than the blueprint itself. If, for example, a cost analysis or an entitlement check is needed, a more precise result can be provided by evaluating the provisioning plan.

Looked at another way, the provisioning plan created at deployment time can dismiss some of the potentialities present in the blueprint and, thus, allow a precise analysis for a variety of purposes. One might want to know the financial cost associated with a deployment, the amount of software and other licensees required by the deployment, and/or the cooling and power requirements required by the resulting deployment. It may be desirable to abort deployment or make certain accommodations before deploying if certain thresholds are exceeded. The necessary calculations can more accurately be performed on the provisioning plan than on the blueprint itself.

Furthermore, the deployment-time plan can take into account deployment policies that are not otherwise embodied in a blueprint. For example, in response to a recent security threat, an IaaS vendor may require all customer applications to comply with a new security standard. While this policy could be implemented by updating all blueprints, it can be more efficiently implemented using a policy that the deployment engine applies as the deployment-time provisioning plan is developed. Thus, policies can be implemented as soon as they are made available to the deployment engine, without the need to update a large number of blueprints.

Figure 29:
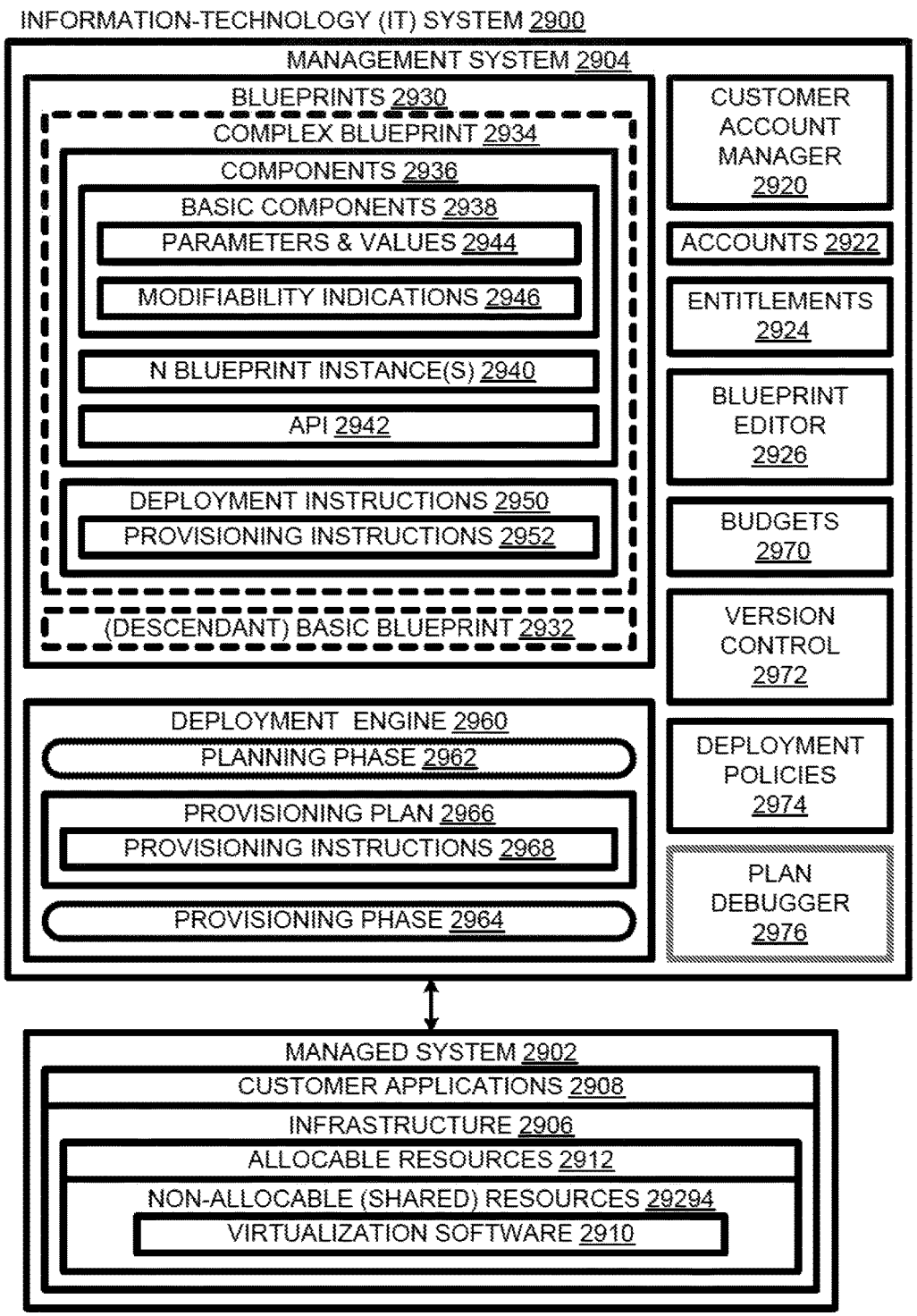
FIG. 29 is a schematic diagram of an information-technology (IT) system including a management system and a managed system.

As shown in FIG. 29, an information-technology (IT) system 2900 includes a managed system 2902 and a management system 2904. Managed system 2902 includes an infrastructure 2906. Infrastructure 2906, which can include both real and virtual components, is configurable to support customer applications 2908. For example, for a customer desiring an e-commerce website, infrastructure 2906 may be configured to support an e-commerce website application.

Figure 30:
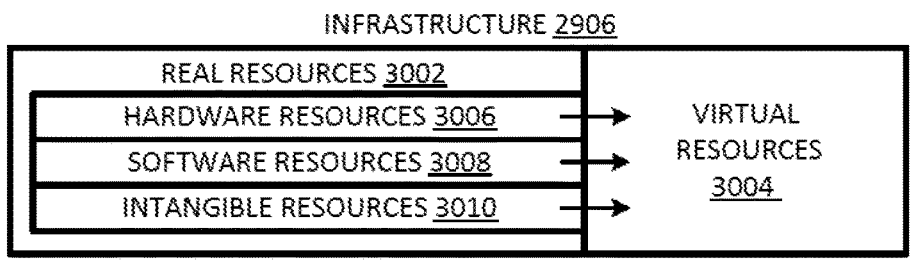
FIG. 30 is a schematic block diagram of an infrastructure of the IT system of FIG. 29.

As shown in FIG. 30, infrastructure 2906 includes real resources 3002 and virtual resources 3004. Real resources 3002 include hardware resources 3006, software resources 3008, and intangible resources 3010. The hardware resources include buildings, power distribution systems, environmental control (e.g., cooling) systems, and computer hardware. The computer hardware includes media, processors, and communications devices. The media is for storing physical encodings of software (aka, code). The software can include data-type data (aka "data") and instruction-type data (aka, "instructions"). The processors manipulate data-type data in accordance with the instructions. The communications devices are used for transmitting and receiving data. The intangible resources can include license rights, power and financial budget allotments, etc.

Software resources 3008 include computer applications, utility (e.g., security) software, virtualization software, operating systems, and firmware. Virtualization software 2910 (FIG. 29) is used to virtualize real hardware and software to yield virtual hardware and virtual software. "Virtual" herein means "appears to be but is not" and is opposed to "real". Thus, in addition to real resources 3002, infrastructure 2906 includes virtual resources 3004. Virtualizing a resource is a way of making the resource allocable. For example, virtualizing a processor allows its capabilities to be shared among plural virtual processors and thus among plural customer applications executing on the virtual processors.

The various real and virtual resources can be categorized as either allocable resources 2912 (FIG. 29) or non-allocable (shared) resources 2914. Allocable resources 2908 can include: real and virtual processors, real and virtual communications devices, real and virtual memory, and other resources. The shared resources 2910 can include buildings, platform firmware, virtualization software 2912, and other resources.

Management system 2904 is used to manage managed system 2902. Management system 2904 includes a customer account manager 2920 for creating and managing customer accounts 2922. The customers can be, for example, departments within the vendor for IT system 2900 or enterprise customers of the vendor. Each account 2922 can be provided with rights, including entitlements 2924 to establish one or more customer applications 2908 using infrastructure 2906.

To simplify the task of establishing customer applications, management system 2904 includes a blueprint editor 2926 for creating, publishing, and updating IT blueprints 2930. Blueprints 2930 can be created using various blueprint components. These can include basic components that are not, per se, blueprints. Blueprints 2930 can also include complex blueprints, i.e., blueprints that include other blueprints as components. Once a blueprint is created, it can be published to a blueprint catalog. Cataloged blueprints may be selected for deployment on behalf of customer accounts.

For example, blueprints 2930 can include a simple (i.e., not including another blueprint) blueprint 2932, the components, etc. of which are not shown. A complex (including another blueprint) blueprint 2934 includes components 2936. Components 2936 include basic components 2938, a number N of instances 2940 of blueprint 2932, and an Application Program Interface 2942 (through which blueprint 2934 is edited). Basic components include parameters and values 2944 assigned to respective parameters, and modifiability indications 2946. Modifiability indications indicate for each parameter/value 2944, whether it would be modifiable if referenced as a component by another blueprint. Blueprint 2934 also includes deployment instructions 2950, including provisioning instructions 2952. Note that basic blueprint 2932 has components comparable to basic components 2938, API 2942, and deployment instructions 2950.

Once a blueprint is selected for deployment, a deployment engine 2960 manages the deployment process in phases: a planning phase 2962 and a provisioning phase 2964. Planning phase 2962 yields a provisioning plan 2966 that defines a first configuration of infrastructure 2906 and specifies a sequence of provisioning actions to be taken during the provisioning. The actions can include installing software, creating virtual machines, assigning Internet Protocol (IP) addresses, etc. Alternatively, the assignment of IP and other network addresses can be specified in the provisioning plan. Provisioning plan 2966 includes provisioning instructions 2968, which are implemented during the provisioning phase. Provisioning instructions 2968 of provisioning plan 2966 take precedence over provisioning instructions of blueprint 2934.

In addition, management system 2904 provides budgets 2970, a version control function 2972, and deployment policies 2974. Budgets 2970 provide for constraints associated with the customer applications. These include financial limits, i.e., a cost that cannot be exceeded by a customer application. However, there can be power-consumption and other budgets that apply.

When a request is made to deploy a blueprint, version control function 2972 provides for checking to see if an update is available, in which case the update can be deployed in view of the requested blueprint.

In some embodiments, a compatibility check of the updated version is made based on a knowledge base; for example, source control may provide the most-recent compatible update in lieu of a requested blueprint.

Deployment policies 2974 are, in effect, a way of instantly updating all or a class of blueprints without having to actually edit or provide new versions of the blueprints. For example, a deployment policy could require implementation of a recently developed security measure necessitated by a recently discovered malware threat. The security measure would be reflected in the provisioning plan, even though it was not indicated in the blueprint itself. Plan debugger 2976 can be used to check for faults in a proposed provisioning plan prior to actual provisioning.

Figure 31:
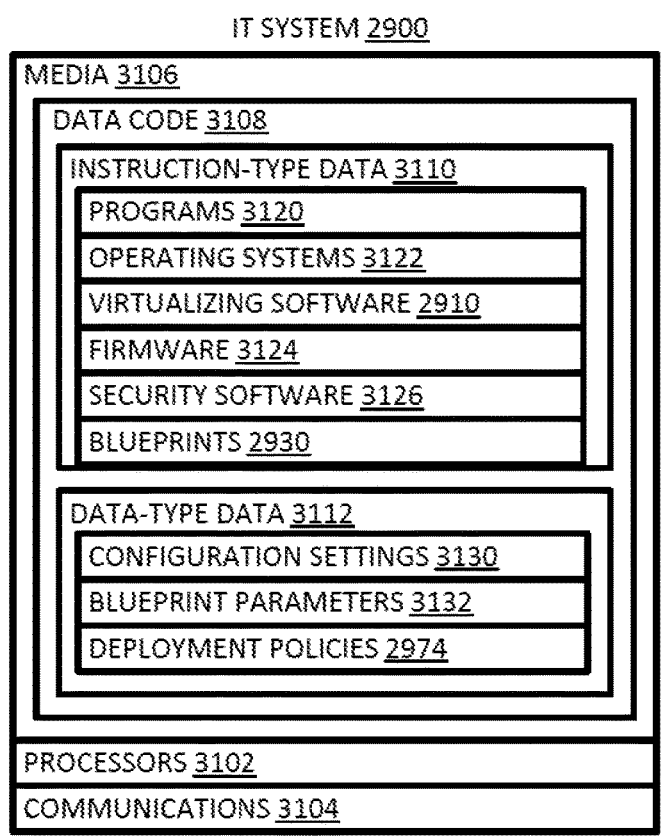
FIG. 31 is an abstract representation of the IT system of FIG. 29.

As abstractly represented in FIG. 31, IT system 2900 can include processors 3102, communications devices 3104, and media 3106. Media 3106 is encoded with data code, which represents both instruction-type data 3110 (aka "instructions") and data-type data 3112 (aka "data"). Processors 3102 manipulate data-type data 3112 according to instructions 3110. Communications devices 3104 transmit and receive (physical representations of) data.

Instruction-type data 3110 includes programs 3120 (including user applications, i.e., "apps"), operating systems 3122, virtualizing software 2912, firmware 3124, security software 3126, and blueprints 2930 (which are executable documents). Data-type data 3112 includes configuration settings 3130, blueprint parameters 3132, deployment policies 2974, etc. Many of these items include both types of data.

Figure 32:
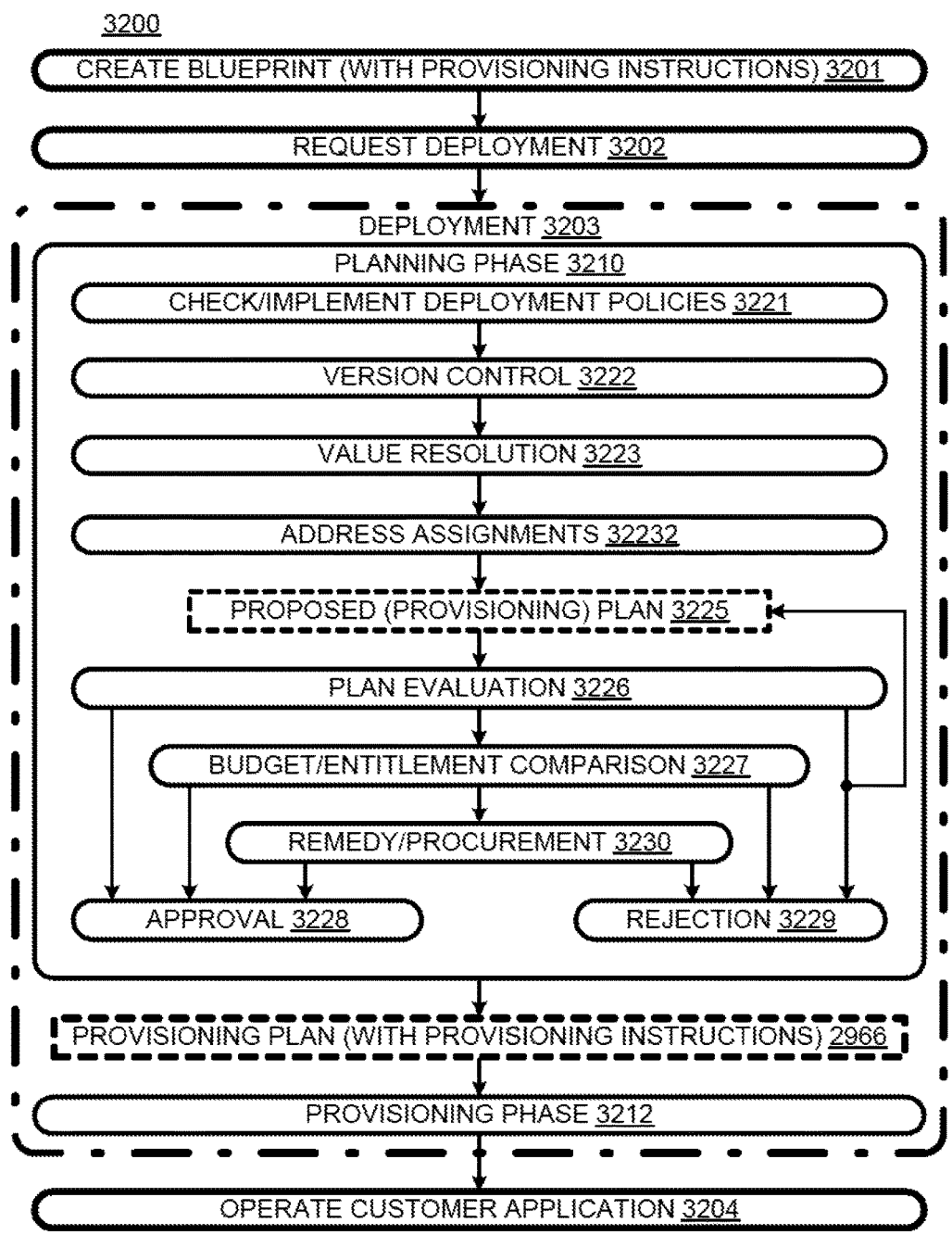
FIG. 32 is a flow chart of a blueprint-deployment process applicable to the IT system of FIG. 29 and other systems.

A blueprint process 3200, flow-charted in FIG. 32, can be implemented by executing data code 3108 as encoded in media 3106. At 3201, a blueprint is created including deployment instructions that include provisioning instructions. The blueprint may be a basic blueprint or one including, by reference or instantiation, another blueprint. In the latter case, a parent-child or other ancestor/descendant relationship is established between the blueprints. At 3202, a request is made and received to deploy the blueprint. Note that if the blueprint includes another blueprint, a request to deploy the other blueprint will be received as part of the deployment of the parent/ancestor blueprint. At 3203, the blueprint is deployed to establish a customer application. At 3204, the customer application is run (operated).

Deployment 3203 includes a planning phase 3210 and a provisioning phase 3212. Planning phase 3210 yields provisioning plan 2966. Provisioning plan 2966 includes provisioning instructions that, when implemented, result the customer application by configuring an infrastructure and allocating resources of the infrastructure to the customer application.

Planning phase 3210 can include many actions, at least some of which can cause modifications of the provisioning instructions in the blueprint to be deployed. The illustration planning phase actions represent some possible actions in a particular order. However, the order can vary across embodiments, and other actions can be included in the planning phase. Also, some actions can overlap other actions.

For example, at 3221, deployment policies are checked. Herein, "deployment policies" refers to policies that affect deployment of a blueprint. Each deployment policy includes a rule and an action. The rule determines to which blueprint or blueprints the policy applies. The action determines what is to be done regarding an applicable blueprint. Examples of deployment policies are presented below regarding other deployment actions. A policy can apply to the entire deployment, early in the deployment, late in deployment, etc. Checking for deployment early in the deployment allows for both implementing deployment policy at the onset of deployment and any subsequent time during deployment.

Version control may be implemented at 3222. For example, if a deployment is requested for a blueprint, a source control function can provide an updated version of the blueprint (if one exists) in lieu of the requested version to leverage the improvements introduced in the update. In some case, a compatibility check, e.g., based on a knowledgebase developed based in part of previous deployments, may preclude use of an update. In such a case, the requested version can be deployed despite the presence of an update. In cases with a series of updates, in some scenarios, the most-recent compatible update may be deployed in lieu of the requested blueprint.

Such version control approaches may be implemented by default by the deployment engine. However, the default approach may be changed by a deployment policy. For example, a deployment policy may enforce deployment of the requested blueprint for some or all blueprints.

At 3223, value choices are resolved. Conventionally, values of blueprint parameters are set upon blueprint creation. However, more flexible blueprints can allow a later choice of values. For example, upon a deployment request, a dialog box can be presented to a user that offers value choices. For example, upon creation a blueprint can specify a range of values from which a value is to be selected at deployment time. This selection is to be represented in the provisioning plan, while the other values in the range are provided for by the blueprint but are not represented in the provisioning plan. The range need not be numerical; for example, a blueprint may allow the country in which a blueprint is to be deployed and whose laws are to be complied with to be selected at 3223. Note that the choice may be determined or constrained by a deployment policy.

At 3224, Internet Protocol (IP) and other network addresses and address ranges may be set. At the time a blueprint is created, it would be, in general, unknown what IP addresses are available for assignment. However, address availability can be determined at deployment time. These addresses to be assigned can be specified in the provisioning plan, although they are not specified by the provisioning instructions of the blueprint itself or otherwise by the blueprint.

In some scenarios, there may be criteria for deploying a blueprint. For example, it may be desirable to condition deployment of a blueprint on the costs involved or on the availability of required resources (e.g., software licenses). However, it may not be possible to evaluate the cost or resource requirements a priori due to unknown, e.g., unresolved value and the potential for changes due to version controls and deployment policies. Establishment of a proposed provisioning plan 3225 addresses this problem. The proposed plan, which can become a provisioning plan, provides a well-defined plan that can be evaluated to determine if the deployment criteria can be met.

At 3226, proposed plan 3225 is evaluated, e.g., logic tested using debugger 2976. Alternatively, a cost analysis can be performed on the evaluation plan, or the evaluation plan's requirements for entitlements can be determined. At 3227, the results of the evaluations can be compared with budget allotments and amounts of available entitlements to determine if the evaluation plan can be treated as a provisioning plan and, thus, implemented to provide the desired customer application. If the comparison is favorable, the evaluation plan is approved at 3228 and becomes the provisioning plan, which is then executed. If the comparison is unfavorable, at 3229, the may be rejected, e.g., sending the user back to the drawing board. In some embodiments, a comparison failure may be remedied at 3230, e.g., by procuring additional entitlements or by changing a value selection made at 3223. If the remedy/procurement is successful, approval may be reached at 3228. Otherwise, the plan may be rejected at 3229 in which case deployment may be aborted.

In the event the proposed plan is approved, it becomes (with or without modifications) the provisioning plan 2966. The customer application is provisioned during provisioning phase 3212 in accordance with provisioning plan 2966, resulting in the desired customer application, which is run (operated) at 3204.

Provisioning plan 2966 is far more specific than the blueprint, e.g., 2934, from which it was generated. Thus, the plan 2966 provides a much more precise basis to predicting whether or not provisioning might run into some sort of problem. Therefore, separating deployment into planning and provisioning phases can avoid circumstances in which expensive provisioning operations must be aborted and rolled back. Similarly, the requirements and costs associated with a deployment can be determined more precisely given the provisioning plan, so the costs associated with provisioning can be more precisely ascertained before making commitments associated with provisioning. Moreover, the separate planning phase affords an opportunity to modify the deployment specified by a blueprint to take into account information obtained, e.g., by deployment time that was not available at the time the blueprint was created.

Figure 33:
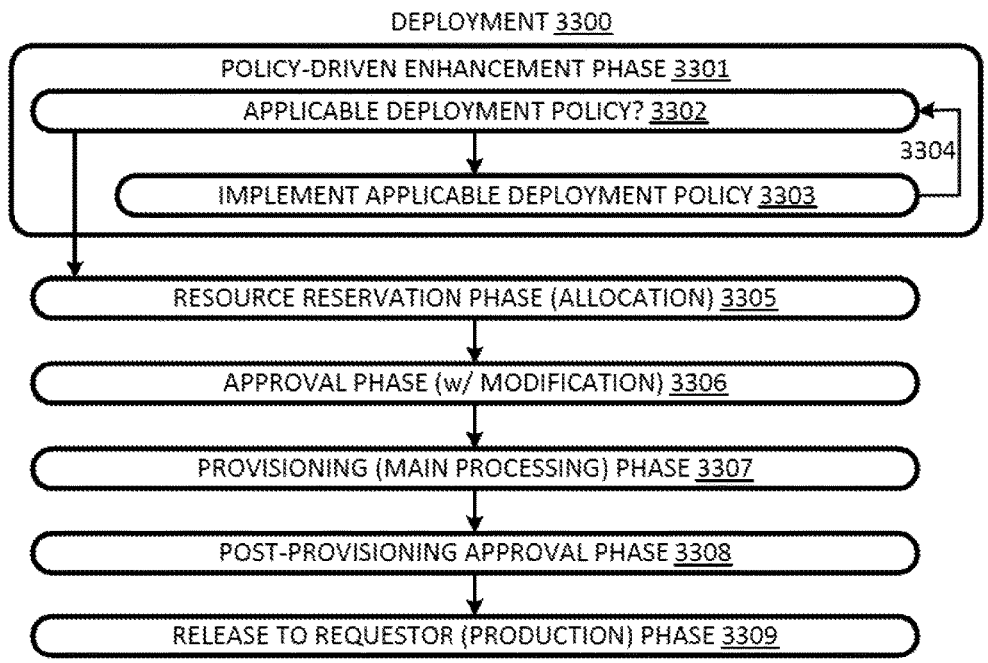
FIG. 33 is a flow chart of a multi-phase blueprint deployment applicable to the IT system of FIG. 29 and other systems.

The number of phases can vary from embodiment-to-embodiment and, for a given embodiment; the number of phases can vary from scenario to scenario. For example, FIG. 33 represents a multi-phase deployment process. A policy-driven enhancement phase 3301 iterates through a couple of actions: 1) checking, at 3302, of there is a deployment policy applicable to a requested blueprint; and 2) implementing, at 3303, the applicable deployment policy to yield an enhanced blueprint. A policy is a combination of: 1) a rule that determines which blueprints it applies to; and 2) an action, e.g., enhancement, to be taken with respect blueprints to which the rule applies. Applying the action results in an enhanced blueprint that differs in some respect (s) from the blueprint to which the action was applied.

Figure 34:
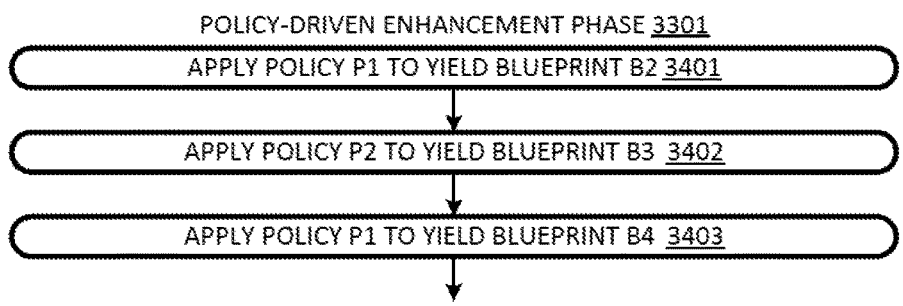
FIG. 34 is a flow chart of a policy-driven enhancement phase of the deployment of FIG. 33.

Deployment policies are checked for each enhanced blueprint, as indicated by return arrow 3304. For example, applying a deployment policy P1 at the first iteration of 3303 could yield a second blueprint B2, as indicated at 3401 in FIG. 34. On a second iteration, at 3402, applying a deployment policy P2 could yield a third blueprint B3. A third policy could be applied at 3403 to blueprint B3; the third policy could even be the same as the first policy P1 or some other policy that was not applicable to the request blueprint or to blueprint B2, in view of the differences between blueprint B3 and prior blueprints. In any event, each iteration of actions 3302-3303 (FIG. 33) can be thought of as a separate phase or sub-phase of deployment 3300.

Once there are no applicable deployment policies at 3302, deployment 3300 proceeds to a resource reservation phase 3305 in which resources are allocated and reserved, but not necessarily provisioned. For example, the allocation can include IP addresses, memory, processors, storage, network bandwidth, etc. Reserving resource requirements for all blueprint components upfront ensures the overall blueprint is deployable on the selected infrastructure. If only parts of blueprint are allocable, we can fail the overall blueprint execution by simply releasing resource reservation as opposed to provisioning the parts and later discovering non-allocable parts and destroying the provisioned resources. The result of the resource allocation may be considered a proposed provisioning plan, i.e., a blueprint that specifies specific resources to be allocated.

At approval (entitlement) phase 3306, the proposed provisioning plan is submitted for approval. The approval phase ensures organization administrators can enforce IT governance and control budgets. The approval can be automated or semi-automated, that is approved automatically, approved with modifications automatically, disapproved automatically, or referred to a person. The person can then approve, approve with modifications, or disapprove. For example, an approver can reduce the requested memory from 16 GB to 4 GB and approve the request. In some cases, a requestor may be able to indicate whether or not deployment should proceed with the modifications or be aborted. If approved with or without modification, the result can be a provisioning plan. At provisioning phase 3307 (aka, main processing phase), resources are physically allocated to blueprint components. In other words, an infrastructure is physically reconfigured to implement a customer application.

After blueprint is successfully executed, additional information becomes available that was not present before blueprint execution. This information may be crucial for approvers to evaluate the approval, hence the need for post approval at 3308. In the event, the post-provisioning phase approval is granted, the customer application is released to the requestor, entering production phase 3309.

In summary, while the multi-phase deployment process can be seen to provide advantages to the deployment process, it also provides for improved, e.g., more flexible, blueprints. Blueprints can be designed that can apply to wider ranges of scenarios given the customizations that value ranges and deployment policies permit at deployment time. When it comes to managing blueprints, it may be easier to manage a smaller number of flexible blueprints than a large number of narrowly designed blueprints (which tend to be required if there is no separate planning phase). Also, the separate planning phase allows for the application of deployment policies that can reduce the need for frequent updates of blueprints.

Herein, "system" refers to a set of interacting elements, wherein the elements can be hardware components, physically encoded software elements, atoms, actions, etc. A process is a system in which the elements are actions.

Computers and infrastructures are examples of systems. Computers include media, processors, and communications devices (e.g., network interface cards) cabling, buses, etc. The media can take various forms, e.g., random access memory (RAM) and hard disks. Herein, an "infrastructure" is the totality of real and virtual resources used to support one or more customer applications.

Herein, "virtual" means "not something but made to appear as if it were". For example, a virtual machine is not a machine but is made to appear (e.g., to a guest operating system) as if it were a machine through software processes. "Virtual" is the opposite of "real". Both hardware and physically encoded software are real, so there can be virtual hardware and virtual software.

A "blueprint" is an executable document that defines a logical object and contains the expertise to configure an infrastructure to implement a customer application. In many cases, a blueprint or a component of a blueprint will include specifications for a customer application or a component thereof. These specifications include a set of parameters and values for those parameters. Conventionally, deploying the blueprint results in a configuration meeting the specifications of the blueprint or blueprint component. However, in accordance with the invention, a blueprint is used to generate a provisioning plan that may differ from the blueprint due to deployment policies, versioning, range selections, etc. The plan can be generated during a planning phase of a deployment, which the plan can be executed to provision a customer application during a separate and subsequent provisioning phase of the deployment.

As explained above, blueprints can be arranged in an inclusion hierarchy, wherein a "parent" blueprint can include, by reference or instantiation, a "child" blueprint. "Parent" and "child" are relative terms; a blueprint can be a parent of one blueprint and a child of another blueprint. Similarly, "ancestor blueprint" is defined relative to "descendant blueprint". An ancestor blueprint includes, directly or indirectly through one or more intermediate blueprints, a descendant blueprint. An "updated blueprint" is a revision, e.g., of an original blueprint that can assume the functions of the original blueprint if used in lieu of the original blueprint.

A typical blueprint contains a number of parameters to which values are or can be assigned. The values can be numeric, non-numeric or both (e.g., alphanumeric). A parameter can have a value range assigned to it. The value range can be "deployable", e.g., the planning phase of a deployment results in a deployment plan that includes the value range as one of its parameters. For example, the value range may serve as a constraint for the customer application that results from the blueprint deployment. Alternatively, the value range can be a set of deployable values, one of which is to be selected for deployment to the exclusion of the other deployable values. Thus, one may distinguish a deployable value range from a range of deployable values. The two types of value ranges can be combined, e.g., in the form of a range of deployable value ranges. For example, one may select among deployable value ranges 1-4. 4-8, and 8-12, for a value range to be deployed.

Where a child blueprint is instantiated in a parent blueprint, the parameters of the child blueprint may be instantiated in the parent blueprint by default. Where a child blueprint is included in a parent blueprint by reference, the present invention provides that some parameters of the child blueprint can be instantiated in the parent blueprint, thus becoming parameters of the parent blueprint. A parameter is "modifiable" if the value assigned to an instantiation of the parameter in a parent blueprint can be modified without modifying the child blueprint. Herein, a blueprint can include indications for which parameters would be modifiable if included in another blueprint and which parameters would not be modifiable. A parameter is "customizable" if it is modifiable only within constraints set by the child blueprint.

Herein, a blueprint "developer" is a human, group of humans, or other entity that creates a blueprint. In the examples, it is generally assumed that the developer of a parent blueprint is not authorized to modify the child blueprint, e.g., using the application programming interface (API) of the child blueprint. However, the developer of the parent blueprint may modify the value of an instantiation of a modifiable parameter of an included child blueprint via the API of the parent blueprint.

Herein, a "policy" includes a rule and an action. The rule defines circumstances under which the action is to be taken. The action is taken with respect to a blueprint and/or its deployment. For example, the policy might be to incorporate security suite A to all blueprints that do not call for security suite A. Then the rule is that the policy applies to a blueprint if the blueprint does not call for incorporation of security suite A. The action is to incorporate security suite A in the deployment of the blueprint. A policy is "applicable" to a blueprint if the blueprint meets the condition defined by the rule.

Providing for ranges as values for blueprint parameters increases the flexibility of blueprints, either by providing for choices during deployment or for operating ranges during execution of a customer application. The illustrated embodiment and variations upon and modifications to the illustrated embodiment are provided for by the present invention, the scope of which is defined by the following claims.

An information-technology (IT) blueprint process comprises: receiving a request to deploy an IT blueprint for a customer application, the IT blueprint including first provisioning instructions; during a planning phase, generating a provisioning plan based on the IT blueprint, the provisioning plan including second provisioning instructions; and during a provisioning phase, provisioning for the customer application according to the provisioning plan and the second provisioning instructions.

The IT process further comprises, during the planning phase, generating a proposed plan, evaluating the proposed plan, and, based on the evaluation, approving or rejecting the proposed plan, the proposed plan, if approved, becoming the provisioning plan. In the IT process, the evaluating includes determining whether a customer account for which the customer application is to be provided has enough entitlements available for the customer application.

The IT process further comprises reserving or assigning network addresses for the customer application prior to the generation of the proposed plan. The IT process further comprises checking deployment policies and implementing a deployment policy prior to generating the proposed plan. In the IT process, the reserving or assigning network addresses for the customer application prior to generating the provisioning plan. The IT process further comprises checking for deployment policies and implementing deployment policies prior to generating the provisioning plan.

In the IT process, the planning phase includes: a policy-driven enhancement phase in which blueprints are enhanced according to deployment policies; and a resource-reservation phase in which infrastructure resources are assigned to blueprint components, the resource-reservation phase resulting in a proposed provisioning plan. In the IT process the planning phase further includes an approval phase in which the proposed provisioning plan is either approved, disapproved or approved with modifications, the approval phase, if resulting in an approval, resulting in a provisioning plan. In the IT process, the deployment further includes a post-provisioning approval phase includes an evaluation of the customer application resulting from provisioning prior to the customer application being released to the requestor of the deployment.

An information-technology (IT) blueprint system comprises: receiving a request to deploy an IT blueprint for a customer application, the IT blueprint including first provisioning instructions; during a planning phase, generating a provisioning plan based on the IT blueprint, the provisioning plan including second provisioning instructions; and during a provisioning phase, provisioning for the customer application according to the provisioning plan and the second provisioning instructions.

The IT system further comprises, during the planning phase, generating a proposed plan, evaluating the proposed plan, and, based on the evaluation, approving or rejecting the proposed plan, the proposed plan, if approved, becoming the provisioning plan. In the IT system, the evaluating includes determining whether a customer account for which the customer application is to be provided has enough entitlements available for the customer application.

The IT system further comprises reserving or assigning network addresses for the customer application prior to the generation of the proposed plan. The IT system further comprises checking deployment policies and implementing a deployment policy prior to generating the proposed plan. In the IT system, the reserving or assigning network addresses for the customer application prior to generating the provisioning plan. The IT system further comprises checking for deployment policies and implementing deployment policies prior to generating the provisioning plan.

In the IT system, the planning phase includes: a policy-driven enhancement phase in which blueprints are enhanced according to deployment policies; and a resource-reservation phase in which infrastructure resources are assigned to blueprint components, the resource-reservation phase resulting in a proposed provisioning plan. In the IT system, the planning phase further includes an approval phase in which the proposed provisioning plan is either approved, disapproved or approved with modifications, the approval phase, if resulting in an approval, resulting in a provisioning plan. In the IT system, the deployment further includes a post-provisioning approval phase includes an evaluation of the customer application resulting from provisioning prior to the customer application being released to the requestor of the deployment.

An information-technology (IT) blueprint is an executable document that describes a real computing object and includes the expertise to create and operate that computing object. The blueprint can be deployed to create a customer application to which resources can be allocated. Herein, deployment includes multiple phases, including separate planning and provisioning phases. The planning phase results in a provisioning plan that includes provisioning instructions that can be executed in lieu of provisioning instructions in the blueprint itself. Since the provisioning plan is generated at deployment time, it can take into account information that was unavailable when the blueprint was originally developed. In addition, the provisioning plan can be more specific regarding provisioning than the blueprint. Therefore, the provisioning plan provides a better basis for determining whether resources should be committed than would the blueprint itself.

Information-Technology Blueprint with Property Binding

Enterprises are increasingly reliant on computer-based applications for business operations. However, the costs, effort, and expertise required to acquire, configure, maintain, and update the infrastructure required to run those applications can be burdensome. Infrastructure-as-a-Service (IaaS) providers offer the option of allowing enterprises to subscribe to a virtual infrastructure. The IaaS providers then assume responsibility for the virtual infrastructure and the physical infrastructure on which the virtual infrastructure is based. The enterprise is then free to focus more on its basic business and less on the computer system helping to run it.

Of course, the burdens associated with the infrastructure do not disappear; they are merely shifted to the IaaS provider. In fact, the burdens are increased because the IaaS provider may have to configure a physical infrastructure to meet the differing requirements of its diverse customers. Expertise in computer hardware, networking, storage systems, operating systems, databases and other software applications, security, compliance, workload management, and other areas are required. Therefore, the IaaS provider has the multi-disciplinary challenge of coordinating the efforts of experts in different subject matters.

Information-technology (IT) blueprints are executable documents embodying expertises for creating and managing a customer application, such as a server or an e-commerce site. Experts from multiple disciplines can collaborate on a single blueprint, and/or expertise from different disciplines can be combined by having a blueprint, representing one expertise, reference another blueprint, representing a different expertise. For example, a blueprint for a multi-server website can reference a blueprint for a server. Thus, the developer of the website blueprint need not have the expertise to develop an infrastructure blueprint and vice versa. Once a blueprint is authored, it can be deployed many times to provision and/or manage the lifecycles of customer applications and/or supporting infrastructure, the blueprint was designed to model Blueprints are constructed using blueprint components. Each component has properties. Each property can be defined using one or more—value pairs. For greater flexibility, a blueprint can provide a set or range of parameter values, from which a single value is to be selected after the blueprint is created. For example, a customer may select a property value from a set of values at deployment time. However, there are cases when values for two properties are related in that the value for a "dependent" property is derived from the value of an "independent" property. Accordingly, the present invention provides for property binding to express value of one property to be sourced from one or more other properties. The properties may belong to the same or different blueprint components.

For example, a blueprint for a website that includes a database component and 'application logic' component. These two components are individually designed by respective subject matter experts for general composability in different blueprints. The database component has a property named 'port' to indicate the port number on which database accepts incoming requests to access data. The 'application logic' component has a set of properties to identify the database address, port—using which it can make connections to access data from the database. One such property may be named 'db_port' and indicates the port number of database host to connect for data access.

The author of the website blueprint specifies a port number on the database component. With property binding, the author can now specify the value of db_port property of the 'application logic' component to be same as the value of 'port' property of 'database' component. This ensures application logic is always connecting to the right port, while avoiding duplication of port specifications and eliminating a possible configuration error.

Figure 35:
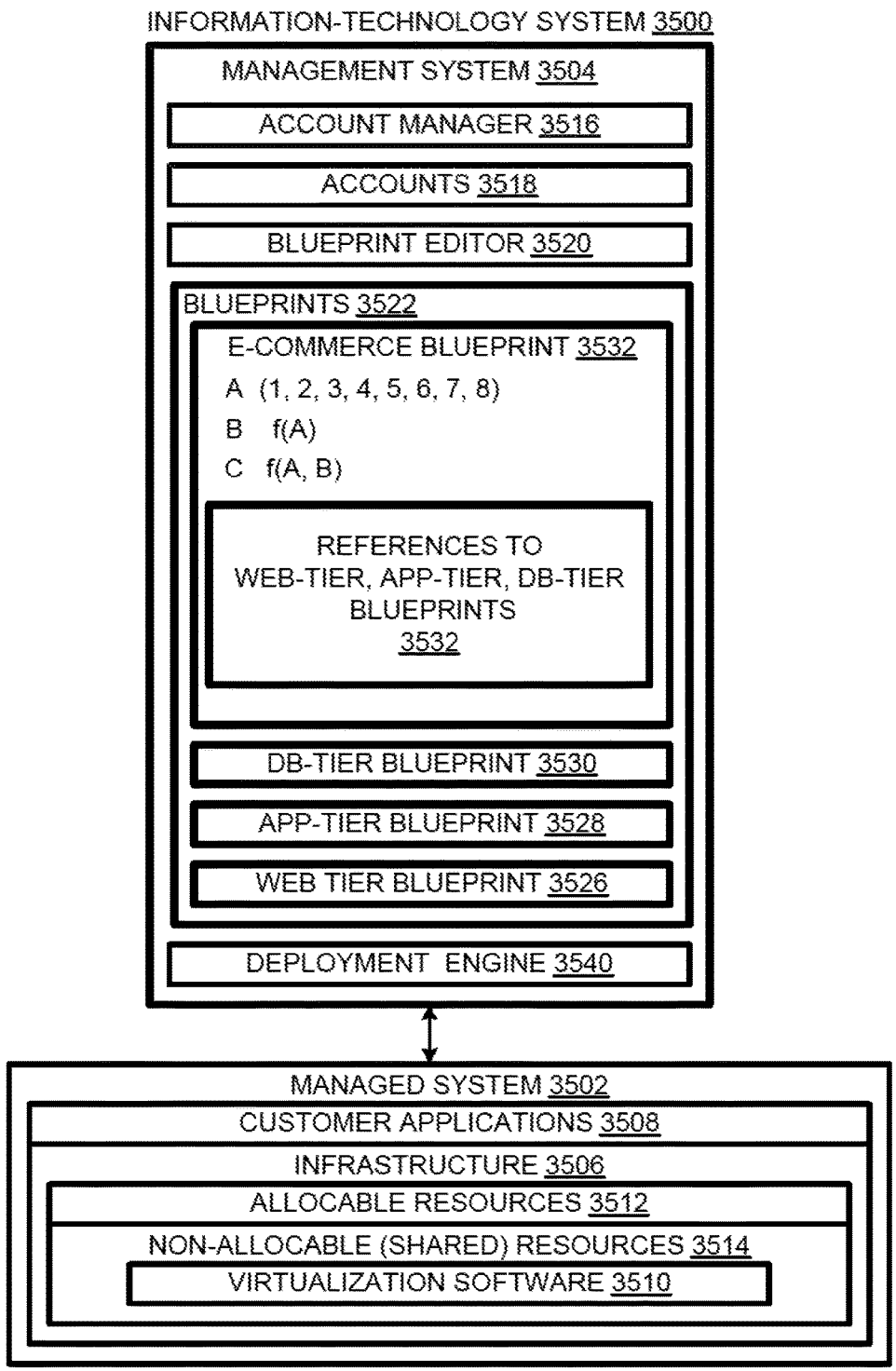
FIG. 35 is a schematic diagram of an information-technology (IT) system including a management system and a managed system.

As shown in FIG. 35, an information-technology (IT) system 3500 includes a managed system 3502 and a management system 3504. Managed system 3502 includes an infrastructure 3506. Infrastructure 3506, which can include both real and virtual components, is configurable to support customer applications 3508. For example, for a customer desiring an e-commerce website, infrastructure 3506 may be configured to support an e-commerce website application.

Figure 36:
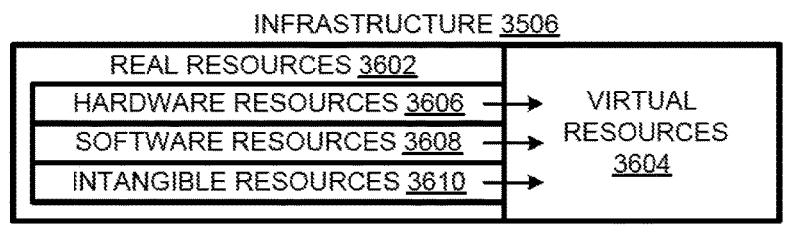
FIG. 36 is a schematic block diagram of an infrastructure of the IT system of FIG. 35.

As shown in FIG. 36, infrastructure 3506 includes real resources 3602 and virtual resources 3604. Real resources 3602 include hardware resources 3606, software resources 3608, and intangible resources 3610. The hardware resources include buildings, power distribution systems, environmental control (e.g., cooling) systems, computer hardware, network devices, and storage devices. The computer hardware includes media, processors, and communications devices. The media is for storing physical encodings of software (aka, code). The software can include data-type data (aka "data") and instruction-type data (aka, "instructions"). The processors manipulate data-type data in accordance with the instructions. The communications devices are used for transmitting and receiving data. The intangible resources can include license rights, power and financial budget allotments, etc.

Software resources 3608 include computer applications, utility (e.g., security) software, virtualization software, operating systems, and firmware. Virtualization software 3510 (FIG. 35) is used to virtualize real hardware and software to yield virtual hardware and virtual software. "Virtual" herein means "appears to be but is not" and is opposed to "real". Thus, in addition to real resources 3602, infrastructure 3506 includes virtual resources 3604. Virtualizing a resource is a way of making the resource allocable. For example, virtualizing a processor allows its capabilities to be shared among plural virtual processors and thus among plural customer applications executing on the virtual processors.

The various real and virtual resources can be categorized as either allocable resources 3512 (FIG. 35) or non-allocable (shared) resources 3514, as indicated in FIG. 35. Allocable resources 3508 can include: real and virtual processors, real and virtual communications devices, real and virtual memory, licenses, and other resources. The shared resources 3510 can include buildings, platform firmware, virtualization software 3512, and other resources.

Management system 3504 is used to manage managed system 3502. Management system 3504 includes an account manager 3516 for creating and managing accounts 3518. The accounts 3518 can include customer accounts and developer accounts. The customers can be departments within the vendor for IT system 3500 or enterprise customers of the vendor. Each account 3518 can be provided with rights to establish one or more customer applications 3508 using infrastructure 3506. The developers are parties that develop blueprints to facilitate the establishment of customer applications 3508 on behalf of the customers.

To simplify the task of establishing customer applications, management system 3504 includes a blueprint editor 3520 for authoring, publishing, and updating IT blueprints 3522. Blueprints 3522 can be created using various blueprint components. These can include basic components that are not, per se, blueprints. Blueprints 3522 can also include complex blueprints, i.e., blueprints that include other blueprints as components. Once a blueprint is created, it can be published to a blueprint catalog. Cataloged blueprints may be selected for deployment on behalf of customer accounts.

In the illustrated example, blueprints 3522 include, among other blueprints, a web-tier blueprint 3526, an app-tier blueprint 3528, a database-tier (db-tier) blueprint 3530, and an e-commerce blueprint 3532. E-commerce blueprint 3532 includes references 3534 web-tier blueprint 3526, app-tier blueprint 3528, and db-tier blueprint 3530. In addition, e-commerce blueprint 3532 includes properties A, B, and C. Property A is assigned a range of deployable values 1, 2, 3, 4, 5, 6, 7, and 8, any of which can be selected in favor of the others for deployment. Property B is assigned a value f(A), meaning that the value upon deployment of "dependent" property B is to be a function of the value selected for "independent" property A. Dependent property C is assigned a value f(A, B), meaning that the value upon deployment of dependent property C is to be a function of both the deployment value selected for independent property A and the value determined for deployment for independent property B. For example, property A can be a number of web servers, property B can be a number of app servers, and property C can be a topology selected for arranging the web servers to feed the app servers. For example, in one topology, each web server feeds all app servers, while in another topology, each app server is fed by exactly one web server.

Figure 37:
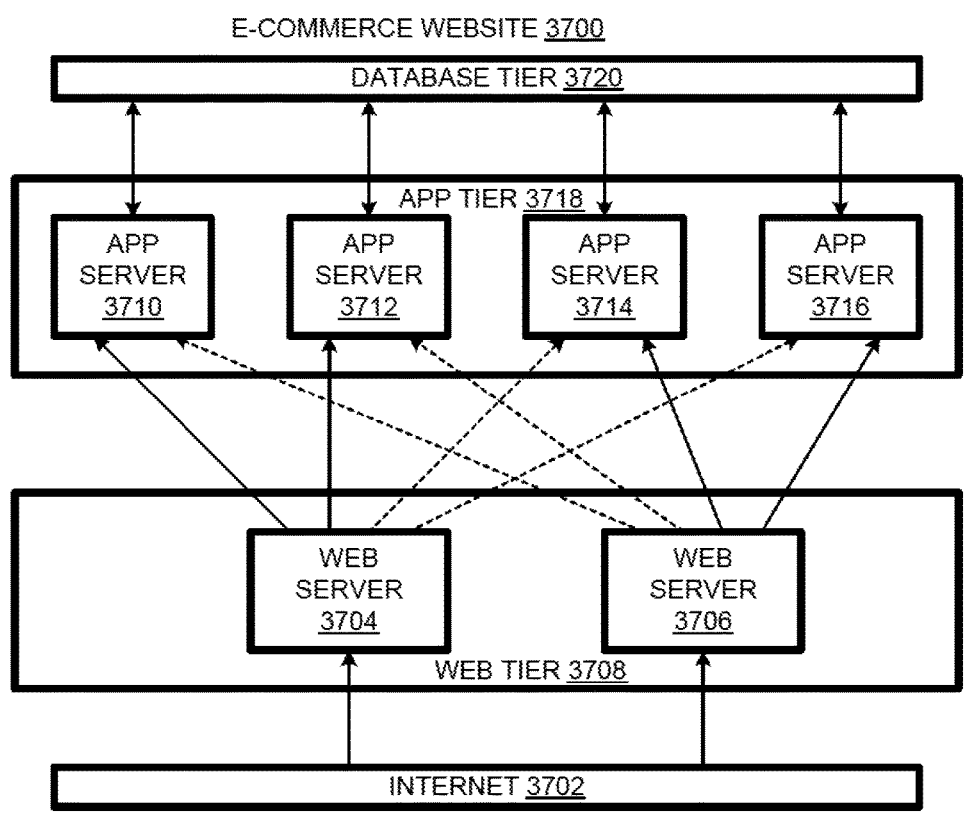
FIG. 37 is a schematic block diagram of a tiered customer application resulting from deploying a blueprint in the IT system of FIG. 35.

FIG. 37 is an illustration of a 3-tier e-commerce website 3700 such as might be established in part by deploying e-commerce blueprint 3532. Transactions are received over the Internet 3702 by web-servers 3704 and 3706 of a web-tier 3708. Web servers 3704 and 3706 route transactions to app servers 3710, 3712, 3714, and 3716 of app tier 3718. The app servers handle the transactions, in some cases accessing database tier 3720.

A first topology uses all connections shown in FIG. 37 between load web servers 3704 and 3706, on the one hand, and app servers 3710, 3712, 3714, and 3716 on the other. A second topology uses only the connections illustrated with solid lines in FIG. 37; the connections shown in dash are not used. In this second topology, web server 3704 feeds app servers 3710 and 3712, but not app servers 3714 and 3716, while web server 3706 feeds app servers 3714 and 3716, but not app servers 3710 and 3712. E-commerce blueprint 3532 (FIG. 35), may, for example, provide for using the first topology for cases in which four app servers are deployed, but provide for using the second topology in cases in which eight app servers are deployed.

Figure 38:
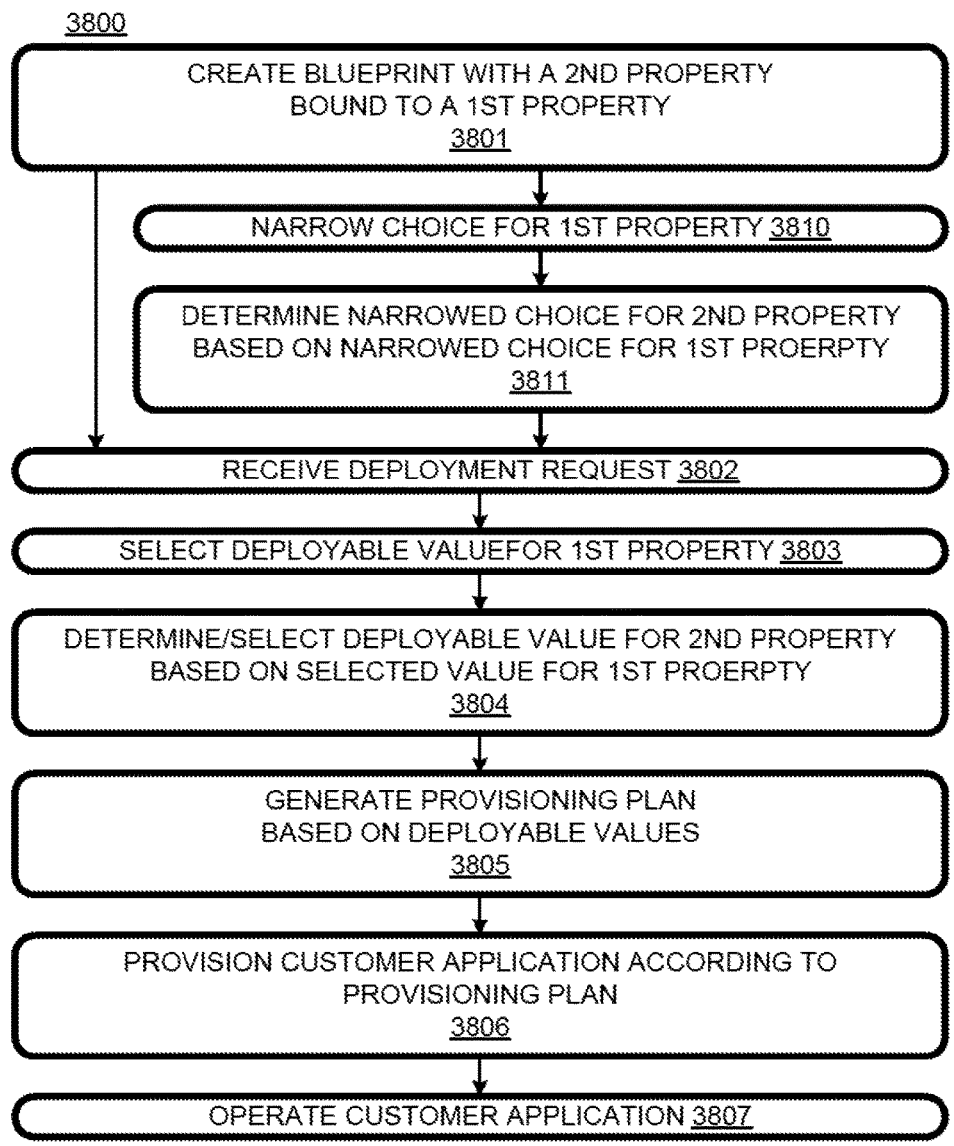
FIG. 38 is a flow chart of a blueprint-deployment process applicable to the IT system of FIG. 35 and other systems.

A blueprint may be deployed using deployment engine 3540 in accordance with a process 3800, flow-charted in FIG. 38. At 3801, a blueprint is created in which a first, dependent, property is bound to a second, independent, property. Either or both of the first and second properties may be included in an instance of a "child" blueprint included in the subject blueprint.

At 3802, a request for deployment of the blueprint is received. The request may be initiated by a customer or automatically, e.g., as a blueprint included in another blueprint for which deployment has been requested.

At 3803, a deployable value is selected for the first property in response to the deployment request. The deployment engine may, for example, provide a dialog box providing choices available to a customer.

The customer selects the value to be deployed from the range or other set of values offered.

At 3804, a deployable value for the second property is determined or selected. In some cases, the selection of a value for the first property will yield, in view of the binding relationship, a unique value for the second property. In that case, the unique value is determined automatically and serves as the value to be used upon deployment. In other cases, a choice of values for the second value will be determined. Either the choice of a value for the first property did not eliminate any choices or one or plural choices remain despite some choices being eliminated. In these other cases, a customer can make a choice from the values remaining for the second property.

Just as the value of a property can be bound to other properties, the value of any of its constraints can also be bound to values of one or more other properties. Consider as an example a blueprint that models a single machine. Deploying this blueprint gives you a fully configured machine ready to use. This blueprint is made up of a single 'machine' component that has properties. The 'os' property indicates the name of an operating system (ex: Windows Server 2012 R2, CentOS 6.7). The 'os' property has a constraint of 'allowedValues' that includes the full list of supported operating systems by this blueprint. There is also another property named 'memory' that indicates the size of memory.

Different operating systems have differing requirements on the minimum memory for them to function properly. For example, CentOS 6.7 can work with 512 MB of memory but Windows Server 2012 R2 requires a minimum of 2048 MB. Using property binding, the blueprint author can specify the value of 'minimum' constraint for 'memory' property based on the value of 'os' property. In other words,
Memory.min=f(os)
The function can have different min values for different values of os. This makes for a well-configured blueprint that again eliminates configuration errors while giving subject matter experts full express-ability to capture the best practices.

At 3805, in some examples, a provisioning plan is generated specifying the selected and determined deployable values for the first and second properties. At 3806, a customer application is provisioned (configuring the infrastructure) according to the provisioning plan or otherwise. At 3807, the customer application is operated, e.g., in a production mode. In some embodiments, approvals based on the provisioning plan or upon deployment before production mode is entered.

Property binding comes into play in circumstances other than blueprint deployment. For example, a choice of deployable values for a blueprint may be narrowed for an instance of a blueprint (or at least some of its parameters) is included as a component in another blueprint. Also, a provider or customer administrator can narrow choices available to a customer/user, e.g., via design of deployment request forms. In such cases, at 3810, a choice is narrowed for a first property. The narrowing can be to a single deployable value or to plural deployable values. In other words, the narrowing is to a non-empty non-exhaustive subset of the original set of choices.

At 3811, a narrowed choice is determined for the second property based on the narrowed choice for the first property. Again the narrowing may leave one or more value choices for the second property. Either way, process 3800 continues from action 3811 to 3802-3807.

Figure 39:
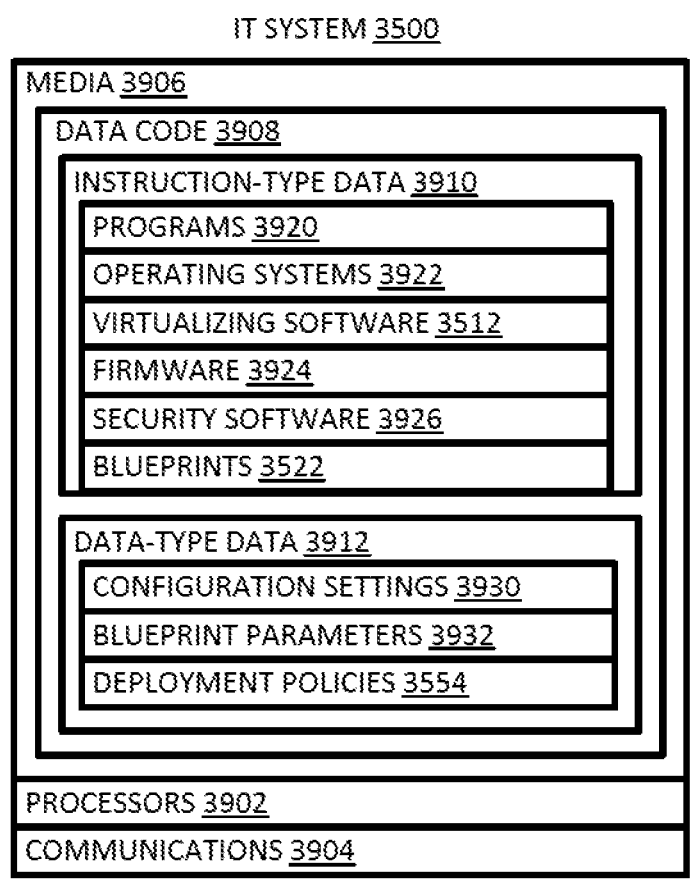
FIG. 39 is an abstract representation of the IT system of FIG. 35.

As abstractly represented in FIG. 39, IT system 3500 can include processors 3902, communications devices 3904, and media 3906. Media 3906 is encoded with data code, which represents both instruction-type data 3910 (aka "instructions") and data-type data 3912 (aka "data"). For example, process 3800 of FIG. 38 can be implemented by a processor executing code encoded in media 3906. Processors 3902 manipulate data-type data 3912 according to instructions 3910. Communications devices 3904 transmit and receive both types of data.

Instruction-type data 3910 includes programs 3920 (including user applications, i.e., "apps"), operating systems 3922, virtualizing software 3512, firmware 3924, security software 3926, and blueprints 3522 (which are executable documents). Data-type data 3912 includes configuration settings 3930, blueprint parameters 3932, deployment policies 3554, etc. Many of these items include both types of data.

Property binding can provide an ability to define a value for a dependent property using a function of another independent property or multiple other independent properties. The independent property or properties can belong to different components, including referenced or otherwise nested blueprints, than does the dependent property. The dependent property can be a constraint on a value of another property. For example, the range from which a value must be selected can be a function of the values of one or more other independent properties.

Property binding can be used as the basis for a "what-if" analysis. For example, "If I change the password of my database user, how many other components are affected"; based on the result of the "what-if" analysis, one can plan the rollout of password change. Property binding can be used as the basis for day2 operations on deployments and automatically updating the affected components. Property binding can be used as the basis for inferring connection topology and applying automatic network and security policies and configurations.

Herein, "system" refers to a set of interacting elements, wherein the elements can be hardware components, physically encoded software elements, atoms, actions, etc. A process is a system in which the elements are actions. Computers and infrastructures are examples of systems. Computers include media, processors, and communications devices (e.g., network interface cards) cabling, buses, etc. The media can take various forms, e.g., random access memory (RAM) and hard disks. Herein, an "infrastructure" is the totality of resources used to support one or more customer applications.

Herein, "virtual" means "not something but made to appear as if it were". For example, a virtual machine is not a machine but is made to appear (e.g., to a guest operating system) as if it were a machine through software processes. "Virtual" is the opposite of "real". Both hardware and physically encoded software are real, so there can be virtual hardware and virtual software.

A "blueprint" is an executable document that defines a logical object and contains the expertise to configure an infrastructure to implement a customer application. In many cases, a blueprint or a component of a blueprint will include specifications for a customer application or a component thereof. These specifications include a set of properties/parameters and values for those properties. Deploying the blueprint results in a physical transformation in the form of a configuration meeting the specifications of the blueprint or blueprint component. The configuration can be said to be an "instantiation" or "instance" of the blueprint or blueprint component. An instantiation can typically be modified without modifying the source blueprint/component.

Blueprints can be arranged in an inclusion hierarchy, wherein a "parent" blueprint can include, by reference or instantiation, a "child" blueprint. "Parent" and "child" are relative terms; a blueprint can be a parent of one blueprint and a child of another blueprint. Similarly, "ancestor blueprint" is defined relative to "descendant blueprint". An ancestor blueprint includes, directly or indirectly through one or more intermediate blueprints, a descendant blueprint. An "updated blueprint" is a revision, e.g., of an original blueprint that can assume the functions of the original blueprint if used in lieu of the original blueprint.

A typical blueprint contains a number of properties or parameters to which values are or can be assigned. The values can be numeric, non-numeric or both (e.g., alphanumeric). A property can have a value range assigned to it. The value range can be "deployable", e.g., the planning phase of a deployment results in a deployment plan that includes the value range as one of its properties. For example, the value range may serve as a constraint for the customer application that results from the blueprint deployment. Alternatively, the value range can be a set of deployable values, one of which is to be selected for deployment to the exclusion of the other deployable values. Thus, one may distinguish a deployable value range from a range of deployable values. However, the two types of value ranges can be combined, e.g., in the form of a range of deployable value ranges. For one may select among deployable value ranges 1-4, 4-8, and 8-12, for a value range to be deployed.

Where a child (or descendant) blueprint is instantiated in a parent (or ancestor) blueprint, the properties of the child blueprint may be instantiated in the parent blueprint by default. Where a child blueprint is included in a parent blueprint by reference, the present invention provides that some properties of the child blueprint can be instantiated in the parent blueprint, thus becoming properties of the parent blueprint. A property is "modifiable" if the value assigned to an instantiation of the property in a parent blueprint can be modified without modifying the child blueprint. Herein, a blueprint can include indications for which properties would be modifiable if included in another blueprint and which properties would not be modifiable. A property is "customizable" if it is modifiable only within constraints set by the child blueprint. Typically, customization involves narrowing a range or other set of values, i.e., selecting for an instantiation of a blueprint a non-empty, non-exhaustive subset of a set of values assigned to the original blueprint, Herein, a blueprint "developer" is a human, group of humans, or other entity that creates a blueprint. In the examples, it is generally assumed that the developer of a parent blueprint is not authorized to modify the child blueprint, e.g., using the application programming interface (API) of the child blueprint. However, the developer of the parent blueprint may modify the value of an instantiation of a modifiable property of an included child blueprint via the API of the parent blueprint.

Providing for property binding allows the use of flexible blueprints with choices for property values, while precluding non-viable combinations of values. Herein, art labelled "prior art", if any, is admitted prior art; art not labelled "prior art" is not admitted prior art. The illustrated embodiment and variations upon and modifications to the illustrated embodiment are provided for by the present invention, the scope of which is defined by the following claims.

A blueprint process comprises: receiving a deployment request for a first blueprint; in response to the request, selecting a first deployable value from a first set of plural deployable values for a first property of the first blueprint; automatically determining a second deployable value for a second property of the first blueprint at least in part as a function of the first deployable value, or determining a second set of plural deployable values for the second property at least in part as a function of the first deployable value, and selecting a second deployable value for the second property from the second set; and deploying the first blueprint to configure an infrastructure to support a customer application based in part on the first and second deployable values.

In the blueprint process, the first property is a property of a second blueprint included in the first blueprint, and the second property is a property of the first blueprint but not a property of the second blueprint.

In the blueprint process the second property is a property of a second blueprint included in the first blueprint, and the first property is a property of the first blueprint but not a property of the second blueprint.

The blueprint process further comprises, before receiving the deployment request, narrowing a third set of plural deployable values to yield the first set of plural deployable values. In the blueprint process, the third set of deployable values is associated with a second blueprint prior to its inclusion in the first blueprint.

A blueprint process comprises: creating a first blueprint including, an independent property for which a first value can be selected from a first range of values assigned to the independent property, and a dependent property for which a second value or a second range of values can be determined at least in part as a function of the first value or first range of values; and deploying the blueprint to configure an infrastructure based at least in part on, the first value or a third value selected from a third range equal to the first range, and the second value or a value determined based on the first value or the third value.

In the blueprint process, the second value or the second range of values is at least a partial function of a fourth value or fourth range of values. In the blueprint process, the independent property is a property associated with a first component of the first blueprint and the dependent property is associated with a second component of the blueprint, the second component being separate from the first component. In the blueprint process, at least one of the first component and the second component is a second blueprint nested within the first blueprint. In the blueprint process, at least one of the first component and the second component is associated with the first blueprint but not with one of its components.

A blueprint system comprises media encoded with code that, when executed using a processor, implements a process including: receiving a deployment request for a first blueprint; in response to the request, selecting a first deployable value from a first set of plural deployable values for a first property of the first blueprint; automatically determining a second deployable value for a second property of the first blueprint at least in part as a function of the first deployable value, or determining a second set of plural deployable values for the second property at least in part as a function of the first deployable value, and selecting a second deployable value for the second property from the second set; and deploying the first blueprint to configure an infrastructure to support a customer application based in part on the first and second deployable values.

In the blueprint system, the first property is a property of a second blueprint included in the first blueprint, and the second property is a property of the first blueprint but not a property of the second blueprint. In the blueprint system, the second property is a property of a second blueprint included in the first blueprint, and the first property is a property of the first blueprint but not a property of the second blueprint. The blueprint system further comprises, before receiving the deployment request, narrowing a third set of plural deployable values to yield the first set of plural deployable values. In the blueprint system, the third set of deployable values is associated with a second blueprint prior to its inclusion in the first blueprint.

A blueprint system comprises media encoded with code that, when executed using a processor, implements a process including: creating a first blueprint including, an independent property for which a first value can be selected from a first range of values assigned to the independent property, and a dependent property for which a second value or a second range of values can be determined at least in part as a function of the first value or first range of values; and deploying the blueprint to configure an infrastructure based at least in part on, the first value or a third value selected from a third range equal to the first range, and the second value or a value determined based on the first value or the third value.

In the blueprint system, the second value or the second range of values is at least a partial function of a fourth value or fourth range of values. In the blueprint system, the independent property is a property associated with a first component of the first blueprint and the dependent property is associated with a second component of the blueprint, the second component being separate from the first component. In the blueprint system, at least one of the first component and the second component is a second blueprint nested within the first blueprint. In the blueprint system of Claim 19 wherein at least one of the first component and the second component is associated with the first blueprint but not with one of its components.

An information-technology (IT) blueprint is an executable document that describes a real computing object and includes the expertise to create and operate that computing object. The blueprint can be deployed to create a customer application to which resources can be allocated. A blueprint can include properties to which values are assigned. For enhanced flexibility, a first set of deployable values can be assigned to a first property; a single deployable value can be selected, e.g., at deployment time, for deployment. A second property can be bound to the first property, such that selecting a value for the first property narrows a second set of values available for the second property to a non-empty non-exhaustive subset of the second set. Such property binding allows flexible blueprints that offer deployment-time choices for selecting property values, while precluding selection of problematic combinations of property values.

What is claimed is:

1. A process comprising:
   creating a parent blueprint that includes a child blueprint and has instantiated within parameters and associated parameter values imported from the child blueprint, the parent blueprint having a parent Application Program Interface (API), the child blueprint having a child API;
   modifying the values of the parameters imported from the child blueprint without modifying the corresponding parameter values in the child blueprint, the modifying being performed via the parent API; and
   configuring a computer system by deploying the parent blueprint so as to apply the modified values rather than the values as imported from the child blueprint.

2. The process of claim 1 wherein the modifying is customizing.

3. The process of claim 1 wherein the child blueprint indicates that some of its parameters are modifiable and some of its parameters are not modifiable, the imported parameters being the parameters indicated as modifiable.

4. The process of claim 3 wherein the imported parameters do not include parameters that are indicated to be non-modifiable.

5. The process of claim 1 wherein the modifying is not performed through an API of the child blueprint and the modifying does not modify the child blueprint.

6. The process of claim 1 further comprising creating the child blueprint such that it indicates which of its parameters are to be modifiable when the child blueprint is included in a parent blueprint.

7. The process of claim 1 wherein the creating of the parent blueprint includes indicating which of its parameters are to be modifiable, the modifiable parameters of the parent blueprint including at least one parameter imported from the child blueprint.

8. The process of claim 7 further comprising:
   creating a grandparent blueprint that includes the parent blueprint so that modifiable parameters of the parent blueprint are imported and instantiated into the grandparent blueprint so that at least one parameter imported from the child blueprint into the parent blueprint is imported into the grandparent blueprint; and
   modifying the parameter imported from the child blueprint via an API of the grandparent.

9. The process of claim 8 wherein the parameter imported from the child blueprint was modified via the API of the parent blueprint before it was modified via the API of the grandparent blueprint.

10. A system comprising non-transitory media encoded with code that, when executed using hardware, implements a process including:
    creating a parent blueprint that includes a child blueprint and has instantiated within parameters and associated parameter values imported from the child blueprint, the parent blueprint having a parent Application Program Interface (API), the child blueprint having a child API;
    modifying the values of the parameters imported from the child blueprint without modifying the corresponding parameter values in the child blueprint, the modifying being performed via the parent API; and
    configuring a computer system by deploying the parent blueprint so as to apply the modified values rather than the values as imported from the child blueprint.

11. The system of claim 10 wherein the modifying is customizing.

12. The system of claim 10 wherein the child blueprint indicates that some of its parameters are modifiable and some of its parameters are not modifiable, the imported parameters being the parameters indicated as modifiable.

13. The system of claim 12 wherein the imported parameters do not include parameters that are indicated to be non-modifiable.

14. The system of claim 10 wherein the modifying is not performed through an API of the child blueprint and the modifying does not modify the child blueprint.

15. The system of claim 10 wherein the process includes creating the child blueprint such that it indicates which of its parameters are to be modifiable when the child blueprint is included in a parent blueprint.

16. The process of claim 10 wherein the creating of the parent blueprint includes indicating which of its parameters are to be modifiable, the modifiable parameters of the parent blueprint including at least one parameter imported from the child blueprint.

17. The process of claim 16 further comprising:
creating a grandparent blueprint that includes the parent blueprint so that modifiable parameters of the parent blueprint are imported and instantiated into the grandparent blueprint so that at least one parameter imported from the child blueprint into the parent blueprint is imported into the grandparent blueprint; and
modifying the parameter imported from the child blueprint via an API of the grandparent blueprint.

18. The process of claim 17 wherein the parameter imported from the child blueprint was modified via the API of the parent blueprint before it was modified via the API of the grandparent blueprint.

\* \* \* \* \*